US012744330B2

(12) United States Patent
Wada et al.

(10) Patent No.: US 12,744,330 B2
(45) Date of Patent: Sep. 22, 2026

(54) ANTENNA DEVICE AND WIRELESS DEVICE

(71) Applicant: KABUSHIKI KAISHA TOSHIBA, Tokyo (JP)

(72) Inventors: Kentaro Wada, Kawasaki Kanagawa (JP); Koh Hashimoto, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 53 days.

(21) Appl. No.: 19/018,027

(22) Filed: Jan. 13, 2025

(65) Prior Publication Data

US 2025/0372886 A1 Dec. 4, 2025

(30) Foreign Application Priority Data

May 30, 2024 (JP) ................................ 2024-088330

(51) Int. Cl.
*H01Q 21/06* (2006.01)
*H01Q 21/00* (2006.01)

(52) U.S. Cl.
CPC ....... *H01Q 21/062* (2013.01); *H01Q 21/0068* (2013.01)

(58) Field of Classification Search
None
See application file for complete search history.

(56) References Cited

U.S. PATENT DOCUMENTS 9,537,461 B2 * 1/2017 Boutayeb ............ H03H 7/0115
10,454,184 B2 * 10/2019 Boutayeb .............. H01Q 21/24
2022/0200145 A1 * 6/2022 Boutayeb ................. H01Q 3/22
2022/0328965 A1 * 10/2022 Chalabi .............. H01Q 21/0012
2022/0352640 A1 * 11/2022 Brandenburg ........... H01Q 1/32
2023/0099058 A1 * 3/2023 Ikegami ................. H01Q 15/22 343/767

(Continued)

FOREIGN PATENT DOCUMENTS

JP H05129831 A 5/1993
JP 2024104562 A 8/2024

OTHER PUBLICATIONS

Herranz-Herruzo, "Beam-Tilted All-Metal Radial-Line Slot Array Antenna with Uniform Spacing", EuCAP 2024, Mar. 2024.

(Continued)

*Primary Examiner* — Wilson Lee
(74) *Attorney, Agent, or Firm* — Holtz, Holtz & Volek PC

(57) ABSTRACT

According to one embodiment, an antenna device includes a waveguide including a feed point and a first region. The first region is around the feed point on a first plane crossing a first axis direction passing through the feed point. The waveguide includes a plurality of radiating portions provided in the first region. Each of the radiating portions includes a first slot extending along a first slot direction and a second slot extending along a second slot direction crossing the first slot direction. The radiating portions include first and second radiating portions. A first radiating portion direction from the feed point to the first radiating portion crosses the first axis direction. A second radiating portion direction from the feed point to the second radiating portion crosses the first axis direction and crosses the first radiating portion direction.

20 Claims, 26 Drawing Sheets

(56) References Cited

U.S. PATENT DOCUMENTS

| | | | | |
|---|---|---|---|---|
| 2023/0198160 | A1* | 6/2023 | Woolman | H01Q 15/242 343/702 |
| 2024/0072454 | A1* | 2/2024 | Hasan Abadi | H01Q 15/0086 |
| 2024/0213646 | A1* | 6/2024 | Wang | H01Q 15/04 |
| 2024/0250445 | A1* | 7/2024 | Sano | H01Q 13/26 |
| 2025/0079720 | A1* | 3/2025 | Zhou | H01Q 3/00 |
| 2025/0174911 | A1* | 5/2025 | Fonseca | H01Q 21/064 |

OTHER PUBLICATIONS

Koli, et al., "Increasing the Gain of Beam-Tilted Circularly Polarized Radial Line Slot Array Antennas", IEEE Transactions On Antennas and Propagation, vol. 70, No. 6, Jun. 2022.

* cited by examiner

ANTENNA DEVICE AND WIRELESS DEVICE

CROSS-REFERENCE TO RELATED APPLICATIONS

This application is based upon and claims the benefit of priority from Japanese Patent Application No. 2024-088330, filed on May 30, 2024; the entire contents of which are incorporated herein by reference.

FIELD

Embodiments described herein relate generally to an antenna device and a wireless device.

BACKGROUND

For example, improved characteristics are desired in antenna devices and wireless devices.

DETAILED DESCRIPTION

Figure 1A:
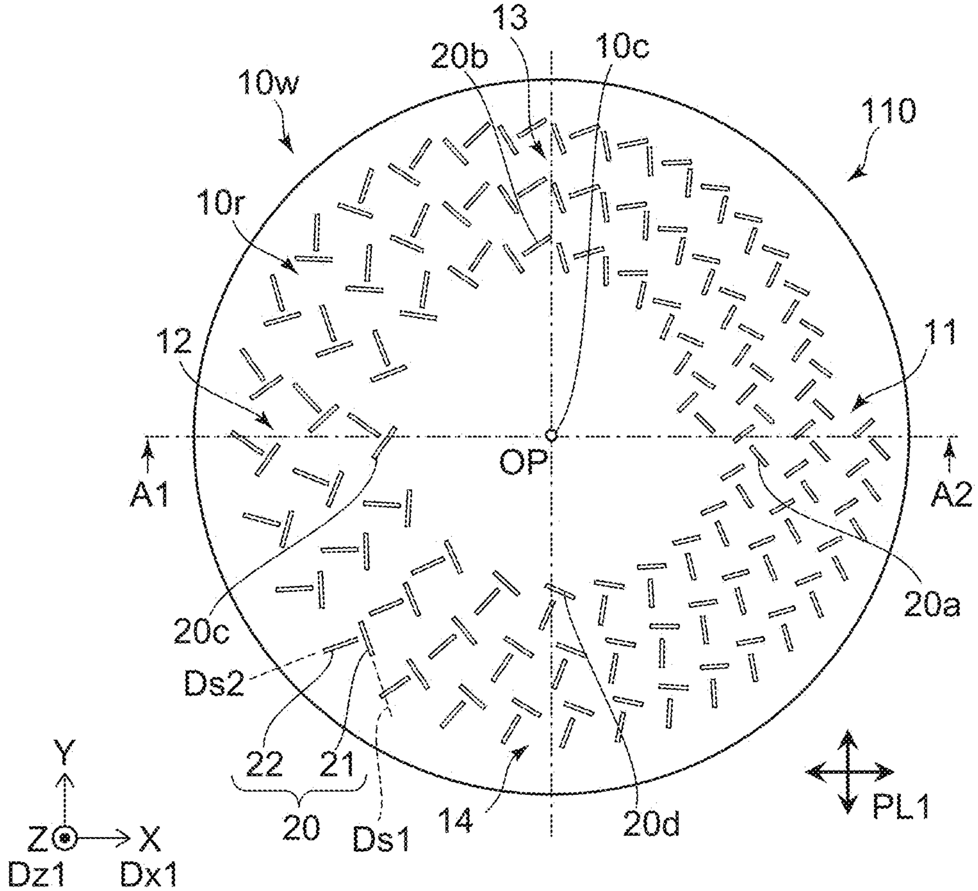
FIGS. 1A and 1B are schematic diagrams illustrating an antenna device according to a first embodiment.

According to one embodiment, an antenna device includes a waveguide including a feed point and a first region. The first region is around the feed point on a first plane crossing a first axis direction passing through the feed point. The waveguide includes a plurality of radiating portions provided in the first region. Each of the plurality of radiating portions includes a first slot extending along a first slot direction and a second slot extending along a second slot direction crossing the first slot direction. The plurality of radiating portions include a first radiating portion and a second radiating portion. A first radiating portion direction from the feed point to the first radiating portion crosses the first axis direction. A second radiating portion direction from the feed point to the second radiating portion crosses the first axis direction and crosses the first radiating portion direction. A second absolute value of a second angle difference between the first slot direction and the second radiating portion direction in the second radiating portion is smaller than a first absolute value of a first angle difference between the first slot direction and the first radiating portion direction in the first radiating portion.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
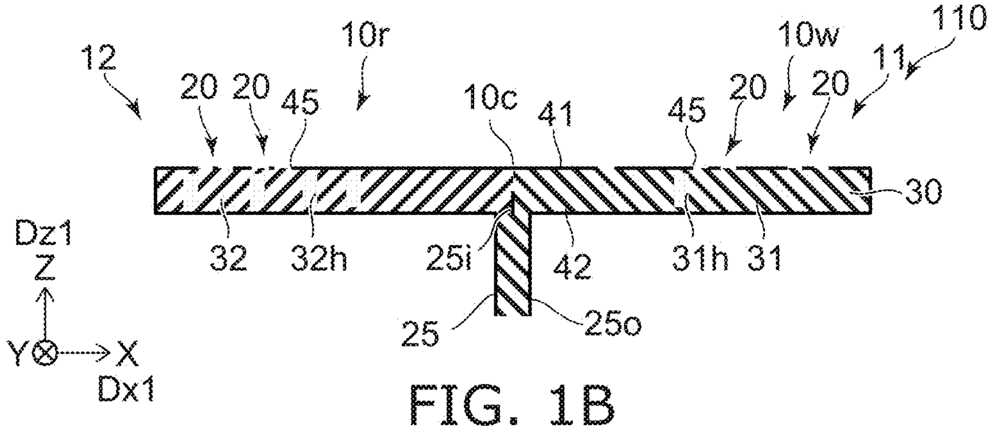

FIGS. 1A and 1B are schematic diagrams illustrating an antenna device according to a first embodiment.

FIG. 1A is a plan view. FIG. 1B is a cross-sectional view taken along the line A1-A2 in FIG. 1A.

Figure 2:
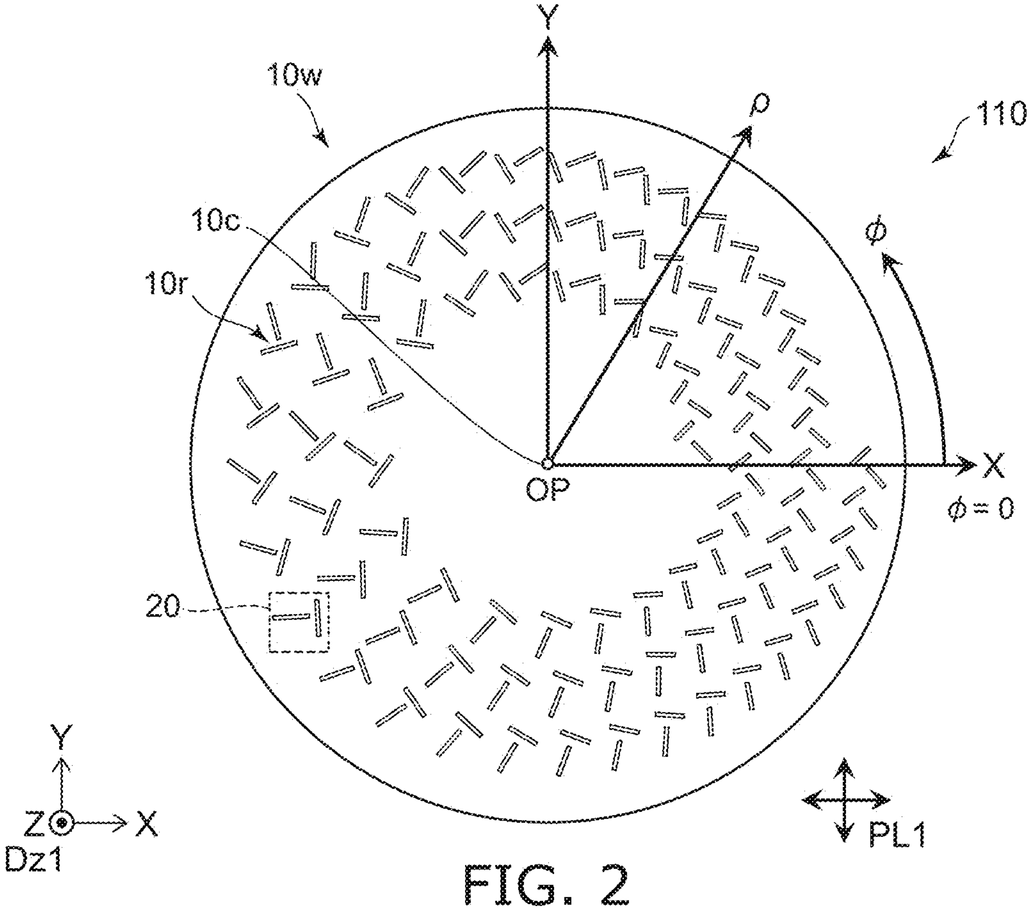
FIG. 2 is a schematic plan view illustrating the antenna device according to the first embodiment.

FIG. 2 is a schematic plan view illustrating the antenna device according to the first embodiment.

Figure 3:
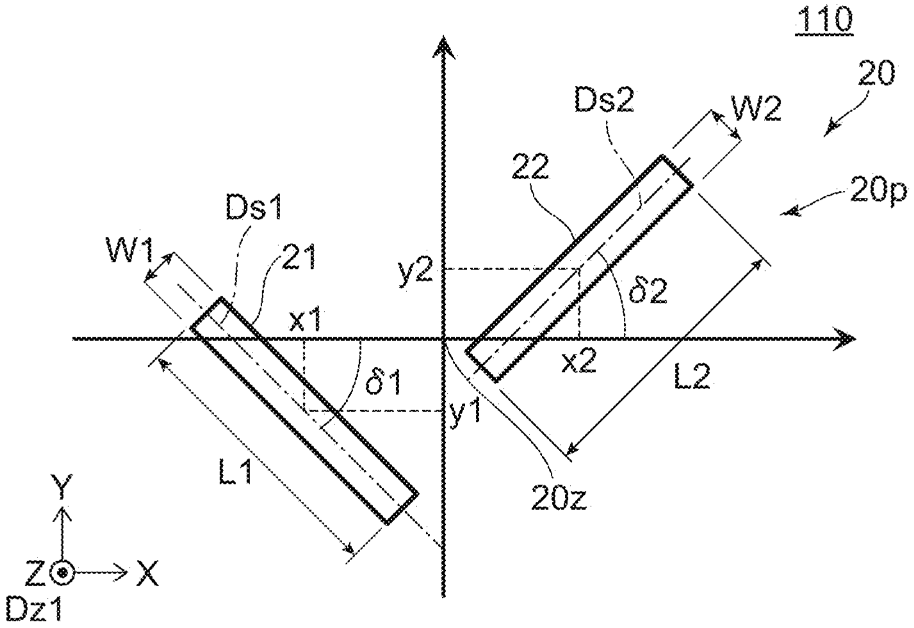
FIG. 3 is a schematic plan view illustrating a part of the antenna device according to the first embodiment.

FIG. 3 is a schematic plan view illustrating a part of the antenna device according to the first embodiment.

Figure 4:
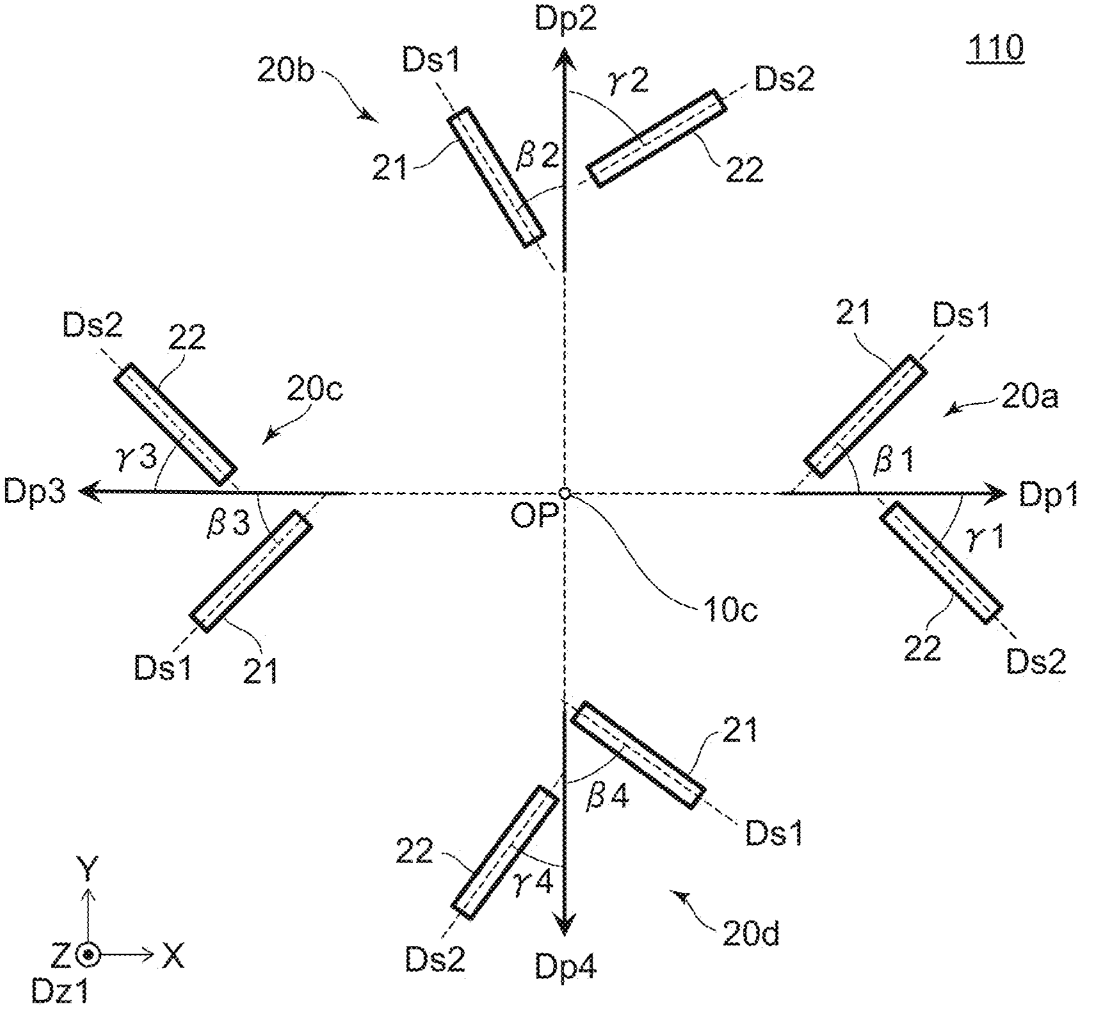
FIG. 4 is a schematic diagram illustrating the antenna device according to the first embodiment.

FIG. 4 is a schematic diagram illustrating the antenna device according to the first embodiment.

As shown in FIGS. 1A and 1B, an antenna device 110 according to an embodiment includes a waveguide 10*w*. The waveguide 10*w* includes a feed point 10*c* and a first region 10*r*. The first region 10*r* is planar. The first region 10*r* is located around the feed point 10*c*, for example, on a first plane PL1 crossing a first axis direction Dz1 passing through the feed point 10*c*. For example, the first region 10*r* is annular with the feed point 10*c* at a center.

The first axis direction Dz1 is defined as a Z-axis direction. One direction perpendicular to the Z-axis direction is defined as an X-axis direction. A direction perpendicular to the Z-axis and X-axis directions is defined as a Y-axis direction. In one example, the first plane PL1 is along the X-Y plane.

The waveguide 10*w* includes a plurality of radiating portions 20 provided in the first region 10*r*. For example, as shown in FIG. 1B, the waveguide 10*w* may include a first conductive layer 41. The first conductive layer 41 is along the first plane PL1. The first conductive layer 41 includes a plurality of openings 45. The plurality of openings 45 correspond to the plurality of radiating portions 20. As shown in FIG. 1B, the waveguide 10*w* may include a second conductive layer 42. A direction from the second conductive layer 42 to the first conductive layer 41 is along the Z-axis direction. A first member 30 may be provided between the second conductive layer 42 and the first conductive layer 41. The first member 30 includes, for example, a dielectric material.

In one example, a radio-frequency signal is input to the feed point 10*c* of the waveguide 10*w* via a coaxial line 25 (see FIG. 1B). For example, the coaxial line 25 includes an inner conductor 25*i* and an outer conductor 25*o* around the inner conductor 25*i*. The feed point 10*c* overlaps an end of the inner conductor 25*i* (signal line) in the Z-axis direction. The waveguide 10*w* is configured to guide the radio-frequency signal supplied to the feed point 10*c*. The radio-frequency signal supplied to the feed point 10*c* is radiated from the plurality of radiating portions 20.

As shown in FIG. 1A, each of the plurality of radiating portions 20 includes a first slot 21 and a second slot 22. The first slot 21 and the second slot 22 are included in one slot pair. The first slot 21 corresponds to one of the plurality of openings 45. The second slot 22 corresponds to another one of the plurality of openings 45.

FIG. 3 illustrates one of the plurality of radiating portions 20 (one slot pair 20*p*). The first slot 21 extends along a first slot direction Ds1. The second slot 22 extends along a second slot direction Ds2. The second slot direction Ds2 crosses the first slot direction Ds1. The second slot direction Ds2 may be substantially perpendicular to the first slot direction Ds1.

As shown in FIG. 2, an angle in a circumferential direction is defined as azimuth angle $\phi$. The circumferential direction is centered at the feed point 10*c* and is along the first plane PL1. A direction passing through the feed point 10*c* and is along the first plane PL1 is defined as a radial direction $\rho$. The feed point 10*c* corresponds to an origin OP of the coordinate system. In the following example, the azimuth angle $\phi$ is 0 at a positive X-axis direction.

As shown in FIG. 1A, the plurality of radiating portions 20 include a first radiating portion 20*a* and a second radiating portion 20*b*. As described below, the plurality of radiating portions 20 may further include a third radiating portion 20*c*. The plurality of radiating portions 20 may further include a fourth radiating portion 20*d*.

As shown in FIG. 4, a first radiating portion direction Dp1 from the feed point 10*c* to the first radiating portion 20*a* crosses the first axis direction Dz1. A second radiating portion direction Dp2 from the feed point 10*c* to the second radiating portion 20*b* crosses the first axis direction Dz1 and crosses the first radiating portion direction Dp1. The second radiating portion direction Dp2 may be substantially perpendicular to the first radiating portion direction Dp1. In the example of FIG. 4, the first radiating portion direction Dp1 corresponds to the positive X-axis direction. In the example of FIG. 4, the second radiating portion direction Dp2 corresponds to the positive Y-axis direction. In the example of FIG. 4, the azimuth angle $\phi$ is 0° in the first radiating portion 20*a*. The azimuth angle $\phi$ is 90° in the second radiating portion 20*b*.

As shown in FIG. 4, a difference in angle between the first slot direction Ds1 and the first radiating portion direction Dp1 in the first radiating portion 20*a* is defined as a first angle difference $\beta$1. A difference in angle between the first slot direction Ds1 and the second radiating portion direction Dp2 in the second radiating portion 20*b* is defined as a second angle difference $\beta$2. In the embodiment, a second absolute value of the second angle difference $\beta$2 is smaller than a first absolute value of the first angle difference $\beta$1. Such a configuration makes it possible to provide an antenna device capable of improving characteristics.

For example, the antenna device may be used to transmit and receive electromagnetic waves along a direction tilted with respect to the Z-axis direction. In the characteristics of the antenna device for such an application, anisotropy is provided in the first plane PL1. For example, the configuration of the first member 30 at a position where the azimuth angle $\phi$ is 0° differs from the configuration of the first member 30 at a position where the azimuth angle $\phi$ is different from 0°. This allows electromagnetic waves to be transmitted and received in a tilted direction. In the embodiment, the above-mentioned angle difference configuration makes it possible to efficiently transmit and receive electromagnetic waves in a tilted direction while maintaining, for example, high guiding characteristics.

For example, when transmitting and receiving electromagnetic waves in a tilted direction, the equiphase surface becomes a flattened circle (e.g., an ellipse). In the embodiment, the above-mentioned angle difference configuration can maintain, for example, high guiding characteristics.

In a first reference example, the second absolute value of the second angle difference $\beta$2 is the same as the first absolute value of the first angle difference $\beta$1. In the first reference example, the directions of the plurality of radiating portions 20 are rotated in conjunction with (proportional to)

the azimuth angle ϕ. In the first reference example, differences in characteristics occur in the plurality of radiating portions 20. For example, the characteristics of the first slot 21 and the characteristics of the second slot 22 become non-uniform among the plurality of radiating portions 20. In the first reference example, the bandwidth becomes narrower and the polarization characteristics deteriorate.

In contrast, in the embodiment, the second absolute value of the second angle difference β2 is smaller than the first absolute value of the first angle difference β1. For example, in the second radiating portion 20*b* at a position where the azimuth angle ϕ is 90°, the rotation angle of the second radiating portion 20*b* is smaller than 90°. Thereby, the difference in characteristics among the plurality of radiating portions 20 can be reduced. For example, the non-uniformity between the characteristics of the first slot 21 and the characteristics of the second slot 22 among the plurality of radiating portions 20 is suppressed. According to the embodiment, for example, a wide bandwidth can be maintained. For example, deterioration of the polarization characteristics can be suppressed. Examples of the characteristics of the antenna device 110 will be described later.

As shown in FIG. 4, the plurality of radiating portions 20 may further include the third radiating portion 20*c*. A third radiating portion direction Dp3 from the feed point 10*c* to the third radiating portion 20*c* crosses the first axis direction Dz1 and crosses the second radiating portion direction Dp2. The feed point 10*c* is located between the third radiating portion 20*c* and the first radiating portion 20*a* in a direction along the first radiating portion direction Dp1. The feed point 10*c* is located between the third radiating portion 20*c* and the first radiating portion 20*a* in a direction along the third radiating portion direction Dp3.

As shown in FIG. 4, the plurality of radiating portions 20 may further include the fourth radiating portion 20*d*. A fourth radiating portion direction Dp4 from the feed point 10*c* to the fourth radiating portion 20*d* crosses the first axis direction Dz1 and crosses the first radiating portion direction Dp1. The feed point 10*c* is located between the fourth radiating portion 20*d* and the second radiating portion 20*b* in a direction along the second radiating portion direction Dp2. The feed point 10*c* is located between the fourth radiating portion 20*d* and the second radiating portion 20*b* in a direction along the fourth radiating portion direction Dp4.

The angle difference between the first slot direction Ds1 and the radiating portion direction in each of the plurality of radiating portions 20 is defined as angle difference β0.

Figure 5A:
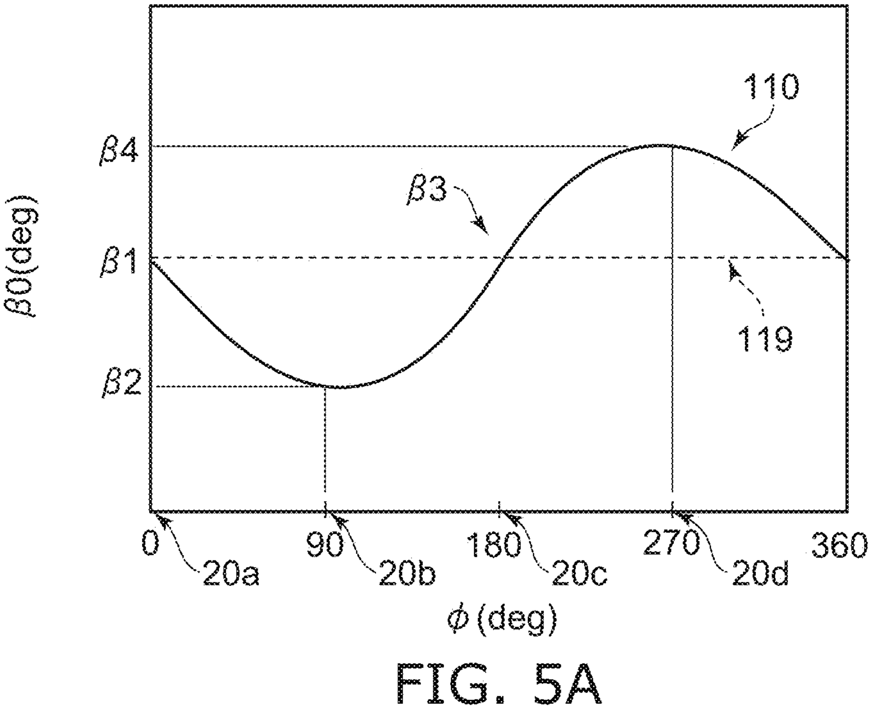
FIGS. 5A and 5B are graphs illustrating the antenna device according to the first embodiment.
Figure 5B:
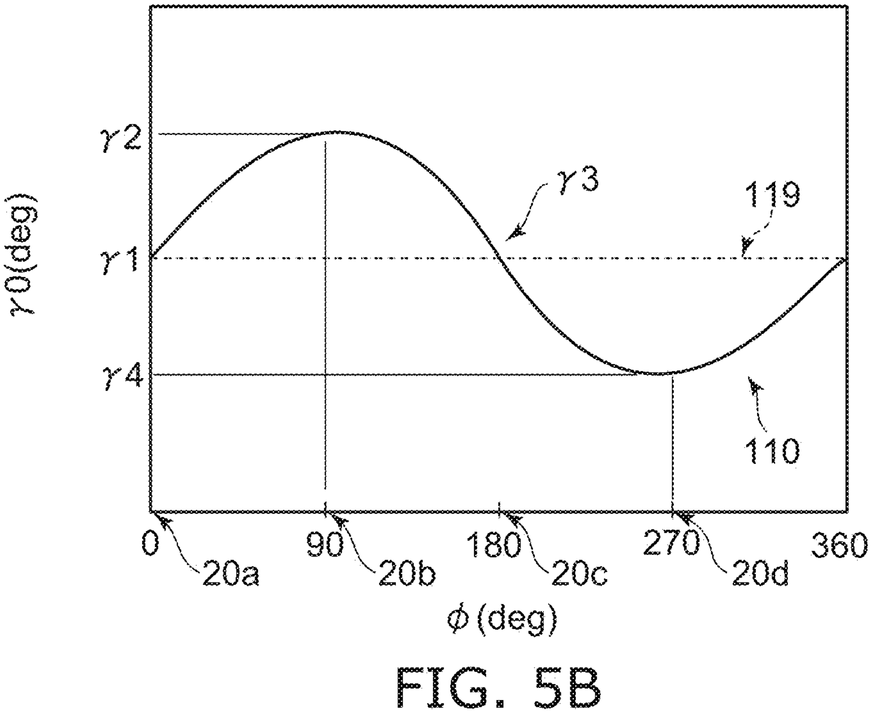

FIGS. 5A and 5B are graphs illustrating the antenna device according to the first embodiment.

The horizontal axis of these figures is the azimuth angle ϕ. The vertical axis of FIG. 5A is the angle difference β0. In FIG. 5A, an azimuth angle ϕ of 0° corresponds to the first radiating portion 20*a*. An azimuth angle ϕ of 90° corresponds to the second radiating portion 20*b*. An azimuth angle ϕ of 180° corresponds to the third radiating portion 20*c*. An azimuth angle ϕ of 270° corresponds to the fourth radiating portion 20*d*.

As shown in FIG. 5A, in the antenna device 110 according to the embodiment, the second absolute value of the second angle difference β2 corresponding to the second radiating portion 20*b* is smaller than the first absolute value of the first angle difference β1 corresponding to the first radiating portion 20*a*. A third absolute value of the third angle difference β3 corresponding to the third radiating portion 20*c* is larger than the second absolute value of the second angle difference β2. The third angle difference β3 may be substantially the same as the first angle difference β1. A fourth absolute value of the fourth angle difference β4 corresponding to the fourth radiating portion 20*d* is larger than the first absolute value of the first angle difference β1. The fourth absolute value of the fourth angle difference β4 is larger than the third absolute value of the third angle difference β3.

As shown in FIG. 5A, in the antenna device 119 (dashed line) of the above first reference example, the angle difference β0 remains constant even if the azimuth angle ϕ changes.

In the antenna device 110, in the radiating portion 20 at a position where the azimuth angle ϕ is between the azimuth angle ϕ of the first radiating portion 20*a* and the azimuth angle ϕ of the second radiating portion 20*b*, the angle difference β0 may be between the first angle difference β1 and the second angle difference β2. In the radiating portion 20 at a position where the azimuth angle ϕ is between the azimuth angle ϕ of the second radiating portion 20*b* and the azimuth angle ϕ of the third radiating portion 20*c*, the angle difference β0 may be between the second angle difference β2 and the third angle difference β3. In the radiating portion 20 at a position where the azimuth angle ϕ is between the azimuth angle ϕ of the third radiating portion 20*c* and the azimuth angle ϕ of the fourth radiating portion 20*d*, the angle difference β0 may be between the third angle difference β3 and the fourth angle difference β4. In the radiating portion 20 in a position where the azimuth angle ϕ is between the azimuth angle ϕ of the fourth radiating portion 20*d* and the azimuth angle ϕ of the first radiating portion 20*a*, the angle difference β0 may be between the fourth angle difference β4 and the first angle difference β1.

As shown in FIG. 4, an angle difference between the second slot direction Ds2 and the first radiating portion direction Dp1 in the first radiating portion 20*a* is defined as a first angle difference γ1. An angle difference between the second slot direction Ds2 and the second radiating portion direction Dp2 in the second radiating portion 20*b* is defined as a second angle difference γ2. An angle difference between the second slot direction Ds2 and the third radiating portion direction Dp3 in the third radiating portion 20*c* is defined as a third angle difference γ3. An angle difference between the second slot direction Ds2 and the fourth radiating portion direction Dp4 in the fourth radiating portion 20*d* is defined as a fourth angle difference γ4.

An angle difference between the second slot direction Ds2 and the radiating portion direction in each of the plurality of radiating portions 20 is defined as another angle difference γ0.

The vertical axis of FIG. 5B is the other angle difference γ0. In FIG. 5B, the azimuth angle ϕ of 0° corresponds to the first radiating portion 20*a*. The azimuth angle ϕ of 90° corresponds to the second radiating portion 20*b*. The azimuth angle ϕ of 180° corresponds to the third radiating portion 20*c*. The azimuth angle ϕ of 270° corresponds to the fourth radiating portion 20*d*.

As shown in FIG. 5B, the second other angle difference γ2 in the second radiating portion 20*b* is larger than the first other angle difference γ1 corresponding to the first radiating portion 20*a*. The third other angle difference γ3 in the third radiating portion 20*c* is smaller than the second other angle difference γ2. The third other angle difference γ3 may be substantially the same as the first other angle difference γ1. The fourth other angle difference γ4 in the fourth radiating portion 20*d* is smaller than the first other angle difference γ1. The fourth other angle difference γ4 is smaller than the third other angle difference γ3.

In the antenna device 110, in the radiating portion 20 at a position where the azimuth angle ϕ is between the azimuth angle ϕ of the first radiating portion 20*a* and the azimuth angle ϕ of the second radiating portion 20*b*, the other angle difference γ0 may be between the first other angle difference γ1 and the second other angle difference γ2. In the radiating portion 20 at a position where the azimuth angle ϕ is between the azimuth angle ϕ of the second radiating portion 20*b* and the azimuth angle ϕ of the third radiating portion 20*c*, the other angle difference γ0 may be between the second other angle difference γ2 and the third other angle difference γ3. In the radiating portion 20 at a position where the azimuth angle ϕ is between the azimuth angle ϕ of the third radiating portion 20*c* and the azimuth angle ϕ of the fourth radiating portion 20*d*, the other angle difference γ0 may be between the third other angle difference γ3 and the fourth other angle difference γ4. In the radiating portion 20 where the azimuth angle ϕ is between the azimuth angle ϕ of the fourth radiating portion 20*d* and the azimuth angle ϕ of the first radiating portion 20*a*, the other angle difference γ0 may be between the fourth other angle difference γ4 and the first other angle difference γ1.

In the embodiment, for example, the sum of the angle difference β0 and the other angle difference γ0 may be substantially 90°. For example, the sum of the first angle difference β1 and the first other angle difference γ1 may be not less than 80° and not more than 100°. For example, the sum of the second angle difference β2 and the second other angle difference γ2 may be not less than 80° and not more than 100°. For example, the sum of the third angle difference β3 and the third other angle difference γ3 may be not less than 80° and not more than 100°. For example, the sum of the fourth angle difference β4 and the fourth other angle difference γ4 may be not less than 80° and not more than 100°.

Figure 6A:
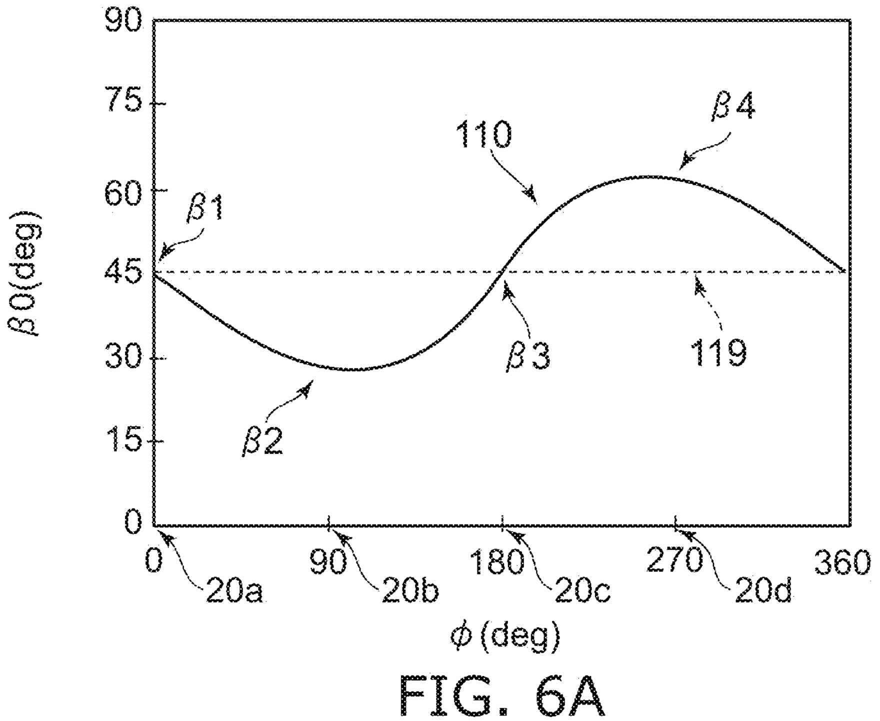
FIGS. 6A and 6B are graphs illustrating the antenna device according to the first embodiment.
Figure 6B:
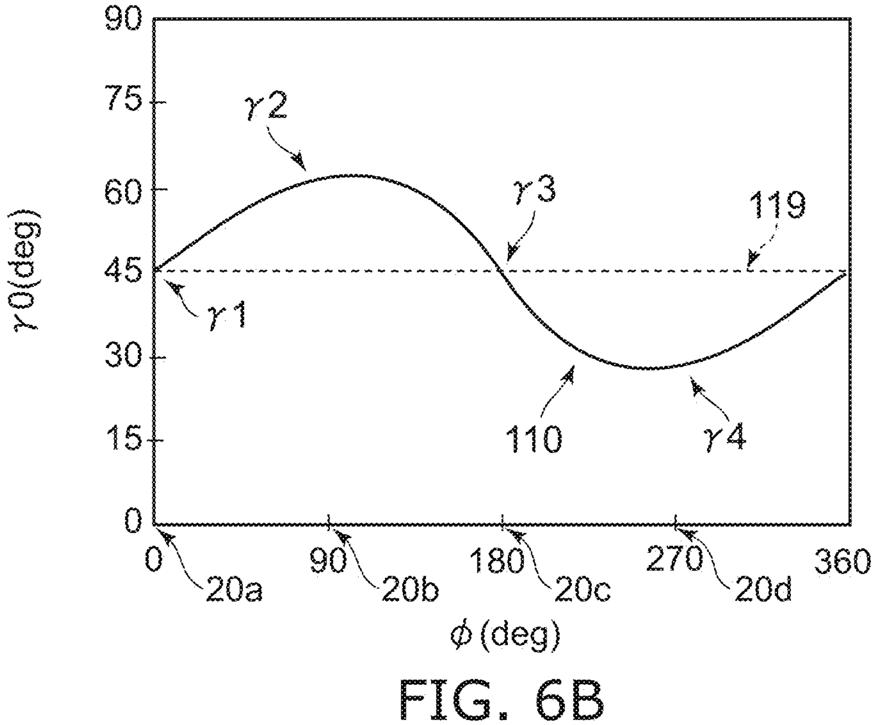

FIGS. 6A and 6B are graphs illustrating the antenna device according to the first embodiment.

The horizontal axis of these figures is the azimuth angle ϕ. The vertical axis of FIG. 6A is the angle difference β0. As shown in FIG. 6A, each of the first angle difference β1 and the third angle difference β3 may be substantially 45°. The second angle difference β2 may be approximately 30°. The fourth angle difference β4 may be approximately 60°.

As shown in FIG. 6B, each of the first other angle difference γ1 and the third other angle difference γ3 may be substantially 45°. The second other angle difference γ2 may be approximately 60°. The fourth other angle difference γ4 may be approximately 30°.

As shown in FIG. 1A, in the embodiment, the first region 10*r* may include a first partial region 11 and a second partial region 12. The feed point 10*c* is located between the second partial region 12 and the first partial region 11 in a first crossing direction Dx1 crossing the first axis direction Dz1. The first crossing direction Dx1 may be, for example, the X-axis direction. For example, the guiding characteristics in the first partial region 11 are different from the guiding characteristics in the second partial region 12. As a result, electromagnetic waves are radiated in a direction inclined with respect to the Z-axis direction.

In the embodiment, for example, the waveguide 10*w* includes the first member 30. As shown in FIG. 1A, the first member 30 includes a first member region 31 and a second member region 32. The first member region 31 corresponds to the first partial region 11. The second member region 32 corresponds to the second partial region 12. The first member region 31 and the second member region 32 may satisfy at least one of the first condition, the second condition, the third condition, the fourth condition, or the fifth condition.

In the first condition, a first relative dielectric constant of the first member region 31 is different from a second relative dielectric constant of the second member region 32. In the second condition, a density of first holes 31*h* included in the first member region 31 is different from a density of second holes 32*h* included in the second member region 32 (see FIG. 1B).

In the third condition, a first average size of the plurality of first holes 31*h* included in the first member region 31 is different from a second average size of the plurality of second holes 32*h* included in the second member region 32. In the fourth condition, a first configuration of a first structure provided in the first member region 31 is different from a second configuration of a second structure provided in the second member region 32. The first configuration and the second configuration may include, for example, surface irregularities.

In the fifth condition, a thickness of the first member 30 included in the first member region 31 is different from a thickness of the first member 30 included in the second member region 32. The thickness is the length along the first axis direction Dz1. A slow-wave structure may be provided according to such first to fifth conditions. By the slow-wave structure, transmitting and receiving electromagnetic waves in a tilted direction can be performed. In the embodiment, for example, even when such first to fifth conditions are applied, it is possible to improve the characteristics.

As shown in FIG. 3, a length of the first slot 21 along the first slot direction Ds1 is defined as a first slot length L1. A length of the first slot 21 along the direction perpendicular to the first slot direction Ds1 is defined as a first slot width W1. A first slot length L1 is longer than the first slot width W1. For example, the first slot length L1 may be 1.5 times or more the first slot width W1. A length of the second slot 22 along the second slot direction Ds2 is defined as a second slot length L2. The length of the second slot 22 along the direction perpendicular to the second slot direction Ds2 is defined as a second slot width W2. The second slot length L2 is longer than the second slot width W2. For example, the second slot length L2 may be 1.5 times or more the second slot width W2.

For example, the first slot 21 included in the first radiating portion 20*a* has the first slot length L1 along the first slot direction Ds1. The second slot 22 included in the first radiating portion 20*a* has the second slot length L2 along the second slot direction Ds2. A ratio of an absolute value of a difference between the first slot length L1 and the second slot length L2 to the first slot length L1 may be 0.1 or less. For example, the second slot length L2 may be substantially the same as the first slot length L1. The second slot width W2 may be substantially the same as the first slot width W1.

As shown in FIG. 3, in one of the plurality of radiating portions 20 (one slot pair 20*p*), an angle between one direction (e.g., the X-axis direction) and the first slot direction Ds1 is defined as a first slot angle δ1. In one of the plurality of radiating portions 20 (one slot pair 20*p*), an angle between the one direction (e.g., the X-axis direction) and the second slot direction Ds2 is defined as a second slot angle δ2. For example, a ratio of a difference between an absolute value of the first slot angle δ1 and an absolute value of the second slot angle δ2 to the absolute value of the first slot angle δ1 may be 0.1 or less. For example, the absolute value of the second slot angle δ2 may be substantially the same as the absolute value of the first slot angle δ1. For example, the angle between the first slot direction Ds1 and the second slot direction Ds2 may be not less than 80° and not more than 100° (e.g., substantially 90°).

In the embodiment, a radio-frequency signal may be supplied to the feed point 10*c*, for example, via a waveguide. The radio-frequency signal may be supplied to the feed point 10*c*, for example, by electromagnetic coupling from another circuit not included in the antenna device.

Figure 7A:
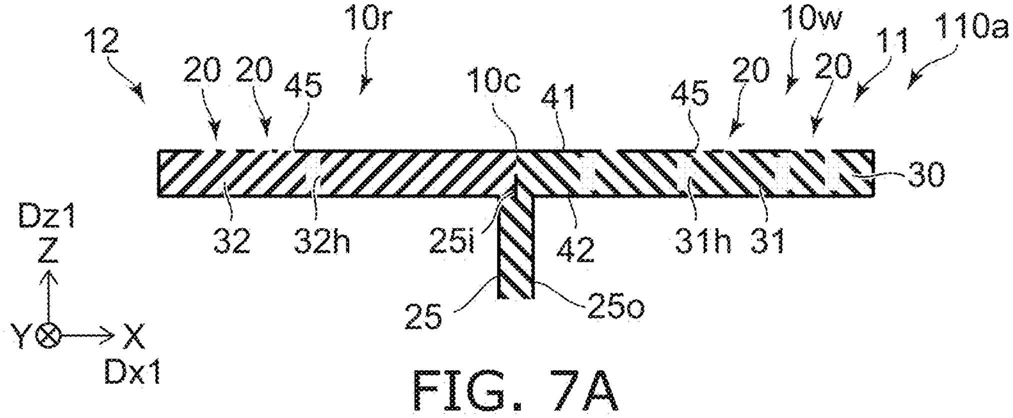
FIGS. 7A to 7C are schematic cross-sectional views illustrating an antenna device according to the first embodiment.
Figure 7B:
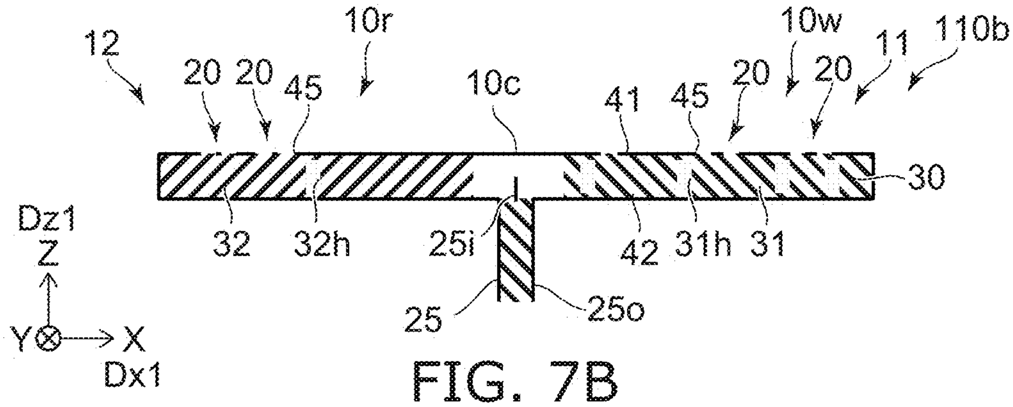
Figure 7C:
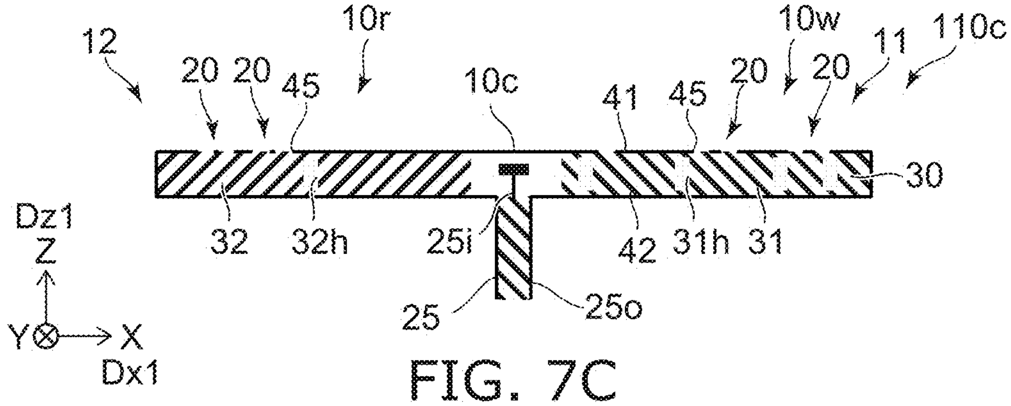

FIGS. 7A to 7C are schematic cross-sectional views illustrating an antenna device according to the first embodiment.

As shown in FIG. 7A, in an antenna device 110*a* according to the embodiment, the outer conductor 250 of the coaxial line 25 is electrically connected to the second conductive layer 42 of the waveguide 10*w*. The inner conductor 25*i* of the coaxial line 25 is inserted into the waveguide 10*w*. For example, impedance matching can be obtained by changing the insertion length of the inner conductor 25*i*. To insert the inner conductor 25*i*, a hole having a diameter approximately the same as that of the inner conductor 25*i* may be provided in the first member 30.

As shown in FIG. 7B, in an antenna device 110*b* according to the embodiment, the first member 30 is not provided locally in a part of the periphery of the inner conductor 25*i*. For example, impedance matching can be obtained by controlling the length (size) of the area where the first member 30 is not provided.

As shown in FIG. 7C, in an antenna device 110*c* according to the embodiment, the shape of the end of the inner conductor 25*i* is different from that in the antenna device 110*b*. Impedance matching is obtained.

Figure 8A:
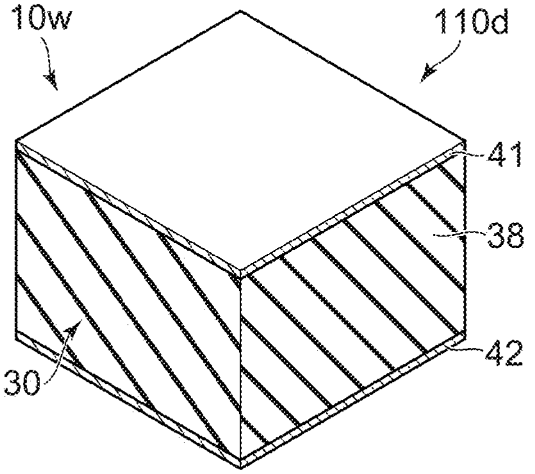
FIGS. 8A and 8B are schematic perspective views illustrating a part of the antenna device according to the first embodiment.
Figure 8B:
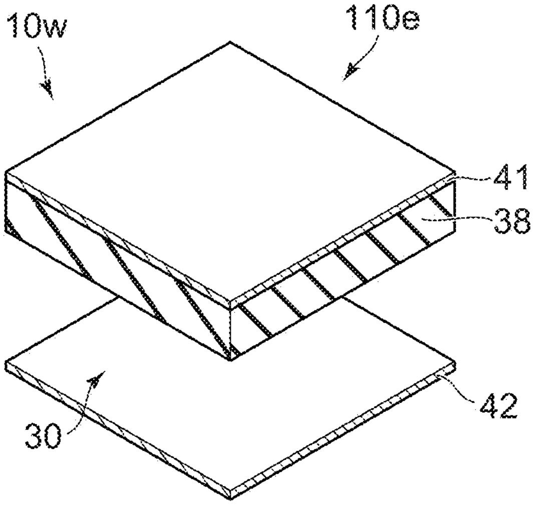

FIGS. 8A and 8B are schematic perspective views illustrating a part of the antenna device according to the first embodiment.

These figures illustrate a part of the waveguide 10*w*. As shown in FIG. 8A, in an antenna device 110*d* according to the embodiment, the first member 30 includes a dielectric 38. For example, the guided wavelength in the waveguide 10*w* changes depending on the relative dielectric constant of the dielectric 38. The relative dielectric constant is defined as $\varepsilon_r$. The wavelength in free space is $\lambda_0$. The guided wavelength $\lambda_g$ of the waveguide 10*w* is expressed as $\lambda_g=\lambda_0/(\varepsilon_r)^{1/2}$.

When the waveguide 10*w* is a waveguide tube, the guided wavelength also changes depending on the tube width of the waveguide. In addition to the relative dielectric constant, the tube width may be changed, thereby adjusting the guided wavelength. Even when the relative dielectric constant of the dielectric 38 is substantially 1, the first member 30 may be considered to be a slow-wave structure.

As shown in FIG. 8B, in an antenna device 110*e* according to the embodiment, the dielectric 38 is provided in a part of the waveguide 10*w*. As in the example of FIG. 8B, a gap may be provided between at least a part of the dielectric 38 and the first conductive layer 41. When the dielectric 38 is provided partially, the guided wavelength is controlled by controlling the filling rate of the dielectric 38. For example, the dielectric 38 being partially filled may be in contact with the first conductive layer 41. The dielectric 38 being partially filled may be in contact with the second conductive layer 42.

The dielectric 38 may include plurality of different dielectric portions that differ in structure or composition. For example, dielectric 38 may include plurality of dielectric portions that differ in relative dielectric constant. The fill factor of one of the plurality of dielectric portions may be different from the fill factor of another of the plurality of dielectric portions. The material of one of the plurality of dielectric portions may be the same as the material of another of the plurality of dielectric portions.

The first member 30 may include, for example, a metamaterial. In a metamaterial, for example, structures including a dielectric or a metal are arranged periodically. When the first member 30 includes a metamaterial, the slow wave ratio of the waveguide 10*w* may partially be a value of 1 or more, or a negative value.

The density of the dielectric 38 may be changed to change the effective dielectric constant. By changing the density of the dielectric 38, for example, it is possible to control the distribution of the dielectric constant using one type of dielectric 38. For example, it is possible to change the density of the dielectric 38 by providing holes in the dielectric 38. For example, the dielectric 38 may be printed by a 3D printer while changing the filling rate of the dielectric 38. This allows the density of the dielectric 38 to be changed.

The thickness of the dielectric 38 may be changed to change the effective dielectric constant. By changing the thickness of the dielectric 38, for example, it is possible to control the distribution of the dielectric constant while using one type of dielectric 38. The thickness of the dielectric 38 may be changed substantially continuously. The thickness of the dielectric 38 may be changed substantially discretely. For example, the thickness of the dielectric 38 may be changed continuously by machining the dielectric 38. For example, the thickness of the dielectric 38 may be changed discretely by printing the dielectric 38 with a 3D printer.

For example, with such a configuration, at least one of the first to fifth conditions above may be provided. With such a first member 30, the guided wavelength can be easily controlled. A wide control range of guided wavelengths can be obtained.

For example, with the above configuration, electromagnetic waves are transmitted and received along a direction inclined (tilted) with respect to the Z-axis direction. For example, this is based on the anisotropy of the guided wavelength within the first plane PL1.

As already explained, the first region 10*r* includes the first partial region 11 and the second partial region 12 (see FIG. 1A). The feed point 10*c* is between the first partial region 11 and the second partial region 12 in the first crossing direction Dx1 crossing the first axial direction Dz1. A first guided wavelength λ1 in the waveguide 10*w* in the first partial region 11 is different from a second guided wavelength λ2 in the waveguide 10*w* in the second partial region 12. For example, the first guided wavelength λ1 is shorter than the second guided wavelength λ2.

The first guided wavelength λ1 is the wavelength of the radio-frequency signal propagating in a direction from the feed point 10*c* to the first partial region 11. The second guided wavelength λ2 is the wavelength of the radio-frequency signal propagating in a direction from the feed point 10*c* to the second partial region 12.

When the first guided wavelength λ1 is shorter than the second guided wavelength λ2, the radiated electromagnetic wave tilts in a direction inclined from the first axial direction Dz1 toward the first partial region 11. For example, the projection direction of the main radiation direction of the electromagnetic wave onto the waveguide 10*w* is along the direction from the second partial region 12 to the first partial region 11.

When the waveguide 10*w* includes the first member 30, a first slow wave factor in the first partial region 11 of the first member 30 is different from a second slow wave factor in the second partial region 12 of the first member 30. For example, the first slow wave factor is lower than the second slow wave factor. For example, the effective dielectric constant in the first partial region 11 is higher than the effective dielectric constant in the second partial region 12. For example, the dielectric constant in the first partial region 11 may be higher than the dielectric constant in the second partial region 12.

As shown in FIG. 1A, the first region 10*r* may include a third partial region 13 and a fourth partial region 14. The feed point 10*c* is between the third partial region 13 and the fourth partial region 14. A direction from the feed point 10*c* to the third partial region 13 crosses the direction from the feed point 10*c* to the first partial region 11. A direction from the feed point 10*c* to the fourth partial region 14 crosses the direction from the feed point 10*c* to the first partial region 11. An angle between the direction from the feed point 10*c* to the third partial region 13 and the direction from the feed point 10*c* to the first partial region 11 may be substantially 90°. The angle between the direction from the feed point 10*c* to the fourth partial region 14 and the direction from the feed point 10*c* to the first partial region 11 may be substantially 90°.

For example, a third guided wavelength λ3 in the waveguide in the third partial region 13 is longer than the first guided wavelength λ1 and shorter than the second guided wavelength λ2. A fourth guided wavelength λ4 in the waveguide in the fourth partial region 14 is longer than the first guided wavelength λ1 and shorter than the second guided wavelength λ2. For example, a high degree of design freedom can be maintained in the third partial region 13 and the fourth partial region 14. The performance of the antenna can be improved. For example, the effective dielectric constant in the third partial region 13 may be between the effective dielectric constant in the first partial region 11 and the effective dielectric constant in the second partial region 12. For example, the effective dielectric constant in the fourth partial region 14 may be between the effective dielectric constant in the first partial region 11 and the effective dielectric constant in the second partial region 12.

For example, in a radial line slot antenna, a waveguide and plurality of slots are provided. Such a waveguide is a radial waveguide. The radial waveguide is substantially circular. The plurality of slots function as radiating elements. The plurality of slots are arranged in a spiral or concentric pattern.

In general, in a radial line slot antenna, the slot pairs are rotated at an angle proportional to the circumferential angle (azimuth angle ϕ) of the line connecting the feed point and the plurality of slot pairs. In a radial waveguide in which the retardation rate in the waveguide is uniform in the circumferential direction, the equiphase surface of the radio-frequency signal propagating in the waveguide is substantially concentric. The line connecting the feed point and the plurality of slot pairs is substantially orthogonal to the equiphase surface of the radio-frequency signal propagating in the waveguide at each position of the plurality of slot pairs. In this case, the angle between the equiphase surface of the radio-frequency signal excited by each of the plurality of slot pairs and the plurality of slots is constant regardless of the position on the waveguide.

On the other hand, there is a radial waveguide in which the slow wave factor in the waveguide varies depending on the circumferential angle (azimuth angle ϕ) on the waveguide. In this case, the slow wave factor in the waveguide is non-uniform in the circumferential direction. In this case, the equiphase surface of the radio-frequency signal propagating in the waveguide is substantially elliptical. In this case, the angle between the line connecting the feed point and each of the plurality of slots and the equiphase surface of the radio-frequency signal changes according to the azimuth angle ϕ. In this situation, in the first reference example, the angle of the slot pair is made proportional to the azimuth angle ϕ. In the first reference example, the angle between the equiphase surface of the radio-frequency signal that excites each of the plurality of slots and each of the plurality of slots changes according to the azimuth angle ϕ. The radiation characteristics of the slot change according to the angle between the equiphase surface of the propagating wave and the direction in which the slot extends. Therefore, in the first reference example, differences in characteristics occur between the plurality of slots. If differences in characteristics occur between the plurality of slots, for example, the bandwidth of the antenna becomes narrower. If a difference occurs, for example, the polarization characteristics will deteriorate. For example, if an attempt is made to compensate for the difference in characteristics by changing the shape of the slot, the design will become complicated.

In the embodiment, for example, the second absolute value of the second angle difference β2 is different from the first absolute value of the first angle difference β1. The angle difference β0 is changed according to the azimuth angle ϕ (see, for example, FIG. 5A). Thereby, a wider bandwidth than when the angle difference β0 is constant regardless of the azimuth angle ϕ (first reference example) is remained, for example. For example, it is possible to maintain high polarization characteristics. For example, the design is simple.

With this configuration, the angle between the straight line connecting the feed point and each of the plurality of slots and the equiphase surface of the radio-frequency signal can be made substantially constant for each of the plurality of slots. This suppresses the difference in characteristics between the plurality of slots. The radiation characteristics of the antenna device are improved. There is no need to design a radiating element to compensate for the difference in characteristics. The design of the radiating element is simplified.

In the embodiment, the configuration of the plurality of radiating portions 20 can be modified in various ways. For example, the shape of the first slot 21 may be different from the shape of the second slot 22. In each of these slots, the corners may be curved. Each of these slots may be, for example, bowtie shaped. Each of these slots may be formed, for example, by etching the first conductive layer 41. The plurality of radiating portions 20 may be formed, for example, by cutting the first conductive layer 41 with a machine tool.

In the embodiment, the first guided wavelength λ1 is shorter than the second guided wavelength λ2. In this way, the guided wavelength (e.g., in-guide wavelength) varies in the plane of the first region 10*r*. Thereby, the radiation direction of the electromagnetic waves radiated from the plurality of radiating portions 20 becomes to be tilted with respect to the Z-axis direction without changing the spacing between the plurality of radiating portions 20. This, for example, suppresses grating lobes. For example, high efficiency can be maintained. For example, high design freedom can be maintained. By the high design freedom, the performance of the antenna is improved. According to the embodiment, it is possible to provide an antenna device with improved characteristics. In the embodiment, the spacing between the plurality of radiating portions 20 may be changed in the plane.

Hereinafter, examples of the configuration of the antenna device will be described.

Figure 9:
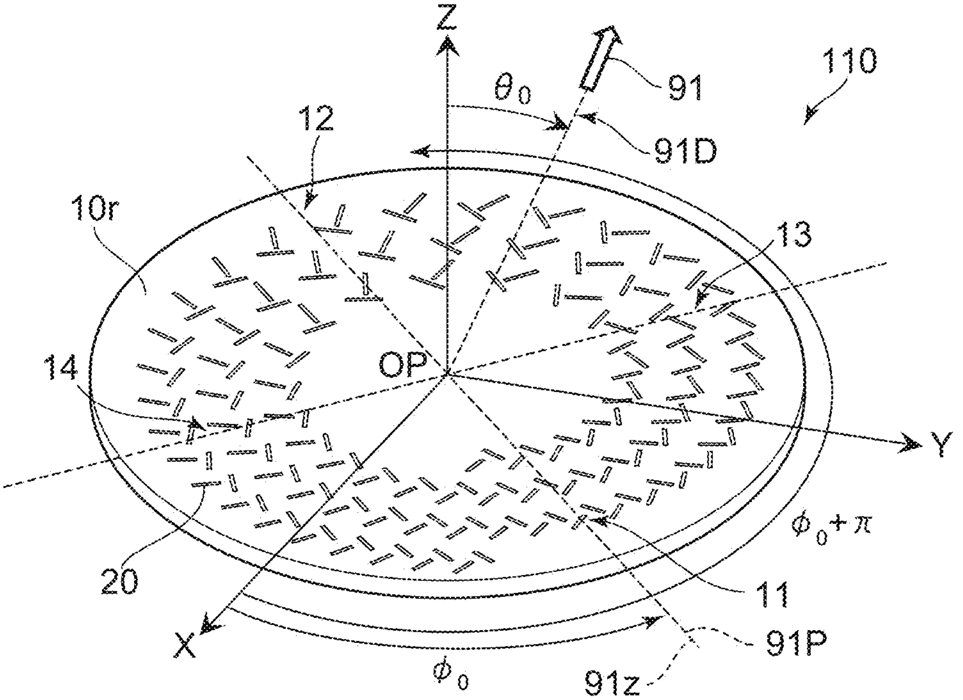
FIG. 9 is a schematic perspective view illustrating the antenna device according to the first embodiment.

FIG. 9 is a schematic perspective view illustrating the antenna device according to the first embodiment.

As shown in FIG. 9, an X-axis and a Y-axis can be set. The origin OP of these axes corresponds to the feed point 10*c*. As shown in FIG. 9, the X-axis and the Y-axis are along the first region 10*r*. The Y-axis is perpendicular to the X-axis. The X-axis may be a reference axis. The angle between the direction from the feed point 10*c* to the first partial region 11 and the X-axis is set as an angle $\phi_0$. The angle $\phi_0$ corresponds to the angle in the circumferential direction (direction of the azimuth angle $\phi$) of the direction from the feed point 10*c* to the first partial region 11 with respect to the X-axis. The angle between the direction from the feed point 10*c* to the second partial region 12 and the X-axis corresponds to the angle ($\phi_0$+180°).

For example, the first guided wavelength λ1 corresponds to the guided wavelength in the direction of the angle $\phi_0$. The second guided wavelength λ2 corresponds to the guided wavelength in the direction of the angle ($\phi_0$+180°).

For example, the third guided wavelength λ3 corresponds to the guided wavelength in the direction of the angle ($\phi_0$+90°). The fourth guided wavelength λ4 corresponds to the guided wavelength in the direction of the angle ($\phi_0$−90°).

The plurality of radiating portions 20 are capable of radiating a first electromagnetic wave 91. The first electromagnetic wave 91 corresponds to a radio-frequency signal propagating through the waveguide 10*w*. The main radiation direction 91D of the first electromagnetic wave 91 is tilted with respect to the Z-axis direction. A tilt angle $\theta_0$ between the main radiation direction 91D and the Z-axis direction is greater than 0°. The projection direction 91P of the main radiation direction 91D onto the waveguide 10*w* is along a direction 91*z* from the second partial region 12 to the first partial region 11.

For example, in the antenna device 110, the first electromagnetic wave 91 with beam tilt is emitted. For example, in the direction opposite to the tilt direction (the direction to second partial region 12), the spacing between the plurality of radiating portions 20 is prevented from becoming extremely narrow. The degree of design freedom regarding the size and position of the plurality of radiating portions 20 is improved. The performance of the antenna can be improved.

Figure 10:
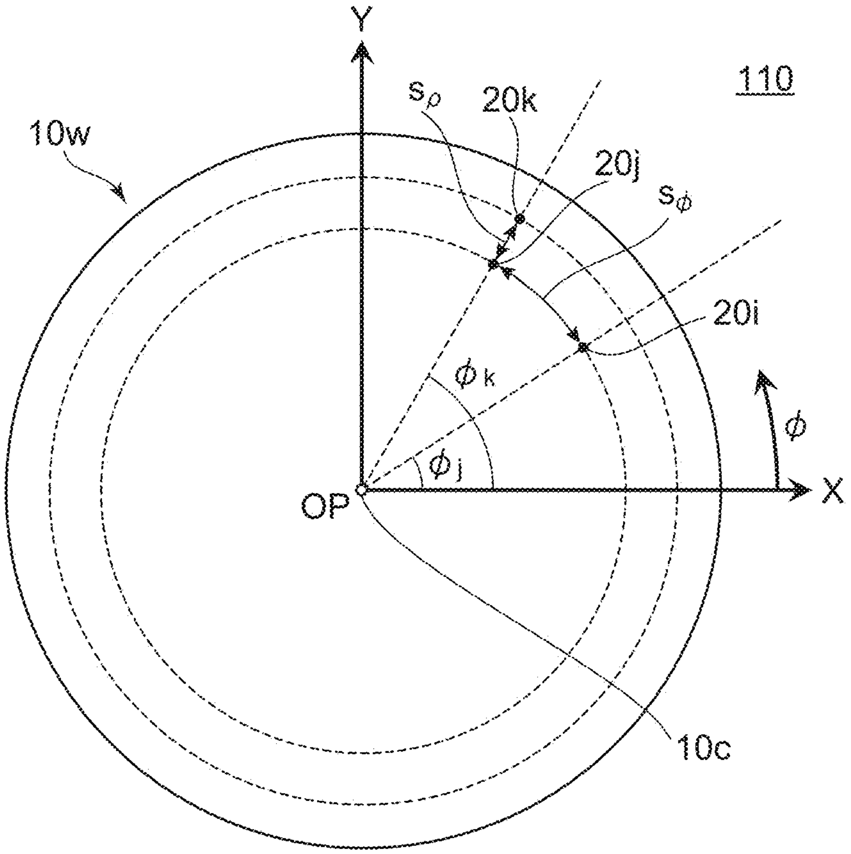
FIG. 10 is a schematic plan view illustrating an antenna device according to the first embodiment.

FIG. 10 is a schematic plan view illustrating an antenna device according to the first embodiment.

As shown in FIG. 10, the plurality of radiating portions 20 include radiating portion 20*i*, radiating portion 20*j*, and radiating portion 20*k*. The positions of radiating portion 20*i*, radiating portion 20*j*, and radiating portion 20*k* are different from each other. The radiating portion 20*i* is next to the radiating portion 20*j* in the circumferential direction. The radiating portion 20*k* is next to radiating portion 20*j* in the radial direction. The radial direction corresponds to the direction that passes through feed point 10*c* and is along the first plane PL1.

In FIG. 10, a circumferential interval between the radiating portion 20*i* and the radiating portion 20*j* is defined as a circumferential interval $S\phi$. A radial interval between the radiating portion 20*j* and the radiating portion 20*k* is defined as a radial interval $S_\rho$. The circumferential interval $S\phi$ is a distance in the circumferential direction between the center of one of the plurality of radiating portions 20 in the circumferential direction and the center of the next one of the plurality of radiating portions 20 in the circumferential direction. The radial interval $S_\rho$ is a distance in the radial direction between the center of one of the plurality of radiating portions 20 in the radial direction and the center of a next one of the plurality of radiating portions 20 in the radial direction.

As already explained with reference to FIG. 3, one of the plurality of radiating portions 20 includes the slot pair 20*p*. The slot pair 20*p* includes the first slot 21 and the second slot 22. The coordinates of the center of the first slot 21 are (x1, y1). The coordinates of the center of the second slot 22 are (x2, y2). In the embodiment, for example, at a center 20*z* of the slot pair 20*p*, an absolute value of x1 is the same as an absolute value of x2. At the center 20*z* of the slot pair 20*p*, an absolute value of y1 is the same as an absolute value of y2.

As shown in FIG. 9, the main radiation direction 91D of the first electromagnetic waves 91 radiated from the plurality of radiating portions 20 is expressed as $(\theta, \phi)=(\theta_0, \phi_0)$. In the case where the circumferential interval $S\phi$ is small enough that grating lobes are not substantially generated, the circumferential interval $S\phi$ can be set to a relatively free value independent of the main radiation direction 91D. The circumferential interval $S\phi$ may vary depending on the position on the waveguide 10*w*. For example, a slow wave ratio of the waveguide 10*w* at the position of the radiating portion 20*i* is defined as a slow wave ratio ξi. A slow wave ratio of the waveguide 10*w* at the position of the radiating portion 20*j* is defined as a slow wave ratio ξj. For example, the circumferential interval $S\phi$ may be smaller than the larger one of ξiλ0 and ξjλ0. In this case, undesired modes do not substantially propagate inside the waveguide 10*w*. The upper limit of the circumferential interval $S\phi$ may vary depending on the position on the waveguide 10*w*.

Thus, the circumferential interval $S\phi$ of the plurality of radiating portions 20 in the circumferential direction around the first axis direction Dz1 may be smaller than $\xi\lambda_0$. One of the plurality of radiating portions 20 is next to another of the plurality of radiating portions 20 in the circumferential direction. For example, the slow wave factor of the radio-frequency signal in the one of the plurality of radiating portions 20 is equal to or greater than the slow wave factor of the radio-frequency signal in the other one of the plurality of radiating portions. In this case, "ξ" is the slow wave factor of the radio-frequency signal in the one of the plurality of radiating portions 20. "$\lambda_0$" is the wavelength in free space of the radio-frequency signal.

On the other hand, the radial interval $S_\rho$ may be set to an appropriate value. Thereby, a phase distribution on a plane for beam tilt is formed. In the embodiment, the radial interval $S_\rho$ may satisfy the following first formula.

$$S_\rho = \xi\lambda_0/\{1 - \xi\sin\theta_0\cos(\phi - \phi_0)\} \quad (1)$$

In the first formula, ξ represents the slow wave factor in the waveguide 10*w*. For example, the slow-wave structure of the first member 30 is formed by the dielectric 38 having the relative dielectric constant $\varepsilon_r$. In this case, ξ is expressed as $\xi=(\varepsilon_r)^{-1/2}$.

When the slow wave factor $\xi$ in the radial waveguide is uniform in the waveguide 10$w$, the radial interval $S_\rho$ changes depending on the azimuth angle $\phi$. For example, when $\phi=\phi_0+180°$, the radial interval $S_\rho$ of the plurality of radiating portions 20 is at a minimum. The minimum value $\min(S_\rho)$ of the radial interval $S_\rho$ may be expressed by the following second formula.

$$\min(S_\rho) = \xi\lambda_0/(1+\xi\sin\theta_0) \tag{2}$$

On the other hand, when $\phi=\phi_0$, the radial interval $S_\rho$ of the plurality of radiating portions 20 is maximum. The maximum value $\max(S_\rho)$ of the radial interval $S_\rho$ may be expressed by the following third formula.

$$\max(S_\rho) = \xi\lambda_0/(1-\xi\sin\theta_0) \tag{3}$$

Figure 11:
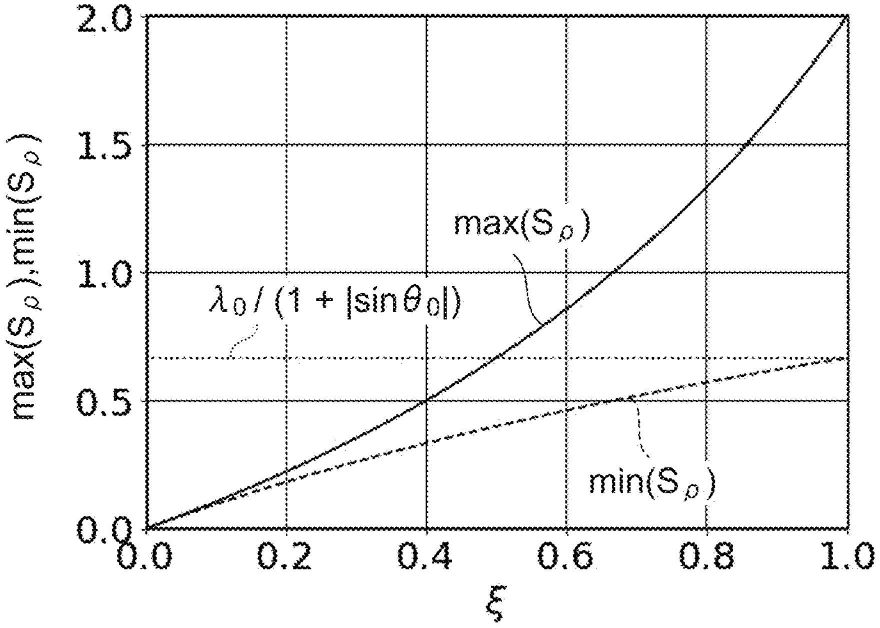
FIG. 11 is a graph illustrating the characteristics of the antenna device.

FIG. 11 is a graph illustrating the characteristics of the antenna device.

FIG. 11 corresponds to a reference example. In the reference example, the slow wave factor $\xi$ is same throughout the waveguide 10$w$. FIG. 11 illustrates the characteristics when the slow wave factor $\xi$ is changed in the reference example. The horizontal axis of FIG. 11 is the slow wave factor $\xi$. The vertical axis is the minimum value $\min(S_\rho)$ or the maximum value $\max(S_\rho)$. In FIG. 11, the coefficient $\alpha$ is 1.0. The tilt angle $\theta_0$ is 30°.

As shown in FIG. 11, when the slow wave ratio $\xi$ is low, the minimum value $\min(S_\rho)$ and the maximum value $\max(S_\rho)$ decrease. When the slow wave ratio $\xi$ is lower than 0.5, the maximum value $\max(S_\rho)$ is smaller than $\lambda_0/(1+|\sin\theta_0|)$. In this case, grating lobes do not substantially occur.

On the other hand, when the slow wave factor $\xi$ is lower than 0.5, the minimum value $\min(S_\rho)$ becomes smaller than $0.4\lambda_0$. For example, in the slot pair 20$p$, a slot with a length of about $0.5\lambda_0$ at most is used. Furthermore, for example, the spacing between plurality of slot pairs 20$p$ is set to about $\lambda_g/4$. Thereby, reflection is suppressed. Therefore, it is difficult to arrange slot pairs 20$p$ in areas where the element spacing is narrow. In order to arrange the slot pairs 20$p$, short slots with a small amount of radiation are used. For example, narrowing the spacing between the slot pairs 20$p$ at the expense of reflection reduces the degree of freedom in design. Furthermore, the performance of the antenna deteriorates.

In contrast, in the embodiment, the slow wave factor $\xi$ in the radial waveguide is appropriately controlled according to the azimuth angle $\phi$. Thereby, the radial interval $S_\rho$ becomes in a desired range (e.g., substantially constant) without depending on the azimuth angle $\phi$.

For example, the following fourth formula can be derived from the first formula.

$$\xi = \{\lambda_0/S_\rho + \sin\theta_0\cos(\phi-\phi_0)\}^{-1} \tag{4}$$

When the radial interval $S_\rho$ is $\alpha\lambda_0/(1+\sin\theta_0)$, fifth formula can be derived from the fourth formula. The coefficient "$\alpha$" is a real number not less than 0 and not more than 1.

$$\xi = \{(1+\sin\theta_0)/\alpha + \sin\theta_0\cos(\phi-\phi_0)\}^{-1} \tag{5}$$

The following sixth formula can be derived from the fifth formula and the relationship of $\xi=(\varepsilon_r)^{-1/2}$.

$$\varepsilon_r = \{(1+\sin\theta_0)/\alpha + \sin\theta_0\cos(\phi-\phi_0)\}^2 \tag{6}$$

For example, the slow wave factor $\xi$ of the first member 30 is changed according to the azimuth angle $\phi$ according to the fifth formula. Thereby, it is possible to keep the radial interval $S_\rho$ constant, independent of the azimuth angle $\phi$. When the radial interval $S_\rho$ is smaller than $\lambda_0/(1+|\sin_\theta 0|)$, substantially no grating lobes are generated.

For example, the effective relative dielectric constant $\varepsilon_r$ of the first member 30 is changed according to the azimuth angle $\phi$ according to the sixth formula. Thereby, it is possible to keep the radial interval $S_\rho$ constant, independent of the azimuth angle $\phi$. When the radial interval $S_\rho$ is smaller than $\lambda_0/(1+|\sin\theta_0|)$, substantially no grating lobes occur.

FIGS. 12 to 15 are graphs illustrating the characteristics of the antenna device according to the first embodiment.

Figure 12:
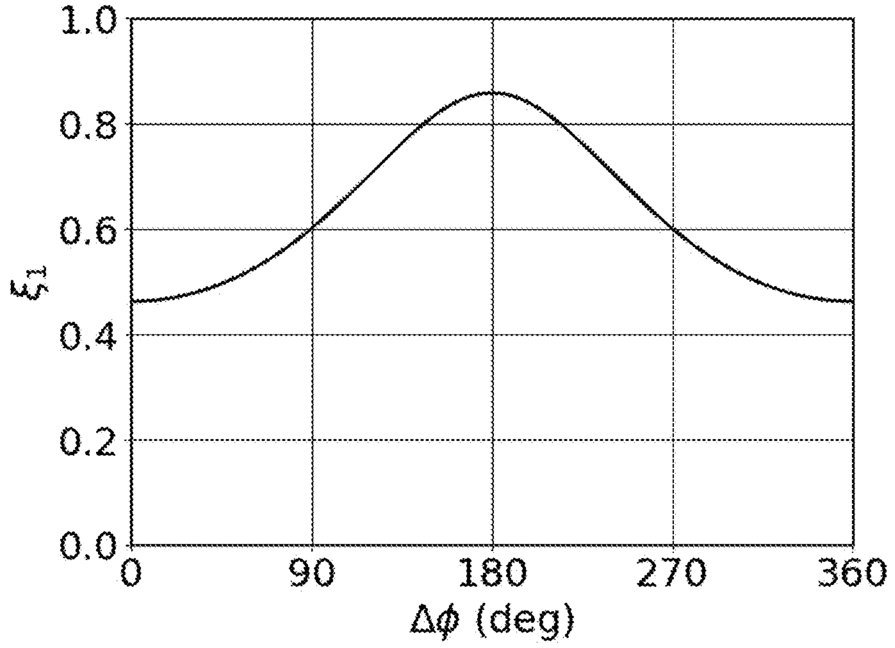
FIG. 12 is a graph illustrating the characteristics of the antenna device according to the first embodiment.

FIG. 12 shows an example of the distribution of the slow wave factor $\xi$ of the first member 30. The horizontal axis of FIG. 12 is an angle difference $\Delta\phi$. The angle difference $\Delta\phi$ is $(\phi-\phi_0)$. The vertical axis is the slow wave factor $\xi$1. The slow wave factor $\xi$1 is the slow wave factor $\xi$ such that the radial interval $S\rho$ of the plurality of radiating portions is 20 substantially $0.90\lambda_0/(1+|\sin\theta_0|)$, regardless of the azimuth angle $\phi$. "$0.90\lambda_0/(1+|\sin\theta_0|)$" is substantially $0.60\lambda_0$. In the example of FIG. 12, the coefficient $\alpha$ in the fifth formula is 0.9. The tilt angle $\theta_0$ is 30°.

As shown in FIG. 12, when the angle difference $\Delta\phi$ is 0°, the slow wave factor $\xi$1 is set low. When the angle difference $\Delta\phi$ is 180°, the slow wave factor $\xi$1 is set high. As a result, for example, the radial interval $S_\rho$ of the plurality of radiating portions 20 is substantially $0.90\lambda_0/(1+|\sin\theta_0|)$ regardless of the azimuth angle $\phi$. The direction in which the angle difference $\Delta\phi$ is 0° corresponds to the beam tilt direction. The direction in which the angle difference $\Delta\phi$ is 180° corresponds to the direction opposite to the beam tilt direction. Such a distribution of the slow wave factor $\xi$1 makes it possible, for example, to make the radial interval $S_\rho$ of the plurality of radiating portions 20 substantially constant.

Figure 13:
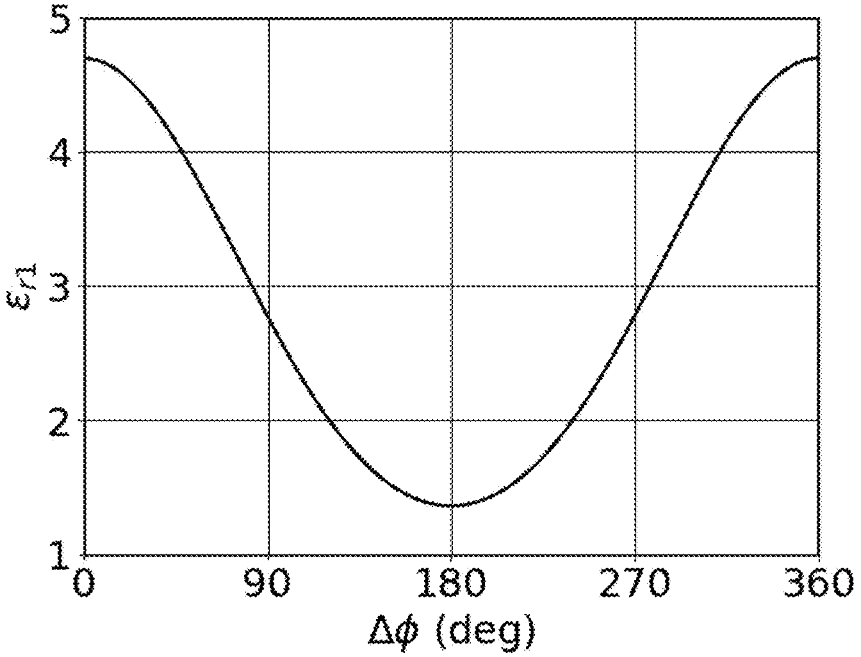
FIG. 13 is a graph illustrating the characteristics of the antenna device according to the first embodiment.

FIG. 13 illustrates the distribution of the effective dielectric constant $\varepsilon_{r1}$ in the waveguide 10$w$ in one example. The horizontal axis of FIG. 13 is the angle difference $\Delta\phi$. The vertical axis is the effective dielectric constant $\varepsilon_{r1}$. The effective dielectric constant $\varepsilon_{r1}$ is independent of the azimuth angle $\phi$, and is the effective dielectric constant $\varepsilon_{r1}$ at which the radial interval $S_\rho$ of the plurality of radiating portions 20 is substantially $0.90\lambda_0/(1+|\sin\theta_0|)$. In the example of FIG. 13, the coefficient $\alpha$ in the sixth formula is 0.9. The tilt angle $\theta_0$ is 30°.

As shown in FIG. 13, when the angle difference $\Delta\phi$ is 0°, the effective relative dielectric constant $\varepsilon_{r1}$ is set high. When the angle difference $\Delta\phi$ is 180°, the effective relative dielectric constant $\varepsilon_{r1}$ is set low. As a result, the radial interval $S_\rho$ of the plurality of radiating portions 20 is substantially $0.90\lambda_0/(1+|\sin\theta_0|)$, regardless of the azimuth angle $\phi$. By the distribution of the effective relative dielectric constant $\varepsilon_{r1}$, it is possible to keep the radial interval $S_\rho$ of the plurality of radiating portions 20 constant.

Figure 14:
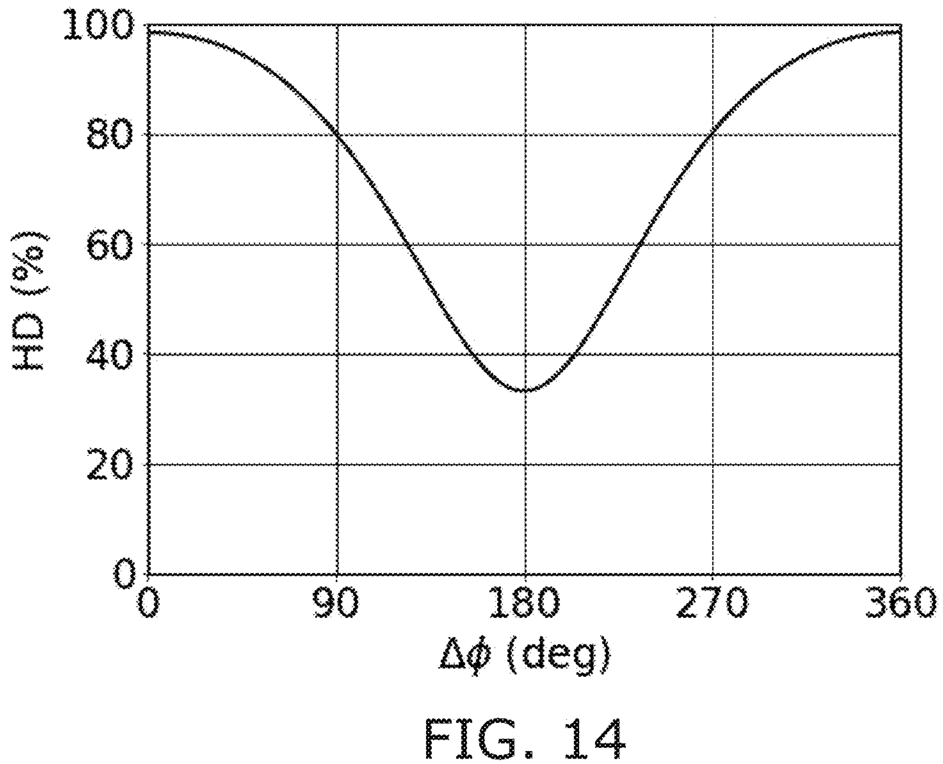
FIG. 14 is a graph illustrating the characteristics of the antenna device according to the first embodiment.

FIG. 14 illustrates the thickness distribution of the dielectric 38 in the waveguide 10$w$ in one example. The thickness corresponds to the length along the Z-axis direction. The horizontal axis of FIG. 14 is the angle difference $\Delta\phi$. The vertical axis is a ratio HD. The ratio HD is a ratio of the thickness of the dielectric 38 to the distance along the Z-axis direction between the second conductive layer 42 and the first conductive layer 41. The ratio HD is a value that obtains an effective relative dielectric constant $\varepsilon_{r1}$ such that the radial interval $S_\rho$ of the plurality of radiating portions 20 is substantially $0.90\lambda_0/(1+|\sin\theta_0|)$, regardless of the azimuth angle $\phi$. In the example of FIG. 14, the coefficient $\alpha$ in the sixth formula is 0.9. The tilt angle $\theta_0$ is 30°.

The dielectric constant of the dielectric 38 is defined as $\varepsilon_r$. The effective dielectric constant in the waveguide 10*w* is $\varepsilon_{r1}$. The ratio HD is expressed by seventh formula.

$$HD = \frac{1-(\varepsilon_{r1})^{-1}}{1-(\varepsilon_r)^{-1}} \tag{7}$$

In the seventh formula, when the relative dielectric constant $\varepsilon_r$ is constant, the higher the effective relative dielectric constant $\varepsilon_{r1}$, the thicker the dielectric 38 will be. The lower the effective relative dielectric constant $\varepsilon_{r1}$, the thinner the dielectric 38 will be. The relative dielectric constant $\varepsilon_r$ may vary in the waveguide 10*w*.

As described above, by appropriately changing the ratio HD according to the azimuth angle $\phi$, the radial interval $S_\rho$ can be prevented from becoming excessively short. For example, the area in which the plurality of radiating portions 20 (e.g. plurality of slot pairs 20*p*) are provided can be expanded. The design freedom can be improved. The performance of the antenna device 110 can be improved.

Figure 15:
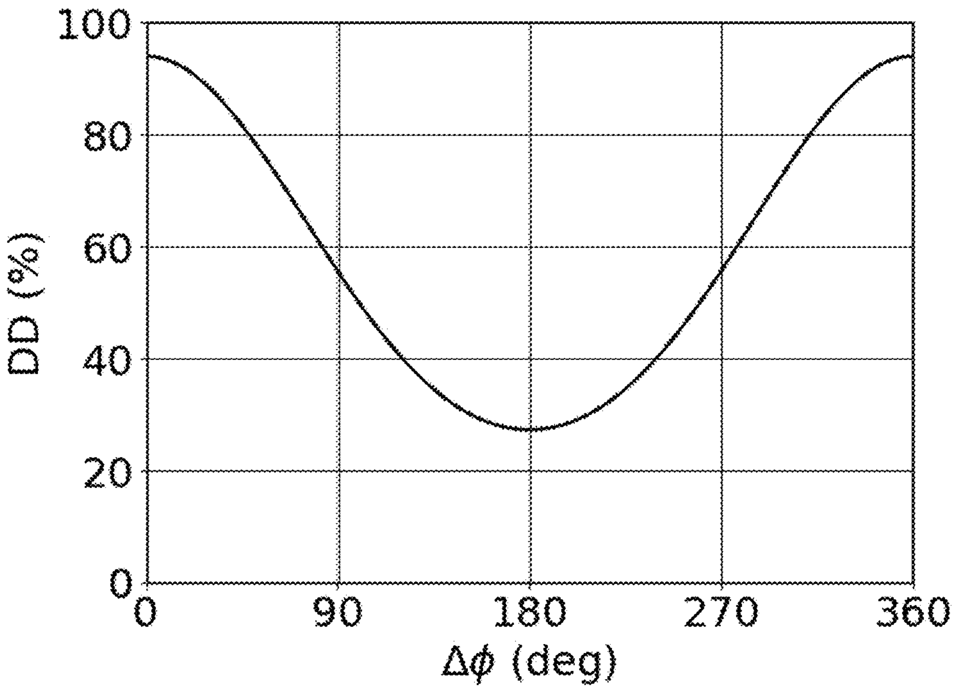
FIG. 15 is a graph illustrating the characteristics of the antenna device according to the first embodiment.

FIG. 15 illustrates the distribution of the filling factor of the dielectric 38 in the waveguide in one example. The horizontal axis of FIG. 15 is the angle difference $\Delta\phi$. The vertical axis is the filling factor DD of the dielectric 38. The filling factor DD of the dielectric 38 is a value that does not depend on the azimuth angle $\phi$ and that provides an effective relative dielectric constant $\varepsilon_{r1}$ such that the radial interval $S_\rho$ of the plurality of radiating portions 20 is substantially $0.90\lambda_0/(1+|\sin\theta_0|)$. In the example of FIG. 15, the coefficient $\alpha$ in the sixth formula is 0.9. The tilt angle $\theta_0$ is 30°. The relative dielectric constant $\varepsilon_r$ of the dielectric 38 is 5.

The filling factor DD of the dielectric 38 is proportional to the ratio $(\varepsilon_{r1}/\varepsilon_r)$ of the effective relative dielectric constant $\varepsilon_{r1}$ of the first member 30 to the relative dielectric constant $\varepsilon_r$ of the dielectric 38. In the embodiment, the distribution of the filling factor DD of the dielectric 38 is appropriately changed according to the azimuth angle $\phi$. This makes it possible to prevent the radial interval $S_\rho$ from becoming excessively short. For example, the area in which the plurality of radiating portions 20 (e.g. plurality of slot pairs 20*p*) are provided is expanded. The design freedom can be improved. Performance can be improved.

For example, in the embodiment, the first member 30 including the dielectric 38 can easily lower the relative dielectric constant in a region where the effective relative dielectric constant $\varepsilon_{r1}$ is low. For example, the dielectric loss can be reduced.

In the embodiment, it is noted that the radial interval $S_\rho$ between the plurality of radiating portions 20 in the radial direction is smaller than $\lambda_0/(1+\sin\theta_0)$. Thereby, the grating lobes are effectively suppressed. As already explained, "$\lambda_0$" is the wavelength in free space of the radio-frequency signal. "$\theta_0$" is the angle between the direction perpendicular to the first region 10*r* (first axis direction Dz1) and the main radiation direction 91D of the first electromagnetic wave 91 radiated from the plurality of radiating portions 20 (see FIG. 9).

As already explained, one of the plurality of radiating portions 20 may include the slot pair 20*p*. Thereby, for example, reflections in the two slots are suppressed. This makes it possible to reduce reflections in the plurality of radiating portions 20. For example, the performance of the antenna can be improved by adjusting the length of the slot, the width of the slot, the position of the slot, and the distance between the two slots.

In the embodiment, the plurality of radiating portions 20 may be configured to radiate circularly polarized waves. For example, radiation of circularly polarized waves facilitates wireless communication and the like, independent of the direction of polarization of the first electromagnetic wave 91 being radiated. In the embodiment, the circularly polarized waves may be polarization including elliptical polarization. For example, the plurality of radiating portions 20 may be configured to transmit and receive at least one of right-handed circularly polarized waves or left-handed circularly polarized waves.

In the embodiment, each of the first slot angle $\delta$1 and the second slot angle $\delta$2 (see FIG. 3) may be substantially 45°. At this time, the first slot 21 and the second slot 22 radiate linearly polarized waves that are substantially orthogonal to each other. For example, the absolute value of the first slot angle $\delta$1 may be substantially the same as the absolute value of the second slot angle $\delta$2, and the first slot length L1 may be substantially the same as the second slot length L2. At this time, the amplitude of the electromagnetic wave radiated by the first slot 21 is substantially the same as the amplitude of the electromagnetic wave radiated by the second slot 22. For example, the circular polarization characteristics in the slot pair 20*p* are excellent.

For example, the first slot 21 and the second slot 22 may be arranged so that the linearly polarized wave radiated by the first slot 21 in the main radiation direction 91D and the linearly polarized wave radiated by the second slot 22 in the main radiation direction 91D are perpendicular to each other.

The first slot length L1 and the second slot length L2 may be set so that the amplitude of the linearly polarized wave radiated from the first slot 21 in the main radiation direction 91D is substantially the same as the amplitude of the linearly polarized wave radiated from the second slot 22 in the main radiation direction 91D.

As already explained, the plurality of radiating portions 20 may be arranged in a substantially spiral shape. For example, the structure of the feed point 10*c* can be simplified. For example, a coaxial cable is connected to the center of the radial waveguide, and the plurality of radiating portions 20 being spirally arranged can be excited by coaxial mode power feed.

As already explained, the plurality of radiating portions 20 may be arranged substantially concentrically. For example, good radiation characteristics can be obtained even in a small-scale antenna device with a small number of plurality of radiating portions 20. For example, power is fed to the waveguide 10*w* in a rotational mode. The plurality of radiating portions 20 being concentric can simplify the structure of the feed point 10*c*. In the concentric arrangement, for example, the arrangement of the plurality of radiating portions 20 has good symmetry. Good radiation characteristics can be easily obtained even in a small-scale antenna device 110.

In the embodiment, electromagnetic waves are radiated (transmitted) from the antenna device 110. In an embodiment, the antenna device 110 may receive electromagnetic waves. For example, the antenna device 110 may receive electromagnetic waves arriving from a direction of angle ($\theta_0$, $\phi_0$).

Figure 16A:
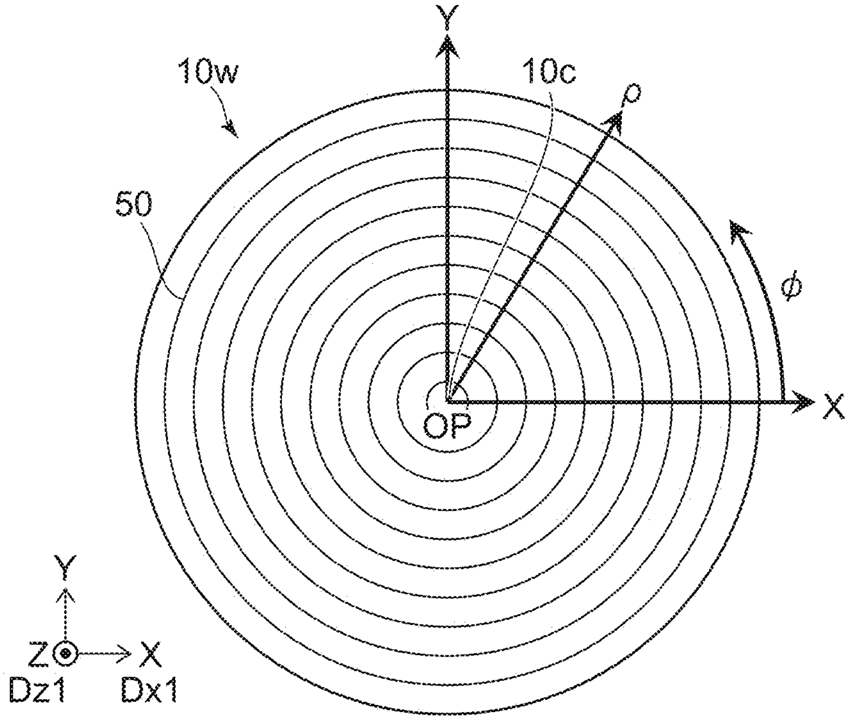
FIGS. 16A and 16B are schematic plan views illustrating the characteristics of an antenna device.
Figure 16B:
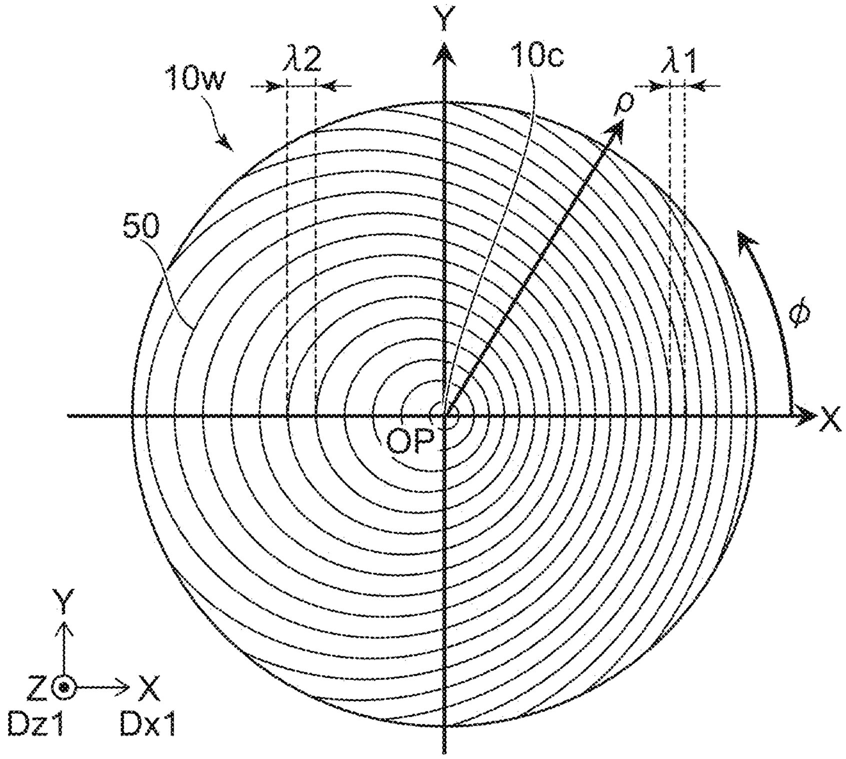

FIGS. 16A and 16B are schematic plan views illustrating the characteristics of an antenna device.

These figured illustrate the distribution of equiphase surfaces of the radio-frequency signal propagating in the waveguide 10*w*. In FIG. 16A, the slow wave factor of the waveguide 10*w* is constant regardless of the azimuth angle $\phi$. In FIG. 16A, the slow wave factor of the waveguide 10*w* corresponds to a state in which the coefficient $\alpha$ in the fifth formula is 0.9 and the tilt angle $\theta$ is 0°. The slow wave factor of the waveguide 10*w* is 0.9 regardless of the azimuth angle $\phi$. The guided wavelength of the waveguide 10*w* does not change even if the azimuth angle $\phi$ changes. In FIG. 16A, the equiphase surface 50 in the waveguide 10*w* is approximately concentric with the feed point 10*c* as the center.

In FIG. 16B, the slow wave factor of the waveguide 10*w* is given by the fifth formula. In FIG. 16B, the coefficient $\alpha$ in the fifth formula is 1.0, the tilt angle $\theta_0$ is 30°, and the angle $\phi_0$ is 0°. In FIGS. 16A and 16B, the radial distance between the plurality of equiphase surfaces 50 at one azimuth angle $\phi$ corresponds to the guided wavelength at that azimuth angle $\phi$.

In the positive direction of the X-axis, the radial distance between the plurality of equiphase surfaces 50 corresponds to the first guided wavelength $\lambda$1. In the negative direction of the X-axis, the radial distance between the plurality of equiphase surfaces 50 corresponds to the second guided wavelength $\lambda$2.

In FIG. 16B, the guided wavelength of the waveguide 10*w* changes depending on the azimuth angle $\phi$. In FIG. 16B, the equiphase surface 50 in the waveguide 10*w* is substantially an ellipse with the feed point 10*c* as one of the foci.

For example, in FIG. 16A, the equiphase surface 50 of the radio-frequency signal propagating through the waveguide 10*w* is substantially perpendicular to the X-axis direction and the Y-axis direction.

On the other hand, in FIG. 16B, the equiphase surface 50 is substantially perpendicular to the X-axis direction, but is tilted with respect to the Y-axis direction. This is because in FIG. 16B, the slow wave factor of the first member 30 of the waveguide 10*w* varies depending on the azimuth angle $\phi$. When the slow wave factor of the first member 30 changes depending on the azimuth angle $\phi$, the equiphase surface 50 becomes substantially elliptical.

Figure 17:
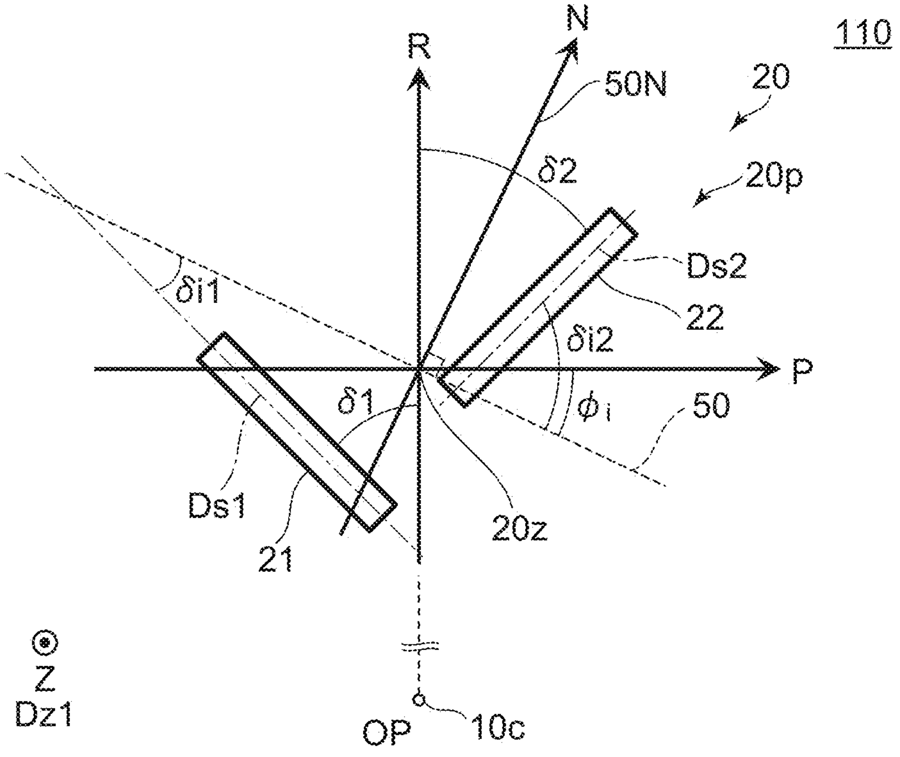
FIG. 17 is a schematic plan view illustrating a part of the antenna device according to the first embodiment.

FIG. 17 is a schematic plan view illustrating a part of the antenna device according to the first embodiment.

In the following description, the P-axis and the R-axis represent axes that are perpendicular to each other. The Z-axis direction is perpendicular to the P-axis and the R-axis. The P-axis and the R-axis are along the X-Y plane. The R-axis is along a straight line that passes through the feed point 10*c* and the center 20*z* of the slot pair 20*p*.

As shown in FIG. 17, the slot pair 20*p* includes the first slot 21 and the second slot 22. The equiphase surface 50 corresponds to the equiphase surface of the radio-frequency signal propagating in the waveguide 10*w* at the center 20*z* of the radiating portion 20 (slot pair 20*p*). The normal vector 50N of the equiphase surface 50 is perpendicular to the equiphase surface 50. An angle between the first slot direction Ds1 and the equiphase surface 50 is defined as a first angle $\delta$i1. An angle between the second slot direction Ds2 and the equiphase surface 50 is defined as a second angle $\delta$i2. The range of values of the first angle oil and the second angle $\delta$i2 is from −90° to +90°.

In the first reference example, the plurality of radiating portions 20 (plurality of slot pairs 20*p*) are arranged rotated at an angle proportional to the azimuth angle $\phi$. In the first reference example, the straight lines connecting the feed point 10*c* and each of the centers 20*z* of the plurality of slot pairs 20*p* are along the R-axis. The equiphase surface 50 of the radio-frequency signal propagating in the waveguide 10*w* is the same as the example shown in FIG. 16A.

In FIG. 17, an angle between the equiphase surface 50 and the P-axis is defined as an equiphase surface angle $\phi_i$. In the example shown in FIG. 16A, when the slot pair 20*p* is rotated and positioned at an angle proportional to the azimuth angle $\phi$, the equiphase surface angle $\phi$ can have a value different from 0° depending on the azimuth angle $\phi$. When the equiphase surface angle $\phi_i$ is different from 0°, even if the first slot angle $\delta$1 is the same as the second slot angle $\delta$2, the first angle $\delta$i1 may differ from the second angle $\delta$i2 depending on the azimuth angle $\phi$.

The characteristics of the slots on the waveguide 10*w* change depending on the angle between the equiphase surface 50 at the position of the slot and the long axis direction of the slot. For example, the characteristics of the first slot 21 change depending on the first angle $\delta$i1. The characteristics of the second slot 22 change depending on the second angle $\delta$i2. In each of the plurality of slot pairs 20*p*, when the straight line connecting the feed point 10*c* and each of the centers 20*z* of the plurality of slot pairs 20*p* is along the R-axis, a difference occurs between the characteristics of the first slot 21 and the characteristics of the second slot 22. For example, when the first angle $\delta$i1 is different from the second angle $\delta$i2, a difference occurs in the radiation power between the first slot 21 and the second slot 22. For example, a difference occurs in the frequency characteristics between the first slot 21 and the second slot 22. When the first angle $\delta$i1 is different from the second angle $\delta$i2, the radiation characteristics of the slot pair 20*p* deteriorate. When the first angle $\delta$i1 is different from the second angle $\delta$i2, the bandwidth of the slot pair 20*p* becomes narrower.

Figure 18A:
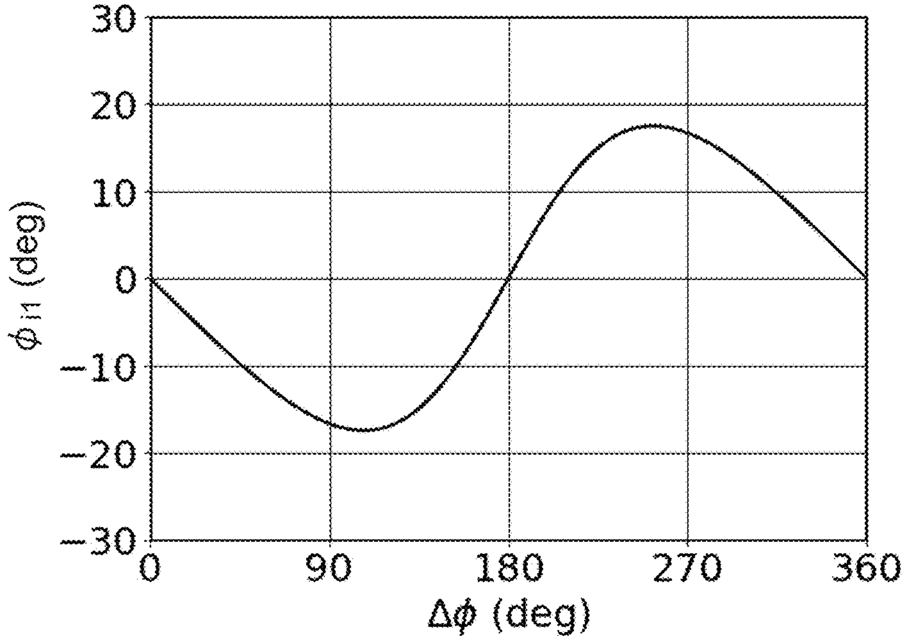
FIGS. 18A and 18B are graphs illustrating the characteristics of an antenna device according to an embodiment.
Figure 18B:
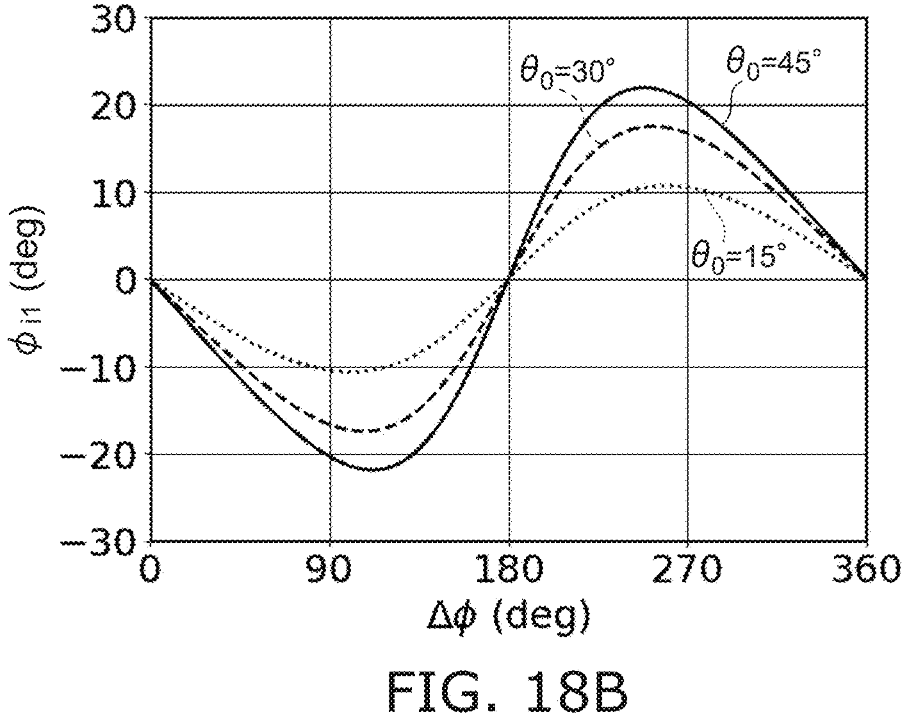

FIGS. 18A and 18B are graphs illustrating the characteristics of an antenna device according to an embodiment.

FIG. 18A illustrates the distribution of equiphase surface angles $\phi_i$ in one example. The horizontal axis of FIG. 18A is the angle difference $\Delta\phi$. The angle difference $\Delta\phi$ is $\phi-\phi_0$. The vertical axis is an angle $\phi_{i1}$. The angle $\phi_{i1}$ is the angle between the equiphase surface 50 in the waveguide 10*w* at the azimuth angle $\phi$ and the P-axis. The slow wave factor of the waveguide 10*w* is a value at which the radial interval $S_\rho$ of the plurality of radiating portions 20 on the waveguide 10*w* is substantially $0.90\lambda_0/(1+|\sin\theta_0|)$ regardless of the azimuth angle $\phi$. This value is determined by the fifth formula. In the example of FIG. 18A, the coefficient $\alpha$ in the fifth formula is 0.9, and the tilt angle $\theta_0$ is 30°.

As shown in FIG. 15A, when the angle difference $\Delta\phi$ is 0°, 180°, or 360°, the angle dis is 0°. When the angle difference $\Delta\phi$ is different from 0°, 180°, or 360°, the angle $\phi_{i1}$ is different from 0°. The angle $\phi_{i1}$ changes depending on the angle difference $\Delta\phi$. When the angle $\phi_{i1}$ is different from 0°, the first angle $\delta$i1 is different from the second angle $\delta$i2.

FIG. 18B illustrates the distribution of equiphase surface angles $\phi_i$ in one example. The horizontal axis of FIG. 18B is the angle difference $\Delta\phi$. The vertical axis is the angle $\phi_{i1}$. The slow wave factor of the waveguide 10*w* is a value at which the radial interval $S_\rho$ of the plurality of radiating portions 20 on the waveguide 10*w* is substantially $0.90\lambda_0/(1+|\sin\theta_0|)$, independent of the azimuth angle $\phi$. This value is determined by the fifth formula. In the example of FIG. 15B, the coefficient α in the fifth formula is 0.9, and the tilt angle $\delta_0$ is 15°, 30°, or 45°.

As shown in FIG. 18B, when the angle difference Δϕ is 0°, 180° or 360°, the angle $\phi_{i1}$ is 0°. When the angle difference Δϕ is different from 0°, 180° or 360°, the angle $\phi_{i1}$ is different from 0°. The angle $\phi_{i1}$ changes depending on the angle difference Δϕ. The angle $\phi_{i1}$ changes depending on the tilt angle $\theta_0$. When the tilt angle $\theta_0$ is large, the change in the angle $\phi_{i1}$ becomes larger.

Figure 19:
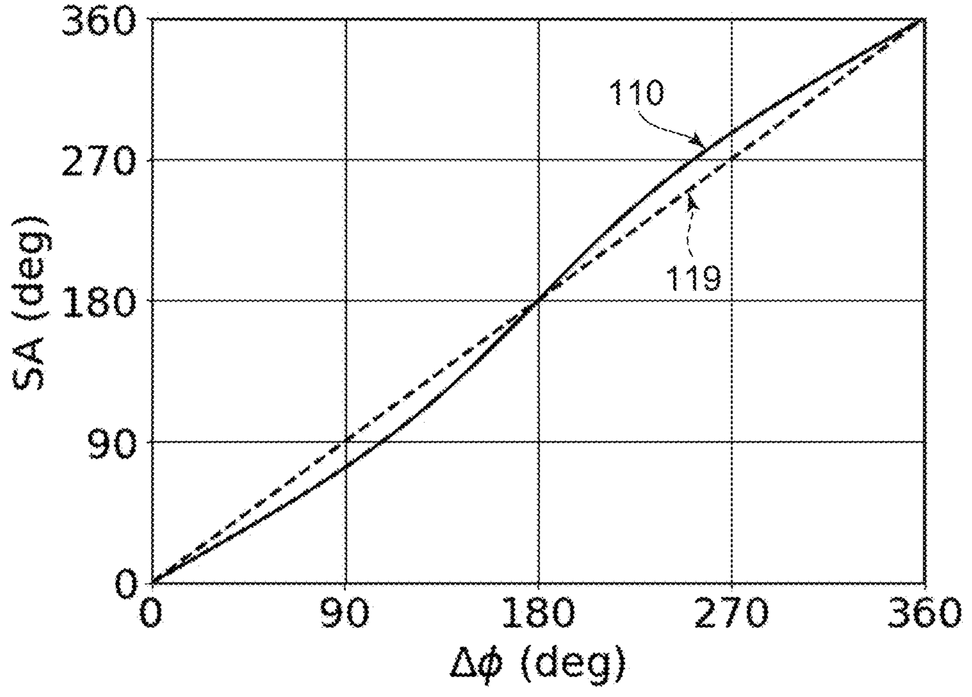
FIG. 19 is a graph illustrating an antenna device according to the first embodiment.

FIG. 19 is a graph illustrating an antenna device according to the first embodiment.

FIG. 19 illustrates arrangement angle of the slot pairs 20*p* in one example. The horizontal axis of FIG. 19 is the angle difference Δϕ. The angle difference Δϕ is $\phi-\phi_0$. The vertical axis is an arrangement angle SA of the slot pairs 20*p*. The arrangement angle SA of the slot pairs 20*p* is an angle along the circumferential direction. The arrangement angle SA is the angle between the R-axis of each of the plurality of slot pairs 20*p* arranged on the waveguide 10*w* and a straight line being along the direction of $\phi=\phi_0$ and passing through the feed point 10*c*. The slow wave factor of the waveguide 10*w* is a value at which the radial interval $S_\rho$ of the plurality of radiating portions 20 on the waveguide 10*w* is substantially $0.90\lambda_0/(1+|\sin\theta_0|)$, regardless of the azimuth angle ϕ. This value is defined by the fifth formula. In the example of FIG. 19, the coefficient α in the fifth formula is 0.9, and the tilt angle $\theta_0$ is 30°. FIG. 19 illustrates the characteristics of the antenna device 110 according to the embodiment and the characteristics of the antenna device 119 of the first reference example.

As shown in FIG. 19, in the antenna device 119 of the first reference example, the arrangement angle SA is proportional to the angle difference Δϕ.

On the other hand, in the antenna device 110, the arrangement angle SA is not proportional to the angle difference Δϕ. In the antenna device 110, the arrangement angle SA changes depending on $\Delta\phi+\phi_i$. The equiphase surface angle $\phi_i$ corresponds to the angle between the equiphase surface 50 and the P-axis at the center 20*z* of each of the plurality of slot pairs 20*p*. In the antenna device 110, the equiphase surface angle $\phi_i$ can be made substantially 0° regardless of the azimuth angle ϕ. For example, the first slot angle δ1 is substantially equal to the second slot angle δ2 in each of the plurality of slot pairs 20*p*. At this time, the first angle oil and the second angle δi2 are substantially equal to each other regardless of the azimuth angle ϕ. Thereby, the radiation characteristics of the slot pair 20*p* is improved. The bandwidth of the slot pair 20*p* can be widened.

For example, in the embodiment, the slot pair 20*p* is configured to radiate circularly polarized waves. In this case, if the arrangement angle SA of the plurality of slot pairs 20*p* is set as in the antenna device 110 and the radial interval $S_\rho$ is constant, the radiation phase in the main radiation direction 91D is substantially the same for the plurality of slot pairs 20*p*.

In the embodiment, the plurality of slot pairs 20*p* are configured to radiate circularly polarized waves. In the embodiment, the arrangement angle SA of the plurality of slot pairs 20*p* is set as shown by the solid line in FIG. 19. The radiation phase in the main radiation direction 91D varies depending on the positions of the plurality of slot pairs 20*p*. The difference in radiation phase from the plurality of slot pairs 20*p* is substantially equal to the change in the equiphase surface angle $\phi_i$. The radiation phase of the plurality of slot pairs 20*p* can be adjusted by changing the positions of the plurality of slot pairs 20*p*. By adjusting the positions of the plurality of slot pairs 20*p*, the radiation phase in the main radiation direction 91D can be made substantially in-phase for the plurality of slot pairs 20*p*. The characteristics of the antenna device are improved.

In the embodiment, in each of the plurality of radiating portions 20, a first position is defined as a position of the first slot 21 on the waveguide 10*w*. In each of the plurality of radiating portions 20, a second position is defined as the position of the second slot 22 on the waveguide 10*w*. In each of the plurality of radiating portions 20, the first angle δi1 is the angle between the equiphase surface 50 of the radio-frequency signal propagating within the waveguide at the first position on the waveguide 10*w* and the first slot direction Ds1. In each of the plurality of radiating portions 20, the second angle δi2 is the angle between the equiphase surface 50 at the second position on the waveguide 10*w* and the second slot direction Ds2. In the embodiment, in the plurality of radiating portions 20, the absolute value of the first angle δi1 may be substantially the same as the absolute value of the second angle δi2. For example, the absolute value of the first angle oil in the first radiating portion 20*a* (first absolute angle value) is substantially the same as the absolute value of the second angle δi2 in the first radiating portion 20*a* (second absolute angle value). For example, the absolute value of the first angle δi1 in the second radiating portion 20*b* (third absolute angle value) is substantially the same as the absolute value of the second angle δi2 in the second radiating portion 20*b* (fourth absolute angle value).

As already explained, in a radial line slot antenna that tilts the beam by controlling the slow wave factor in the waveguide 10*w*, the equiphase surface 50 becomes elliptical due to the non-uniformity of the slow wave factor. The radiated power of the slot changes depending on the angle between the direction in which the slot extends and the equiphase surface 50. In the first reference example in which the slot pair 20*p* is rotated by an amount proportional to the azimuth angle ϕ, the angle between each of the two slots and the equiphase surface 50 deviates from 45°. In the first reference example, a characteristic difference occurs between the plurality of slot pairs 20*p*, and the bandwidth becomes narrow. In the embodiment, the absolute value of the first angle δi1 is substantially the same as the absolute value of the second angle δi2. This makes it possible to suppress the characteristic difference between the plurality of slot pairs 20*p*. A wide bandwidth is obtained.

For example, in the case where the equiphase surface 50 is curved with a small radius of curvature, the difference in angle of the equiphase surface 50 is large at the respective positions of the two slots included in the slot pair 20*p*. In this case, the arrangement angle SA of the two slots may be adjusted at the respective positions of the two slots included in the slot pair 20*p*.

On the other hand, in the case where the equiphase surface 50 is a curved with a large radius of curvature, the equiphase surface 50 can be approximated to a flat plane. In this case, adjustment of the arrangement angle SA of each of the two slots included in the slot pair 20*p* may be omitted. In this case, only the arrangement angle SA of the slot pair 20*p* may be adjusted. For example, the above-mentioned position of the first slot 21 on the waveguide 10*w* may be approximated by the position of the midpoint between the first slot 21 and the second slot 22. For example, the above-mentioned position of the second slot 22 on the waveguide 10*w* may be approximated by the position of the midpoint between the first slot 21 and the second slot 22.

In the embodiment, the plurality of radiating portions 20 function as an array antenna. Each of the plurality of radiating portions 20 may include the slot pair 20$p$. One of the plurality of radiating portions 20 may include a single slot antenna. One of the plurality of radiating portions 20 may include a helical antenna. One of the plurality of radiating portions 20 may include a patch antenna. One of the plurality of radiating portions 20 may include a dipole antenna. One of the plurality of radiating portions 20 may include a dielectric resonator antenna. One of the plurality of radiating portions 20 may include a leaky wave antenna. Various configurations can be applied to the plurality of radiating portions 20.

The curvature of the equiphase surface 50 of the radio-frequency signal propagating through the waveguide 10$w$ changes depending on the position in the waveguide 10$w$. The curvature of the equiphase surface 50 is high at a positions close to the feed point 10$c$. The curvature of the equiphase surface 50 is low at a positions far from the feed point 10$c$. At positions that are sufficiently far from the feed point 10$c$ compared to $\lambda_0$, the equiphase surface 50 can be approximated to a straight line (flat plane).

Figure 20:
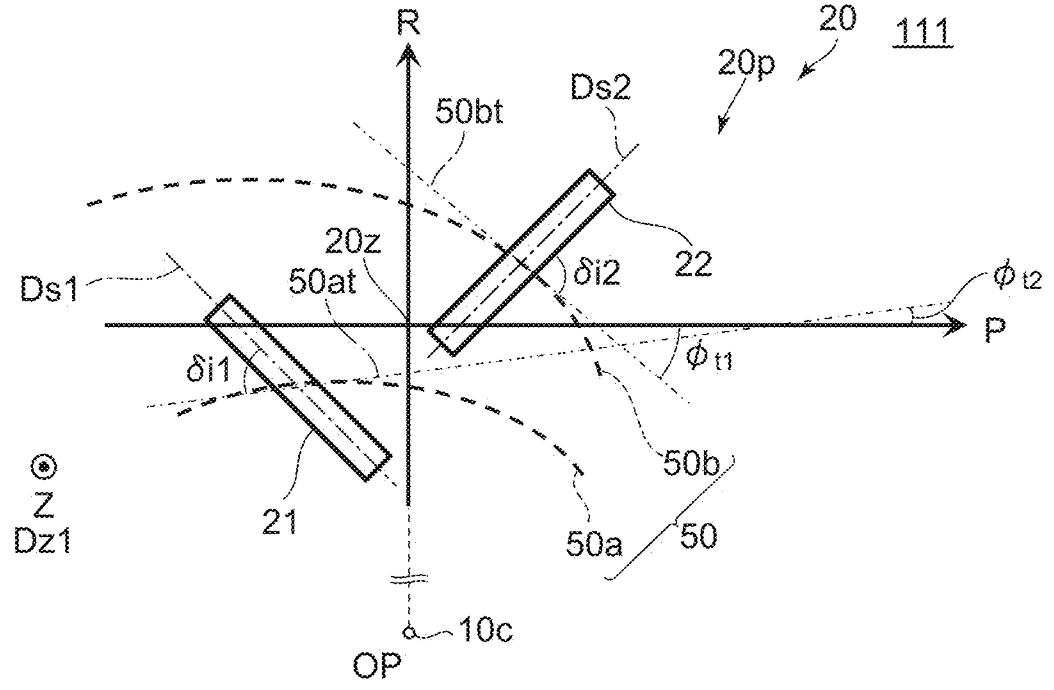
FIG. 20 is a schematic plan view illustrating a part of an antenna device according to the first embodiment.

FIG. 20 is a schematic plan view illustrating a part of an antenna device according to the first embodiment.

As shown in FIG. 20, in an antenna device 111 according to the embodiment, the curvatures of the plurality of equiphase surfaces 50 (such as the first equiphase surface 50$a$ and the second equiphase surface 50$b$) are different from each other. The first equiphase surface 50$a$ corresponds to the equiphase surface of the radio-frequency signal propagating through the waveguide 10$w$ that passes through the center of the first slot 21. The second equiphase surface 50$b$ corresponds to the equiphase surface of the radio-frequency signal propagating through the waveguide 10$w$ that passes through the center of the second slot 22.

A first tangent 50$at$ corresponds to a tangent of the first equiphase surface 50$a$ at the center of the first slot 21. A second tangent 50$bt$ corresponds to a tangent of the second equiphase surface 50$b$ at the center of the second slot 22. The first angle δi1 corresponds to the angle between the first slot direction Ds1 and the first tangent 50$at$. The second angle δi2 corresponds to the angle between the second slot direction Ds2 and the second tangent 50$bt$. The first tangent angle $\phi_{t1}$ corresponds to the angle between the first tangent 50$at$ and the P-axis. The second tangent angle $\phi_{t2}$ corresponds to the angle between the second tangent 50$bt$ and the P-axis. In FIG. 20, the R-axis is along a straight line connecting the feed point 10$c$ and the center 20$z$ of the slot pair 20$p$.

In the plurality of slot pairs 20$p$, the first slot angle δ1 and the second slot angle δ2 (see FIG. 17) are substantially the same as each other, while the plurality of slot pairs 20$p$ are rotated at the arrangement angle SA illustrated by the solid line in FIG. 19. In the example of the slot pair 20$p$ illustrated in FIG. 20, the absolute value of the first tangent angle $\phi_{t1}$ is different from the absolute value of the second tangent angle $\phi_{t2}$. For example, in a region where the curvature of the equiphase surface 50 of the radio-frequency signal propagating through the waveguide 10$w$ is high, in one of the plurality of slot pairs 20$p$, the first slot angle δ1 is substantially the same as the second slot angle δ2. Furthermore, the plurality of slot pairs 20$p$ are rotated at the arrangement angle SA illustrated by the solid line in FIG. 19. In such a case, the first angle δi1 may be a value different from the second angle δi2.

For example, the first slot 21 and the second slot 22 may be arranged so that the first angle δi1 is substantially the same as the second angle δi2, while taking into consideration the value of the first tangent angle $\phi_{t1}$ and the value of the second tangent angle $\phi_{t2}$. This improves the radiation characteristics of the slot pair 20$p$. The bandwidth can be widened in the slot pair 20$p$. The characteristics of the antenna device are improved. In the antenna device 111, the first slot angle δ1 may be different from the second slot angle δ2.

Figure 21A:
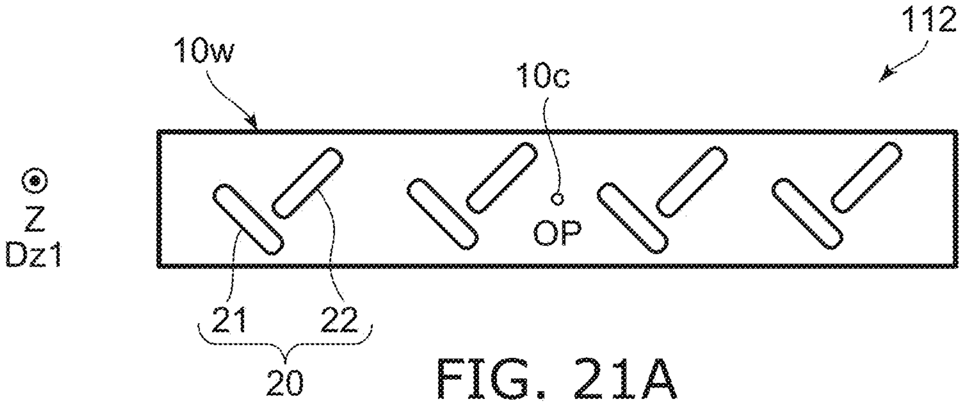
FIGS. 21A and 21B are schematic diagrams illustrating an antenna device according to the first embodiment.
Figure 21B:
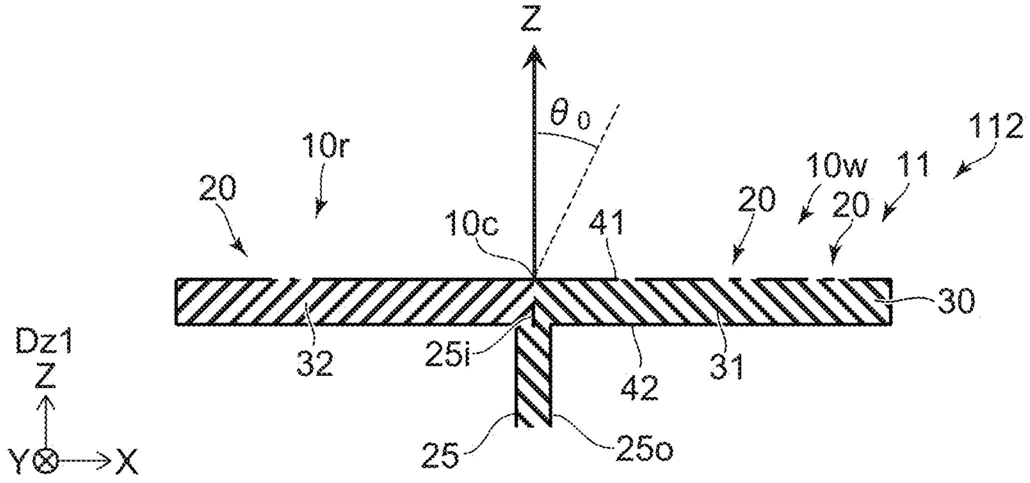

FIGS. 21A and 21B are schematic diagrams illustrating an antenna device according to the first embodiment.

FIG. 21A is a plan view. FIG. 21B is a cross-sectional view.

As shown in FIG. 21A, in an antenna device 112 according to the embodiment, the waveguide 10$w$ is a rectangular waveguide. In the antenna device 112, the rectangular waveguide of the waveguide 10$w$ may be formed, for example, by cutting a metal. The rectangular waveguide of the waveguide 10$w$ may be, for example, a substrate integrated waveguide (SIW). The SIW may be formed using, for example, a dielectric substrate. In the antenna device 112, the plurality of radiating portions 20 may be slots provided in the waveguide 10$w$.

As shown in FIG. 21B, in the antenna device 112, the first region 10$r$ includes the first partial region 11 and the second partial region 12. The first guided wavelength λ1 in the waveguide in the first partial region 11 is shorter than the second guided wavelength λ2 in the waveguide in the second partial region 12.

In the embodiment, the waveguide 10$w$ may be a rectangular waveguide. The waveguide 10$w$ may be, for example, a ridge waveguide. The waveguide 10$w$ may be, for example, a gap waveguide. The waveguide 10$w$ may be, for example, a parallel plate waveguide. The waveguide 10$w$ may be, for example, a dielectric waveguide. In the embodiment, in various waveguides 10$w$, for example, the slow wave factor ξ in the beam tilt direction is high (the guided wavelength is short) and the slow wave factor ξ in the direction opposite to the beam tilt direction is low (the guided wavelength is long). This suppresses grating lobes without excessively narrowing the spacing between the plurality of radiating portions 20.

In the embodiment, in each of the plurality of slot pairs 20$p$, the angle between the equiphase surface 50 of the radio-frequency signal propagating through the waveguide 10$w$ and the first slot direction Ds1 at the position of the first slot 21 is substantially the same as the angle between the equiphase surface 50 of the radio-frequency signal propagating through the waveguide 10$w$ and the second slot direction Ds2 at the position of the second slot 22. In the antenna device 112, the radiation characteristics are improved. Wide bandwidth operation is achieved. The characteristics of the antenna device are improved.

Hereinafter, examples of the characteristics of the antenna device will be described.

Figure 22A:
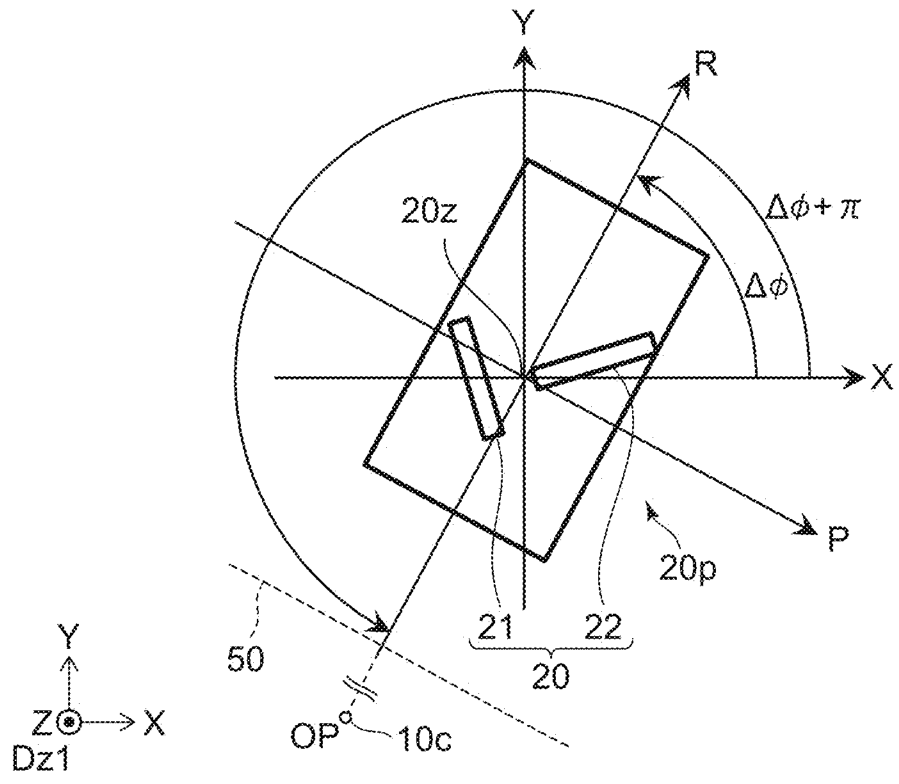
FIGS. 22A and 22B are schematic diagrams illustrating the antenna device according to the first embodiment.
Figure 22B:
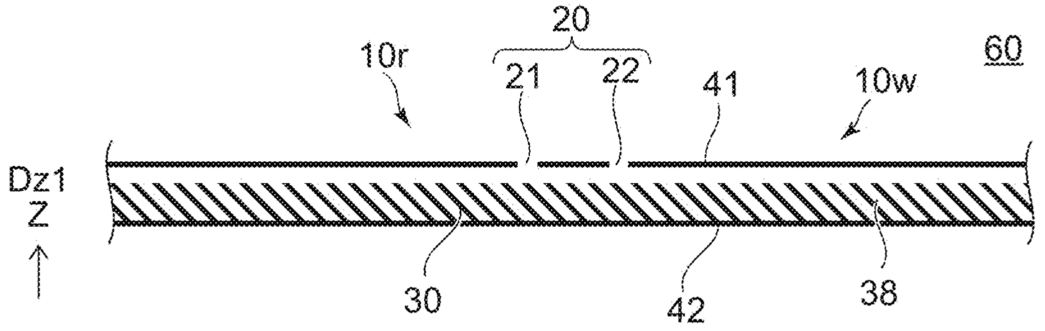

FIGS. 22A and 22B are schematic diagrams illustrating the antenna device according to the first embodiment.

FIG. 22A is a plan view. FIG. 22B is a cross-sectional view along the R-Z plane. In this example, the configuration of antenna device 110 is applied as the antenna device.

FIG. 22A and FIG. 22B illustrate an analytical model 60 for the antenna device 110. In FIG. 22A, the X-axis corresponds to the direction in which the azimuth angle ϕ is 0 in FIG. 2. The waveguide 10$w$ is configured so that the radio-frequency signal propagates along the R-axis. In the analytical model 60, the radio-frequency signal propagates in the waveguide 10$w$ along the R-axis from a position at an angle of $(\Delta\phi+\pi)$ to a position at an angle of $\Delta\phi$. In the analytical model 60, the equiphase surface 50 of the radio-frequency signal is parallel to the P-axis. The angle difference $\Delta\phi$ is $\phi-\phi_0$.

The radio-frequency signal excites a first slot 21 and a second slot 22 provided in the waveguide 10*w*. The slot pair 20*p* includes a first slot 21 and a second slot 22. The slot pair 20*p* in FIG. 22(*a*) is rotated by an angle of ($\Delta\phi$−90°) around the center 20*z* of the slot pair 20*p* from the state of the slot pair 20*p* illustrated in FIG. 3.

The slot pair 20*p* is configured to radiate circularly polarized waves. The slot pair 20*p* may be designed, for example, to have a good axial ratio in the main radiation direction 91D. The axial ratio is the ratio of the major axis length to the minor axis length in the circularly polarized waves radiated by the slot pair 20*p*. In general, when the axial ratio in the main radiation direction of the antenna is 3 dB or less, the antenna is defined as radiating circularly polarized waves.

Figure 23:
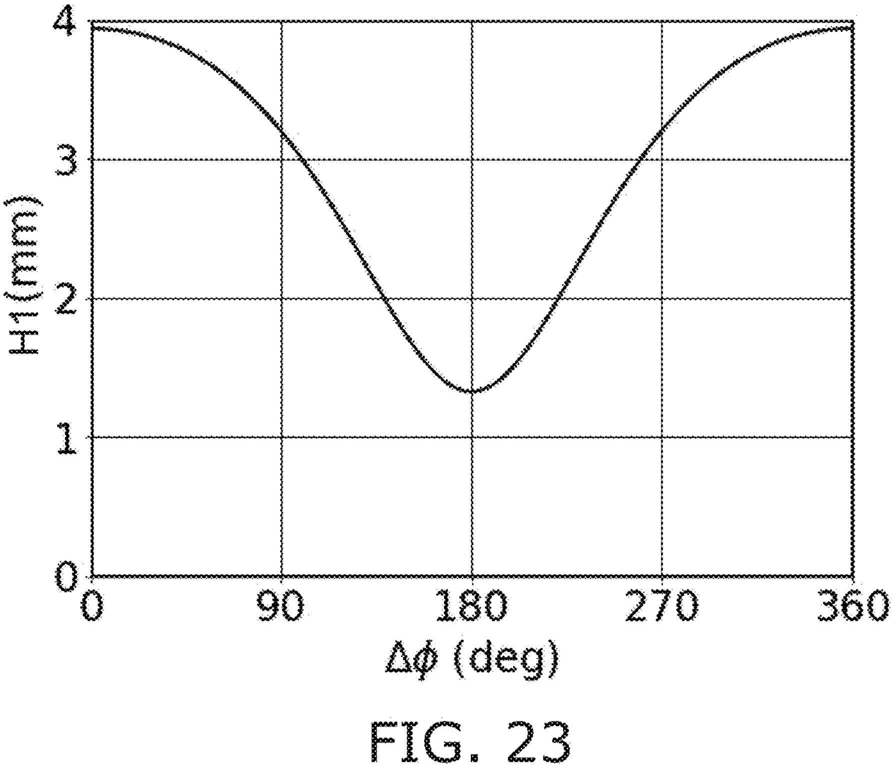
FIG. 23 is a graph illustrating the antenna device according to the first embodiment.

FIG. 23 is a graph illustrating the antenna device according to the first embodiment.

FIG. 23 shows the thickness of the dielectric 38 of the first member 30 provided in the waveguide 10*w* of the antenna device 110. In FIG. 23, the horizontal axis is the angle difference $\Delta\phi$. The vertical axis is the thickness H1 of the dielectric 38. Thickness H1 is the length along the Z-axis direction.

The thickness (length in the Z-axis direction) of the waveguide 10*w* is 4.00 mm. In the example of FIG. 23, the thickness H1 of the dielectric 38 changes depending on the angle difference $\Delta\phi$. In this example, when the angle difference $\Delta\phi$ is 0°, the thickness H1 is 3.99 mm. When the angle difference $\Delta\phi$ is 90°, the thickness H1 is 3.20 mm.

A ratio HD is derived from the thickness H1 illustrated in FIG. 23. The ratio HD is the ratio of the thickness H1 of the dielectric 38 to the distance along the Z-axis direction between the second conductive layer 42 and the first conductive layer 41. The relationship between the ratio HD and the distribution of the effective relative dielectric constant $\varepsilon_{r1}$ is expressed by the seventh formula.

The dielectric 38 is disposed so as to be in contact with the second conductive layer 42. A gap is provided between the dielectric 38 and the first conductive layer 41 according to the difference in height. The dielectric constant of the dielectric 38 is 5.0.

In the analytical model 60, the dielectric 38 having the characteristics shown in FIG. 23 is provided. In the analytical model 60, the following parameters are applied (see FIG. 3).

x1: −2.10 mm
x2: 2.10 mm
y1: −2.23 mm
y2: 2.23 mm
L1: 8.50 mm
L2: 8.50 mm
w1: 0.80 mm
w2: 0.80 mm
$\delta$1: 45°
$\delta$2: 45°

The effective relative dielectric constant in the waveguide 10*w* is a value at which the radial interval $S_\rho$ of the plurality of radiating portions 20 on the waveguide 10*w* is substantially $0.90\lambda_0/(1+|\sin\theta_0|)$, independent of the azimuth angle $\phi$. This value is derived by the sixth formula. The coefficient $\alpha$ in the sixth formula is 0.9. The tilt angle $\theta_0$ is 30°. "$\lambda_0$" is the wavelength in free space of the radio-frequency signal. The frequency of the radio-frequency signal is 12.5 GHz.

Figure 24:
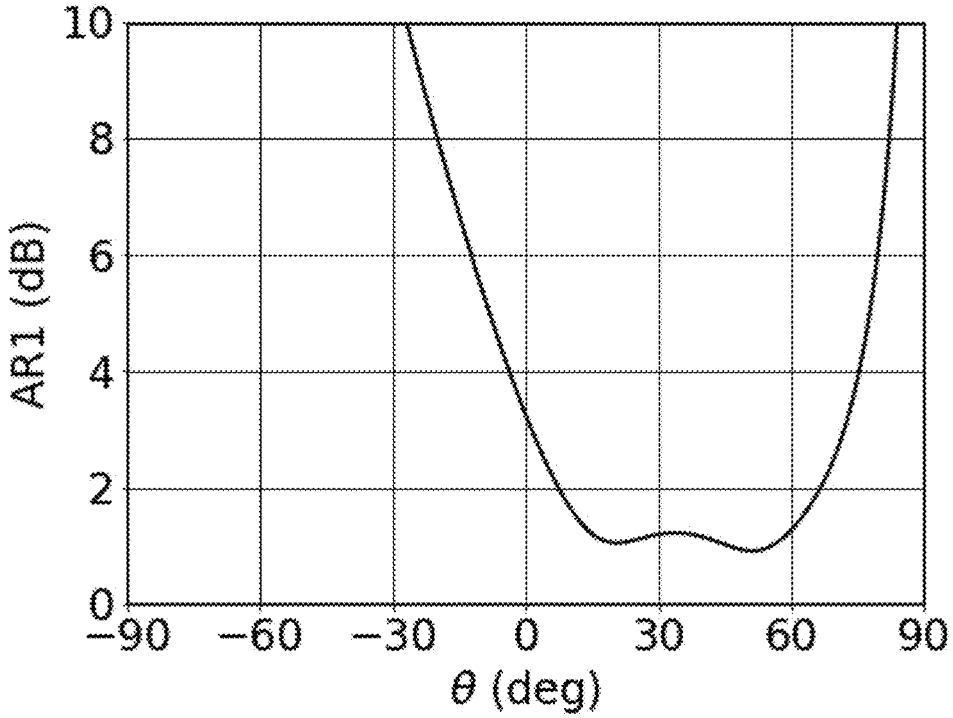
FIG. 24 is a graph illustrating the antenna device according to the first embodiment.

FIG. 24 is a graph illustrating the antenna device according to the first embodiment.

FIG. 24 shows an example of analysis results relating to the characteristics of slot pair 20*p*.

In FIG. 24, the angle difference $\Delta\phi$ is 90°. The horizontal axis of FIG. 24 is the tilt angle $\theta$. The vertical axis of FIG. 24 is an axial ratio AR1 of the electromagnetic wave radiated by slot pair 20*p*. The axial ratio AR1 is the ratio of the long axis length to the short axis length of the circularly polarized wave radiated by slot pair 20*p* in the main radiation direction 91D.

In FIG. 24, the tilt angle $\theta$ is 30° in the main radiation direction 91D. The axial ratio AR1 of slot pair 20*p* in the main radiation direction 91D is 1.2 dB. In general, when the axial ratio in the main radiation direction of an antenna is 3 dB or less, the antenna can radiate circularly polarized waves. As illustrated in FIG. 24, it can be seen that slot pair 20*p* is capable of radiating circularly polarized waves.

Figure 25A:
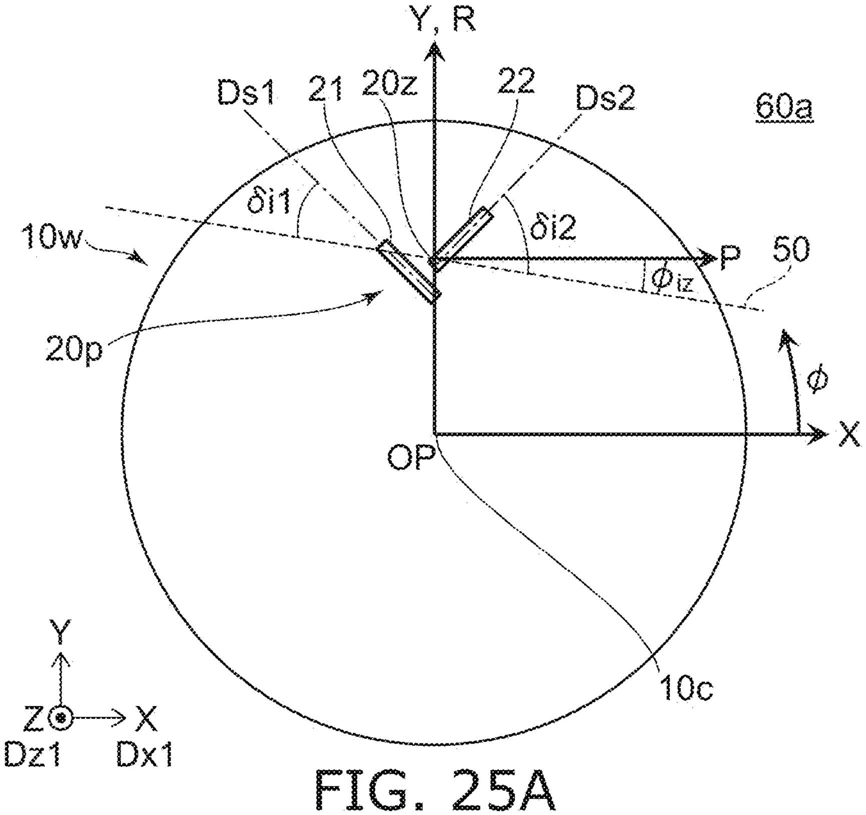
FIGS. 25A and 25B are schematic plan views illustrating an antenna device.
Figure 25B:
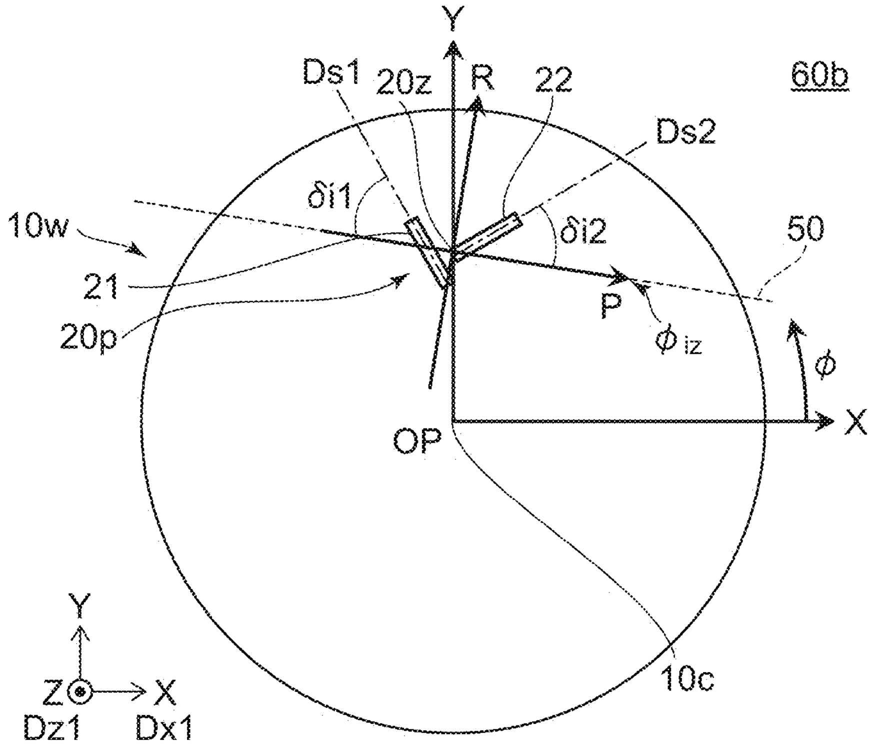

FIGS. 25A and 25B are schematic plan views illustrating an antenna device.

FIG. 25A corresponds to the first analytical model 60*a*. FIG. 25B corresponds to the second analytical model 60*b*. In these analytical models, the first slot 21 and the second slot 22 are provided. The angle between the equiphase surface 50 at the position of the center 20*z* of the slot pair 20*p* and the X-axis is defined as angle $\phi_{iz}$. In FIGS. 25A and 25B, the X-axis is parallel to the direction of $\phi_0=0$ in FIG. 9.

In the first analytical model 60*a*, the slot pair 20*p* is arranged so that the R-axis is along a line connecting the feed point 10*c* and the center 20*z* of the slot pair 20*p*. In the first analytical model 60*a*, the angle $\phi_{iz}$ is −16.6 degrees.

In the second analytical model 60*b*, the slot pair 20*p* is arranged so that the P-axis is aligned with the equiphase surface 50. In the second analytical model 60*b*, the angle $\phi_{iz}$ is 0°.

In the first analytical model 60*a*, the first angle $\delta$i1 between the first slot direction Ds1 and the equiphase surface 50 is different from the second angle $\delta$i2 between the second slot direction Ds2 and the equiphase surface 50. In the first analytical model 60*a*, a difference in characteristics occurs between the first slot 21 and the second slot 22. As a result, the radiation characteristics of the slot pair 20*p* are low.

In the second analytical model 60*b*, the first angle $\delta$i1 is the same as the second angle $\delta$i2. The difference in characteristics between the first slot 21 and the second slot 22 is suppressed. Thereby, the radiation characteristics of the slot pair 20*p* are improved.

Figure 26:
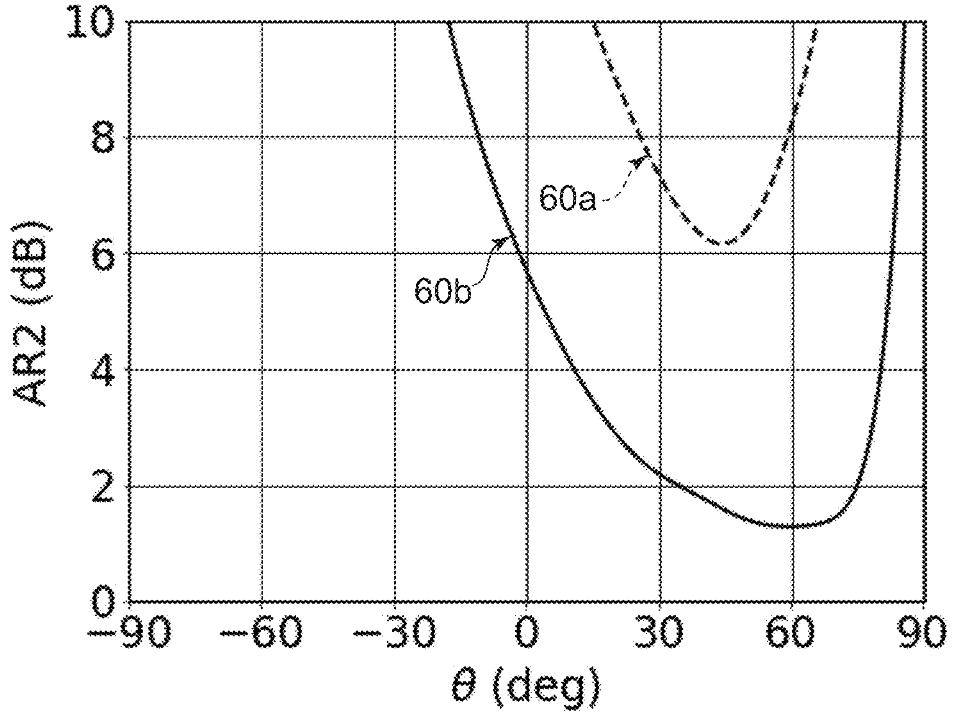
FIG. 26 is a graph illustrating the characteristics of the antenna device.

FIG. 26 is a graph illustrating the characteristics of the antenna device.

FIG. 26 illustrates the results of a simulation of the characteristics relating to the first analytical model 60*a* and the second analytical model 60*b*. The horizontal axis of FIG. 26 is the tilt angle $\theta$. The vertical axis is an axial ratio AR2. The axial ratio AR2 is the axial ratio of the electromagnetic waves radiated by the slot pair 20*p* in the R-Z plane. In the example of FIG. 26, the tilt angle $\theta$ is 30° in the main radiation direction 91D.

As shown in FIG. 26, in the first analytical model 60*a*, the axial ratio AR2 is 7.4 dB when the tilt angle $\theta$ is 30°. On the other hand, in the second analytical model 60*b*, the axial ratio AR2 is 2.2 dB when the tilt angle $\theta$ is 30°.

In the first analytical model 60*a*, the axial ratio AR2 is greater than 3 dB when the tilt angle $\theta$ is 30°. In the first analytical model 60*a*, the slot pair 20*p* does not operate as a circularly polarized antenna.

In the second analytical model 60*b*, the axial ratio AR2 is 3 dB or less when the tilt angle θ is 30°. In the second analytical model 60*b*, the slot pair 20*p* operates as a circularly polarized antenna.

In the embodiment, the slot pair 20*p* is arranged so that the first angle δi1 is substantially the same as the second angle δi2. In this embodiment, the slot pair 20*p* is arranged so that the angle $\phi_{iz}$ is substantially 0°. Thereby, the characteristics of the antenna device are improved.

In the first analytical model 60*a* and the second analytical model 60*b*, the direction of θ=30° in the R-Z plane and the main radiation direction 91D are different from each other. For example, the arrangement position of the slot pair 20*p* in the waveguide 10*w* may be optimized so that the axial ratio AR2 in the ($\theta_0$, $-\phi_1$) direction is good. This provides a good axial ratio AR2 in the main radiation direction 91D of the slot pair 20*p*. For example, the slot pair 20*p* is arranged by rotating at an angle of ($\Delta\phi+\phi_1$). This provides good characteristics of the slot pair 20*p* in the ($\theta_0$, $\phi_0$) direction. The characteristics of the antenna device are improved.

Figure 27:
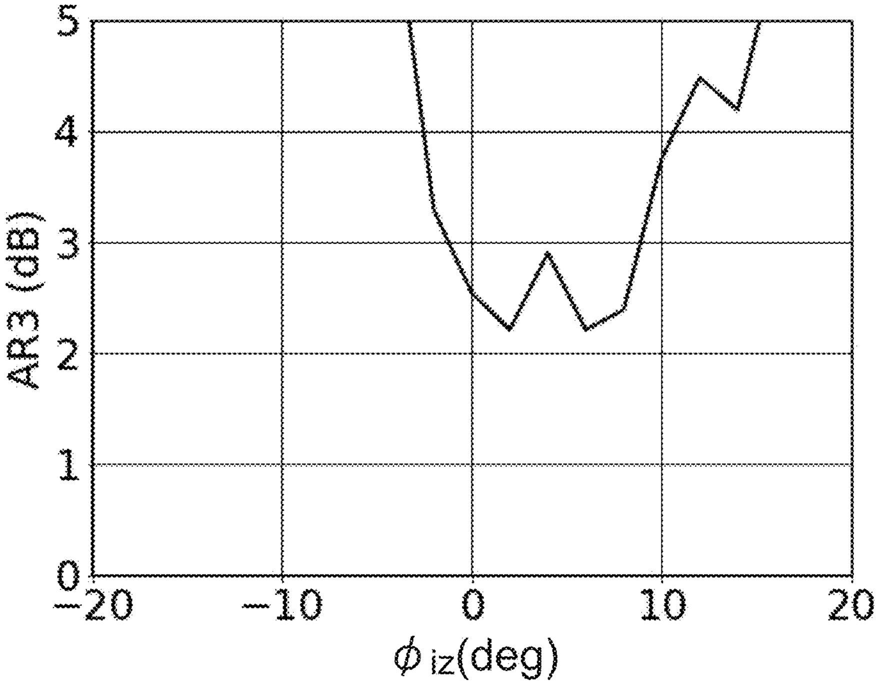
FIG. 27 is a graph illustrating the characteristics of the antenna device.

FIG. 27 is a graph illustrating the characteristics of the antenna device.

FIG. 27 shows the simulation results of the characteristics when the angle $\phi_{iz}$ changed in the first analytical model 60*a*. The horizontal axis of FIG. 28 is the angle $\phi_{iz}$. The vertical axis is an axial ratio AR3 of the slot pair 20*p*. The axial ratio AR3 is the axial ratio of the slot pair 20*p* in the R-Z plane.

In FIG. 27, the range of angle $\phi_{iz}$ where the axial ratio AR3 at θ=30° is 3 dB or less is not less than −1° and not more than +9°. When angle $\phi_{iz}$ is 0°, the axial ratio AR3 is not the best. This characteristic is thought to be due to an error in the design of slot pair 20*p*. In the case where axial ratio AR3 is the best when angle $\phi_{iz}$ is 0°, the range of angle $\phi_{iz}$ where the axial ratio AR3 at θ=30° is 3 dB or less is thought to be not less than −5° and not more than +5°. Good characteristics are obtained when angle $\phi_{iz}$ is note less than −5° and not more than 5°. For example, good characteristics are obtained when the absolute value of the difference between the first angle oil and the second angle δi2 is 10° or less.

Figure 28A:
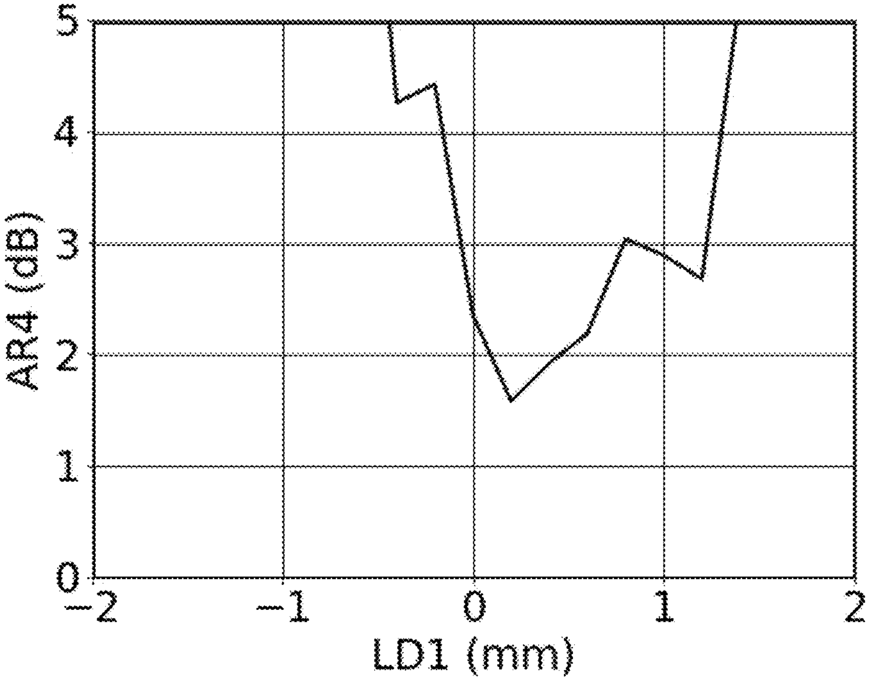
FIGS. 28A and 28B are graphs illustrating the characteristics of the antenna device.
Figure 28B:
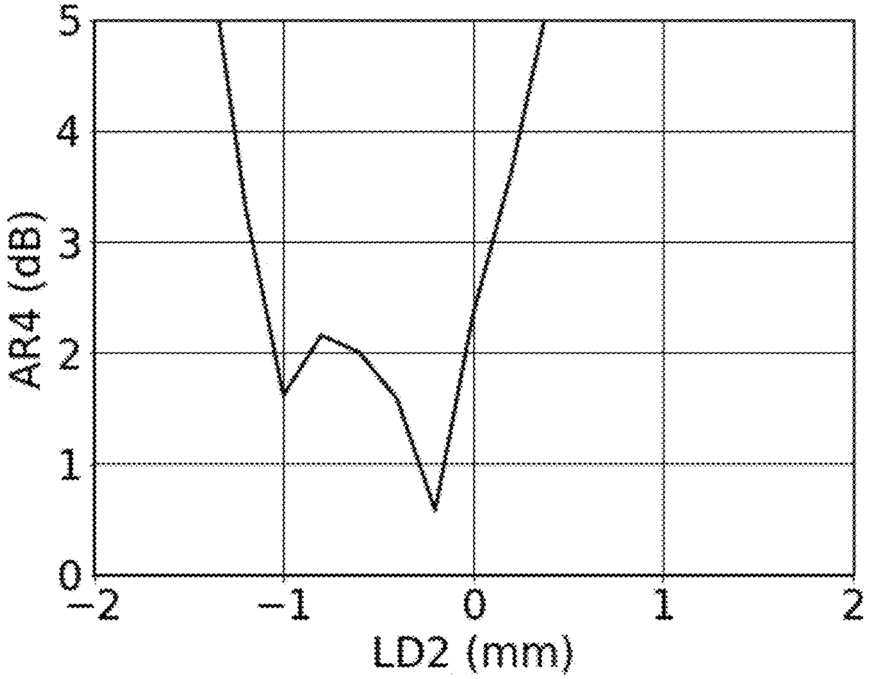

FIGS. 28A and 28B are graphs illustrating the characteristics of the antenna device.

FIG. 28A illustrates the results of a simulation of the characteristics when the second slot length L2 is fixed and the first slot length L1 is changed in the second analytical model 60*b*. The horizontal axis of FIG. 28A is the amount of change LD1 in the first slot length L1. When the amount of change LD1 is 0, the first slot length L1 is the same as the second slot length L2. The vertical axis of FIG. 28A is an axial ratio AR4 of the slot pair 20*p* in the R-Z plane. The tilt angle θ is 30°.

FIG. 28B illustrates the results of a simulation of the characteristics when the first slot length L1 is fixed and the second slot length L2 is changed in the second analytical model 60*b*. The horizontal axis of FIG. 28B is the amount of change LD2 in the second slot length L2. When the amount of change LD2 is 0, the second slot length L2 is the same as the first slot length L1. The vertical axis of FIG. 28B is the axial ratio AR4 of the slot pair 20*p* in the RZ plane. The tilt angle θ is 30°.

As shown in FIG. 28A, when θ=30°, the range of change LD1 where the axial ratio AR4 is 3 dB or less is not less than −0.05 mm and not more than 0.80 mm.

As shown in FIG. 28B, when θ=30°, the range of change LD2 where the axial ratio AR4 is 3 dB or less is not less than −1.16 mm and not more than 0.10 mm.

Good characteristics are obtained when the difference between the first slot length L1 and the second slot length L2 is 1.16 mm or less.

In the analytical model 60, the first analytical model 60*a*, and the second analytical model 60*b*, "$\lambda_0$" is the wavelength in free space of the radio-frequency signal propagating through the waveguide 10*w*. The frequency of the radio-frequency signal is 12.5 GHz. In this case, "$\lambda_0$" is substantially 23.98 mm. In the embodiment, the difference between the first slot length L1 and the second slot length L2 is $0.05\lambda_0$ or less. Good characteristics are obtained.

Second Embodiment

Figure 29:
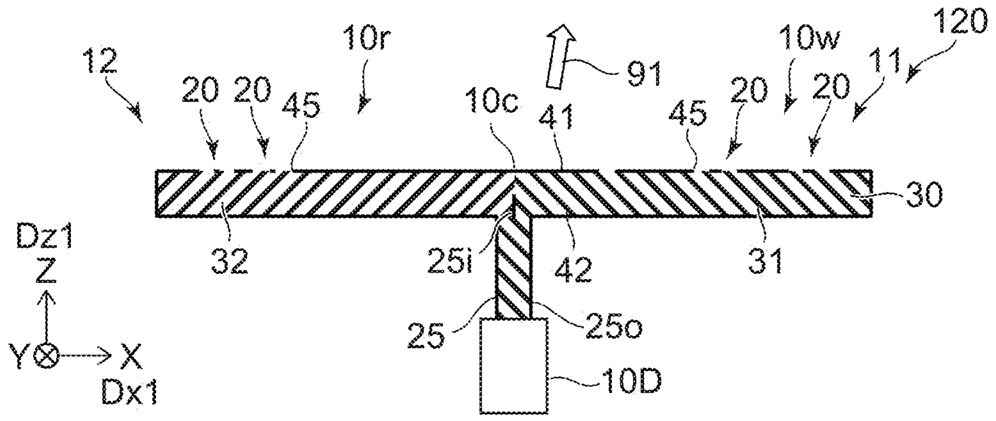
FIG. 29 is a schematic cross-sectional view illustrating an antenna device according to a second embodiment.

FIG. 29 is a schematic cross-sectional view illustrating an antenna device according to a second embodiment.

As shown in FIG. 29, the antenna device 120 according to the embodiment includes a first driver 10D. The configuration of the antenna device 120 except for this may be the same as the configuration of the antenna device according to the first embodiment (such as the antenna device 110).

The first driver 10D is configured to rotate the waveguide 10*w* in the plane (X-Y plane) including the first region 10*r*. By rotating the waveguide 10*w*, the first electromagnetic waves 91 radiated from the plurality of radiating portions 20 may be conically scanned.

The first driver 10D may mechanically (physically) rotate the waveguide 10*w*. For example, conical scanning of the beam (first electromagnetic wave 91) becomes possible. Unlike a phased array that performs beam scanning electronically, beam scanning becomes possible without using circuit elements such as a phase shifter.

The antenna device 120 may be used as a receiving device. The antenna device 120 can receive electromagnetic waves arriving from a direction of angle ($\theta_0$, $\phi_0$), for example.

Figure 30:
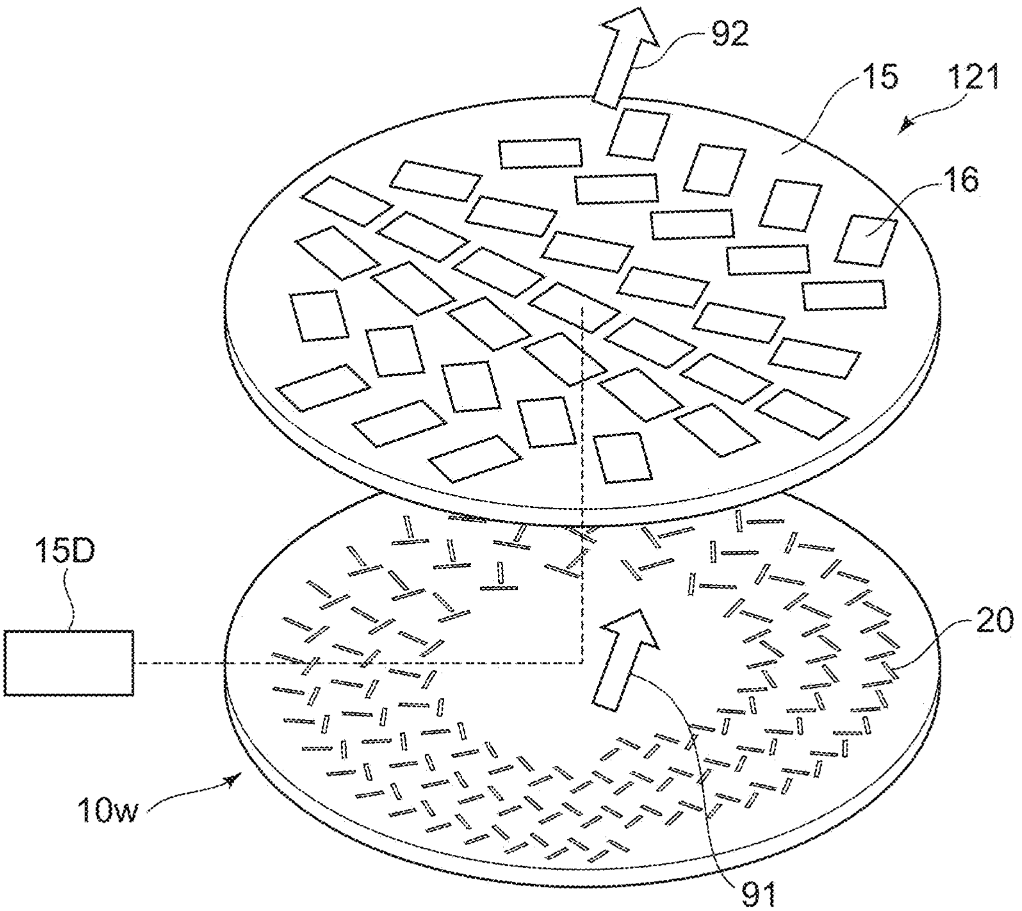
FIG. 30 is a schematic perspective view illustrating an antenna device according to the second embodiment.

FIG. 30 is a schematic perspective view illustrating an antenna device according to the second embodiment.

As shown in FIG. 30, an antenna device 121 according to the embodiment further includes a transmitting member 15 in addition to the waveguide 10*w*. The configuration of the antenna device 121 except for this may be the same as the configuration of the antenna device 110, etc.

The transmitting member 15 transmits the first electromagnetic wave 91 emitted from the plurality of radiating portions 20. The transmitting member 15 may be capable of changing the transmission phase of the first electromagnetic wave 91. For example, a direction of a second electromagnetic wave 92 emitted from the transmitting member 15 changes depending on the change in the transmission phase.

The transmitting member 15 tilts the beam, for example, by changing the transmission phase of the electromagnetic field of the first electromagnetic wave 91. The tilt angle of the beam by the transmitting member 15 may be the same as or different from the tilt angle of the beam in the waveguide 10*w*.

In the example of FIG. 30, the transmitting member 15 includes plurality of transparent portions 16. In this example, the distribution of the plurality of transparent portions 16 varies within the plane.

As shown in FIG. 30, the antenna device 121 may further include a second driver 15D. The second driver 15D is configured to rotate the transmitting member 15. The direction of the second electromagnetic wave 92 changes depending on the rotation of the transmitting member 15.

Figure 31:
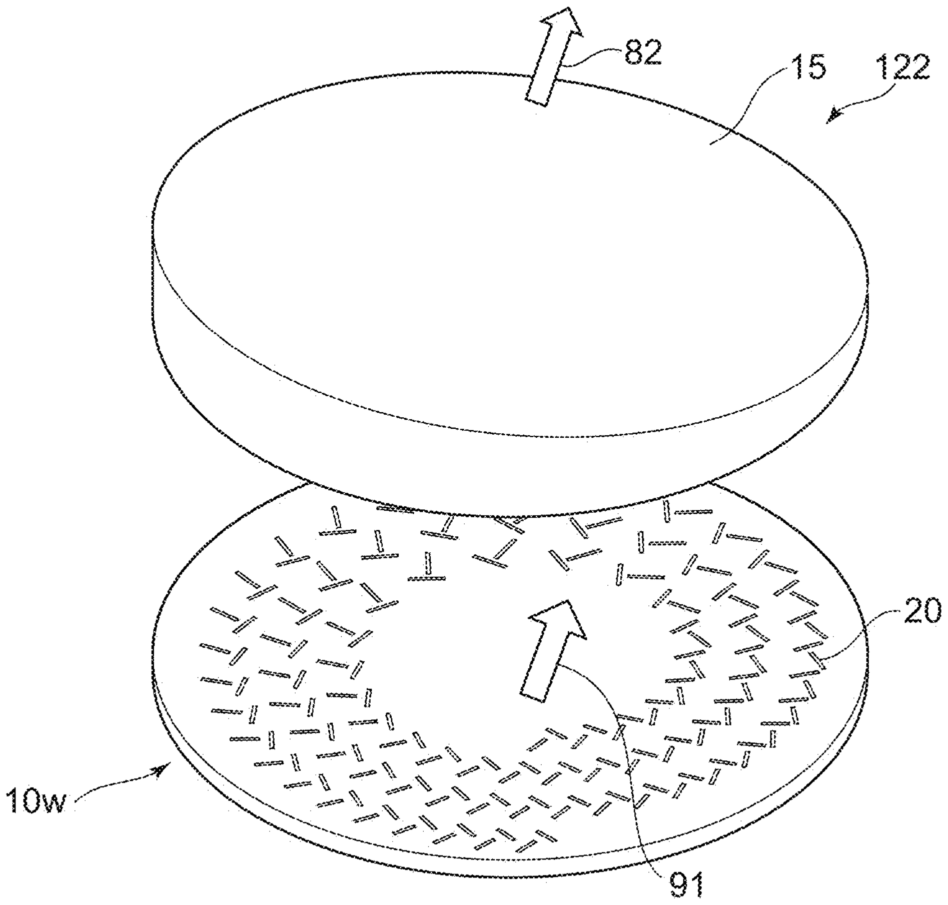
FIG. 31 is a schematic perspective view illustrating an antenna device according to the second embodiment.

FIG. 31 is a schematic perspective view illustrating an antenna device according to the second embodiment.

As shown in FIG. 31, the transmitting member 15 is also provided in an antenna device 122 according to the embodiment. In the antenna device 122, the thickness of the transmitting member 15 varies in-plane.

The transmitting member 15 may include a transmit array. The transmit array includes, for example, plurality of elements (unit cells) with different transmission phase.

Figure 32:
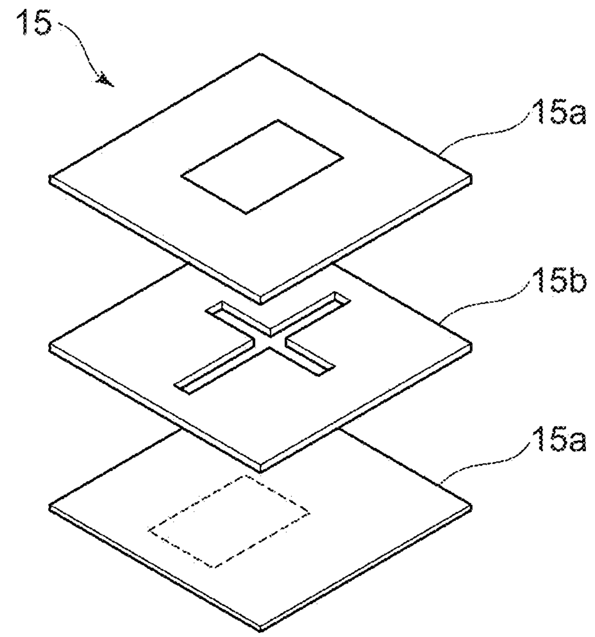
FIG. 32 is a schematic diagram illustrating a part of the antenna device according to the second embodiment.

FIG. 32 is a schematic diagram illustrating a part of the antenna device according to the second embodiment.

FIG. 32 illustrates one unit cell included in a transmit array. In the example of FIG. 32, two dielectric substrates 15*a* provided with metal patches are combined with a metal plate 15*b* provided with a cross-shaped slot. By changing the rotation angle of the unit cell, the transmission phase of the circularly polarized wave can be changed. For example, by further increasing the number of dielectric substrates 15*a*, the rotation angle of the unit cell can be further increased. The unit cell can be made broadband.

For example, the transmitting member 15 illustrated in FIG. 30 may be rotated in-plane. For example, the transmission phase of a circularly polarized wave can be changed. The transmitting member 15 can tilt the beam by changing the transmission phase of an electromagnetic wave, for example. The configuration of the transmitting member 15 can be modified in various ways.

Figure 33:
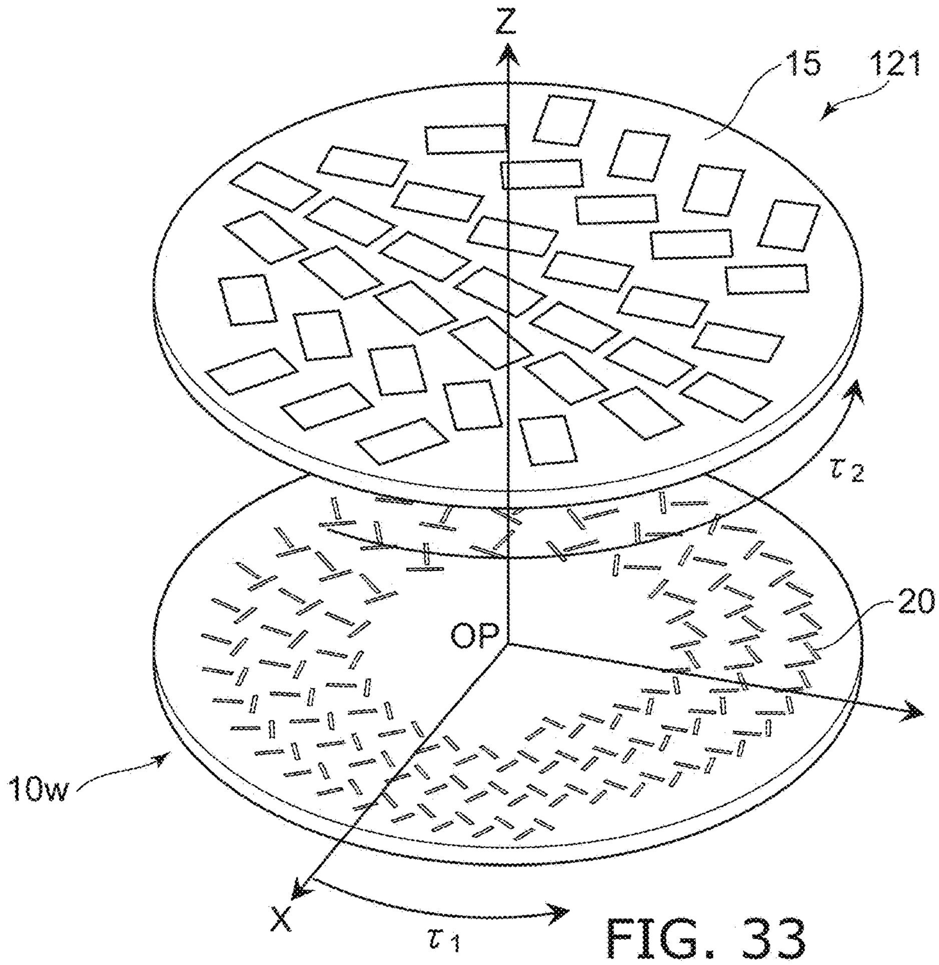
FIG. 33 is a schematic diagram illustrating an antenna device according to the second embodiment.
Figure 34:
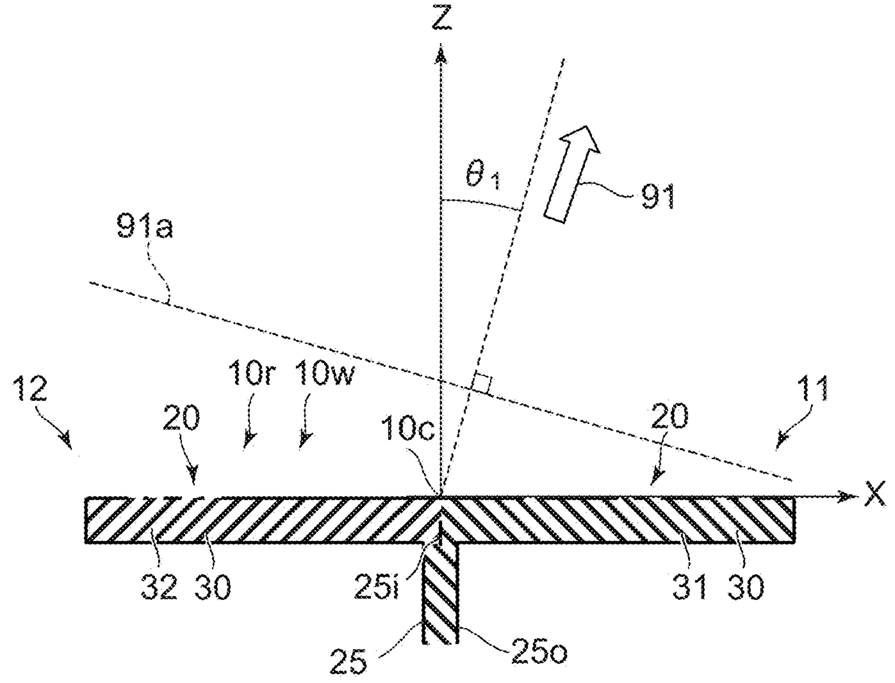
FIG. 34 is a schematic diagram illustrating an antenna device according to the second embodiment.
Figure 35:
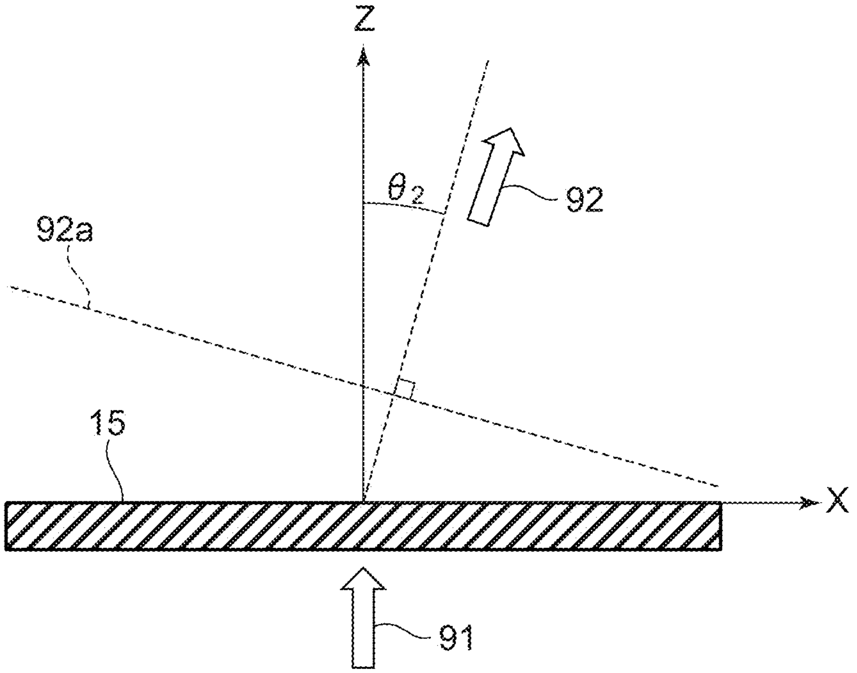
FIG. 35 is a schematic diagram illustrating an antenna device according to the second embodiment.

FIGS. 33 to 35 are schematic diagrams illustrating an antenna device according to the second embodiment.

As shown in FIG. 33, a rotation angle in the waveguide 10*w* is defined as a first rotation angle $\tau_1$. A rotation angle in the transmitting member 15 is defined as a second rotation angle $\tau_2$.

As shown in FIG. 34, for example, when the first rotation angle $\tau_1$ in the waveguide 10*w* is 0, the first electromagnetic wave 91 is radiated from the waveguide 10*w* in a direction of angle $\theta_1$. An equiphase surface 91*a* is formed in the first electromagnetic wave 91. The equiphase surface 91*a* is perpendicular to the direction of angle $\theta_1$. The first electromagnetic wave 91 is radiated in the direction of angle $\theta_1$.

As shown in FIG. 35, a transmission phase distribution 92*a* is formed in the transmitting member 15. For example, when the first electromagnetic wave 91 is irradiated onto the transmitting member 15, the transmitting member 15 radiates a second electromagnetic wave 92 in the direction of angle $\theta_2$.

The transmitting member 15 is superimposed on the waveguide 10*w*. In this state, the waveguide 10*w* is rotated by the first rotation angle $\tau_1$, and the transmitting member 15 is rotated by the second rotation angle $\tau_2$. In this case, the x-component "$k_x$" and y-component "$k_y$" of the wave number of the second electromagnetic wave 92 transmitted through the transmitting member 15 are expressed by the following eighth formula.

$$\begin{cases} k_x = k_0(\sin\theta_1\cos\tau_1 + \sin\theta_2\cos\tau_2) \\ k_y = k_0(\sin\theta_1\sin\tau_1 + \sin\theta_2\sin\tau_2) \end{cases} \tag{8}$$

In the eighth formula, the wave number $k_0$ is $2_\pi/\lambda_0$. $\lambda_0$ is the wavelength in free space of the radio-frequency signal transmitted and received by the antenna device.

From eighth formula, the tilt direction ($\theta_0$, $\phi_0$) of the beam in the antenna device is expressed by the following formulas 9 and 10.

$$\theta_0 = \sin^{-1}\frac{\sqrt{k_x^2 + k_y^2}}{k_0} \tag{9}$$

$$\phi_0 = \tan^{-1}\frac{k_y}{k_x} \tag{10}$$

"$k_x$" and "$k_y$" change depending on the first rotation angle $\tau_1$ of the waveguide 10*w* and the second rotation angle $\tau_2$ of the transmitting member 15. By these rotation angles, the tilt direction ($\theta_0$, $\phi_0$) of the beam can be changed.

For example, the waveguide 10*w* with the angle $\theta_1$ of 30° or more is combined with the transmitting member 15 with the angle $\theta_2$ of 30° or more. The first rotation angle $\tau_1$ of the waveguide 10*w* and the second rotation angle $\tau_2$ of the transmitting member 15 are changed (rotated) in the range of not less than −180° and not more than 180°. As a result, the tilt angle $\theta_0$ changes in the range of not less than 0° and not more than 90°, and the angle $\phi_0$ changes in the range of not less than −180° and not more than 180°. Two-dimensional beam scanning in any direction is possible.

Figure 36A:
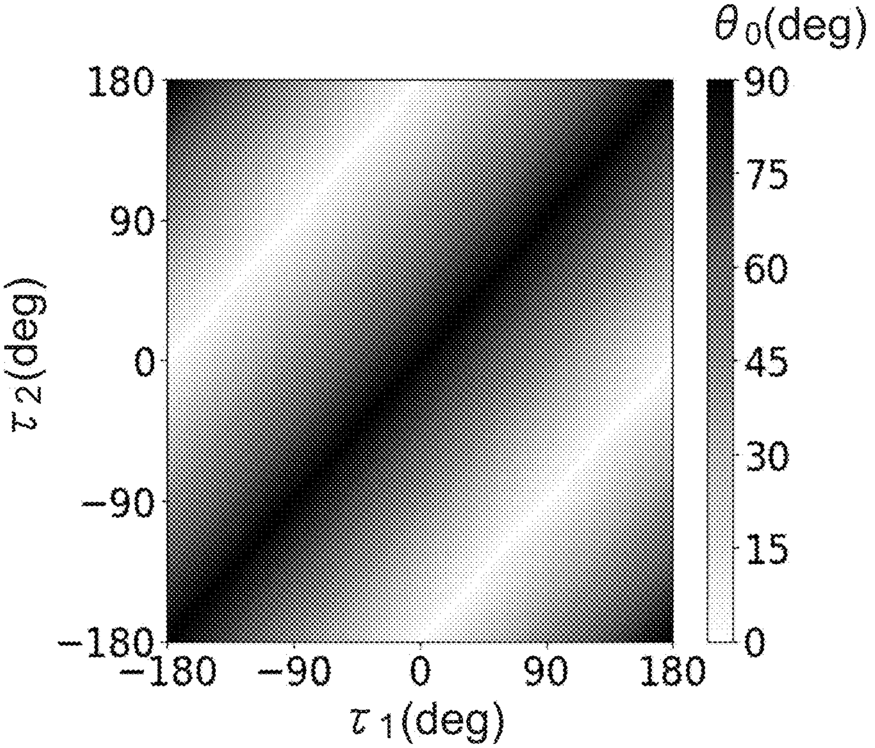
FIGS. 36A and 36B are schematic diagrams illustrating the characteristics of the antenna device according to the second embodiment.
Figure 36B:
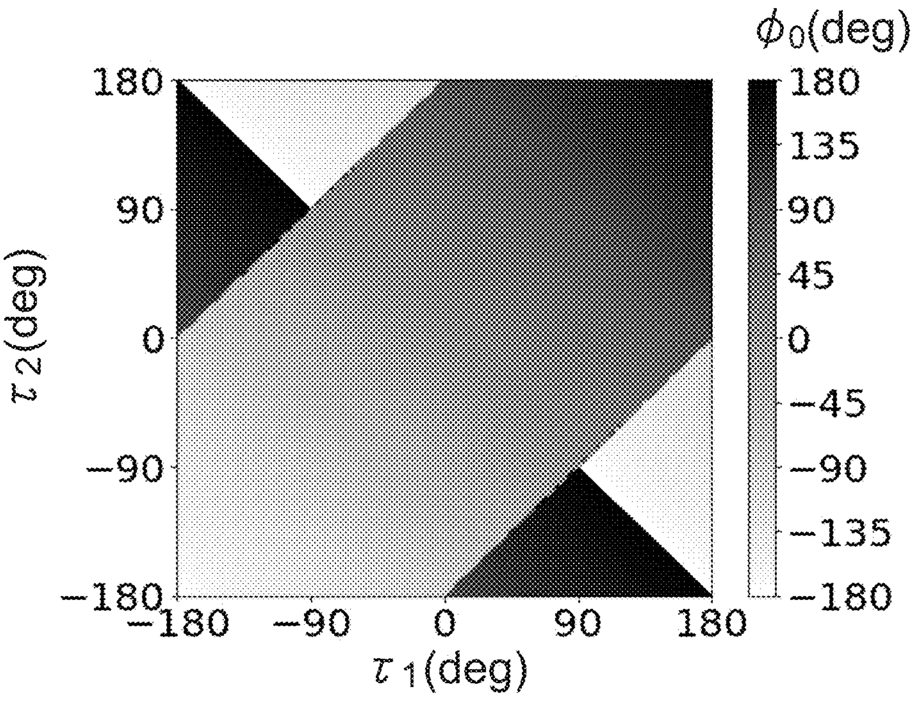

FIGS. 36A and 36B are schematic diagrams illustrating the characteristics of the antenna device according to the second embodiment.

These figures illustrate the tilt direction ($\theta_0$, $\phi_0$) of the beam when the waveguide 10*w* and the transmitting member 15 are rotated. In this example, the angles $\theta_1$ and $\theta_2$ are 30°. The first rotation angle $\tau_1$ of the waveguide 10*w* and the second rotation angle $\tau_2$ of the transmitting member 15 are changed in the range of −180° to 180°. The horizontal axis of these figures is the first rotation angle $\tau_1$. The vertical axis is the second rotation angle $\tau_2$.

As shown in FIG. 36A, by changing the first rotation angle $\tau_1$ and the second rotation angle $\tau_2$, the tilt angle $\theta_0$ changes in the range of 0° to 90°. For example, when the second rotation angle $\tau_2$ is $\phi1\pm180°$, the tilt angle $\theta_0$ is 0°. For example, when the second rotation angle $\tau_2$ is the same as the first rotation angle $\tau_1$, the tilt angle $\theta_0$ is 90°.

As shown in FIG. 36B, by changing the first rotation angle $\tau_1$ and the second rotation angle $\tau_2$, the angle $\phi_0$ changes in the range of −180° to 180°. For example, the first rotation angle $\tau_1$ and the second rotation angle $\tau_2$ are changed while keeping the difference between the first rotation angle $\tau_1$ and the second rotation angle $\tau_2$ constant. This makes it possible to change the angle $\phi_0$ while keeping the tilt angle $\theta_0$ constant.

As described above, the transmitting member 15 may be provided. The transmitting member 15 can change the direction of the first electromagnetic wave 91 emitted from the waveguide 10*w*. For example, the range of beam scanning can be expanded. The transmitting member 15 can be rotated mechanically. The rotation can be performed by the second driver 15D. The range of beam scanning can be further expanded.

For example, two-dimensional beam scanning is possible by rotating the waveguide 10*w* and the transmitting member 15. For example, in a phased array that performs beam scanning electronically, additional circuits such as phase shifters are provided. In the embodiment, no additional circuits are required. In the embodiment, for example, beam scanning can be performed at low cost.

The equiphase surface 91*a* illustrated in FIG. 34 is linear. In the embodiment, the equiphase surface 91*a* does not have to be linear. The transmission phase distribution 92*a* illustrated in FIG. 35 is linear. In the embodiment, the transmission phase distribution 92*a* does not have to be linear.

In the case where the equiphase surface 91*a* is not linear, the transmission phase distribution 92*a* may be changed to correct the equiphase surface 91*a*. In the case where the transmission phase distribution 92*a* is not linear, the equiphase surface 91*a* may be changed to correct the transmission phase distribution 92*a*.

Figure 37:
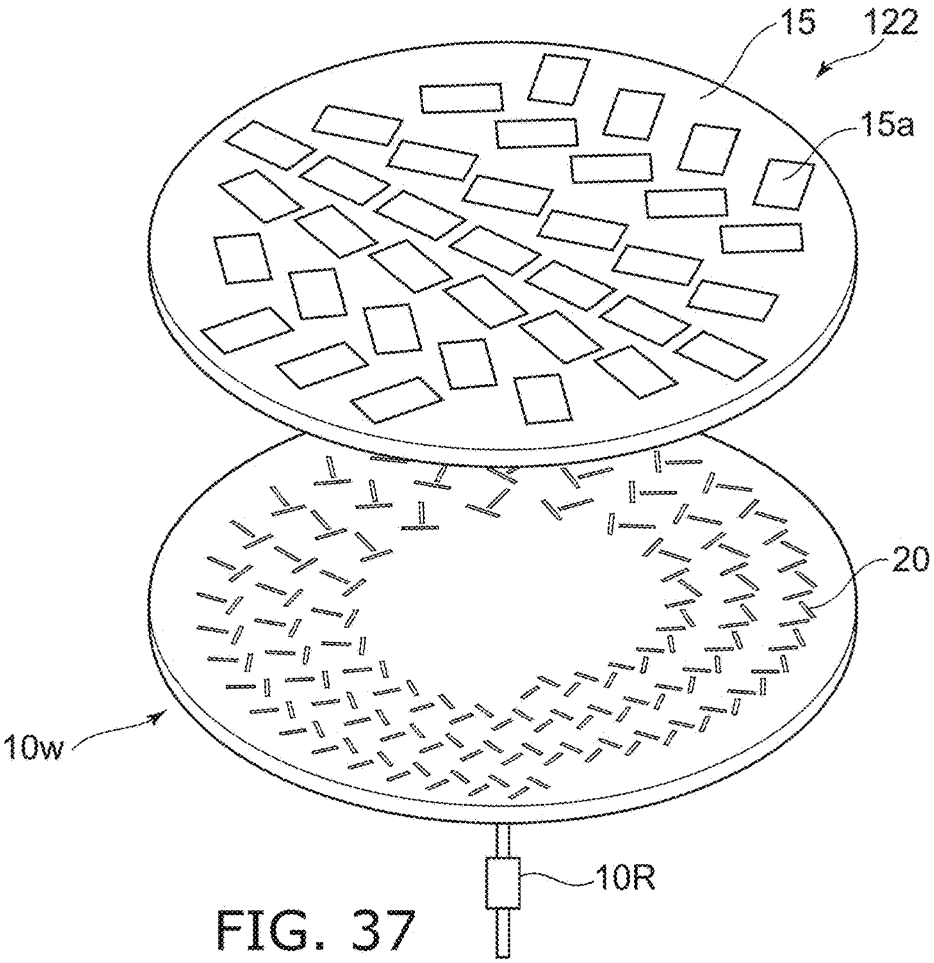
FIG. 37 is a schematic perspective view illustrating an antenna device according to the second embodiment.

FIG. 37 is a schematic perspective view illustrating an antenna device according to the second embodiment.

As shown in FIG. 37, in an antenna device 122 according to the embodiment, a rotary joint 10R is provided in addition to the waveguide 10*w* and the transmitting member 15. The configurations of the antenna device 122 except for this may be the same as the configuration of the antenna device 121, etc.

In the antenna device 122, the rotary joint 10R can hold the waveguide 10*w* and the transmitting member 15 at any angle. Thereby, it is suppressed that the power supply transmission line is twisted and damaged when the waveguide 10*w* and the transmitting member 15 are mechanically rotated.

In the embodiment, the first driver 10D and the second driver 15D may include a motor or the like.

The antenna device 120, the antenna device 121, and the antenna device 122 may be used as receiving devices. For example, the electromagnetic waves arriving from the direction of angle ($\theta_0$, $\phi_0$) can be received.

Third Embodiment

Figure 38:
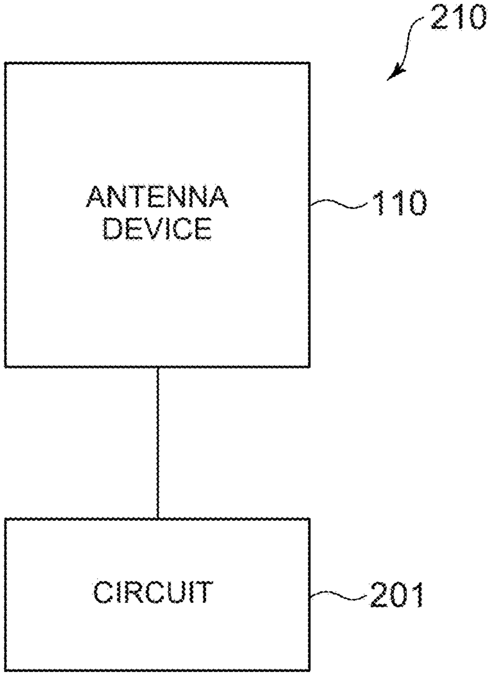
FIG. 38 is a schematic diagram illustrating a wireless device according to a third embodiment.

FIG. 38 is a schematic diagram illustrating a wireless device according to a third embodiment.

As shown in FIG. 38, a wireless device 210 according to the embodiment includes an antenna device according to the first or second embodiment (e.g., antenna device 110) and an electrical circuit 201. The electrical circuit 201 is configured to be coupled to the feed point 10*c* of the waveguide 10*w* included in the antenna device 110. The electrical circuit 201 may be electrically connected to the feed point 10*c*.

For example, by providing the electrical circuit 201, the antenna device 110 can be used as a wireless communication device, a radar, or a wireless power supply device.

For example, the electrical circuit 201 can supply a radio-frequency signal to the antenna device 110. The electrical circuit 201 causes the antenna device 110 to radiate electromagnetic waves. In the case where the antenna device 110 receives the electromagnetic waves, the electrical circuit 201 can demodulate the radio-frequency signal.

In the embodiment, the antenna device (for example, the antenna device 110) and the wireless device 210 can be applied to wireless communication devices using phased arrays, radar, wireless power transmission, or the like.

In the embodiment, good characteristics are obtained in a beam-tilted array antenna.

The embodiment may include the following Technical proposals:

(Technical Proposal 1)

An antenna device, comprising:

a waveguide including a feed point and a first region, the first region being around the feed point on a first plane crossing a first axis direction passing through the feed point, the waveguide including a plurality of radiating portions provided in the first region, each of the plurality of radiating portions including a first slot extending along a first slot direction and a second slot extending along a second slot direction crossing the first slot direction, the plurality of radiating portions including a first radiating portion and a second radiating portion, a first radiating portion direction from the feed point to the first radiating portion crossing the first axis direction, a second radiating portion direction from the feed point to the second radiating portion crossing the first axis direction and crossing the first radiating portion direction, a second absolute value of a second angle difference between the first slot direction and the second radiating portion direction in the second radiating portion being smaller than a first absolute value of a first angle difference between the first slot direction and the first radiating portion direction in the first radiating portion.

(Technical Proposal 2)

The antenna device according to Technical proposal 1, wherein the plurality of radiating portions further include a third radiating portion, a third radiating portion direction from the feed point to the third radiating portion crosses the first axis direction and the second radiating portion direction, the feed point is between the third radiating portion and the first radiating portion in a direction along the first radiating portion direction, and a third absolute value of a third angle difference between the first slot direction and the third radiating portion direction in the third radiating portion is larger than the second absolute value.

(Technical Proposal 3)

The antenna device according to Technical proposal 2, wherein the plurality of radiating portions further include a fourth radiating portion, a fourth radiating portion direction from the feed point to the fourth radiating portion crosses the first axis direction and the first radiating portion direction, and the feed point is between the fourth radiating portion and the second radiating portion in a direction along the second radiating portion direction, and a fourth absolute value of a fourth angle difference between the first slot direction and the fourth radiating portion direction in the fourth radiating portion is larger than the first absolute value.

(Technical Proposal 4)

The antenna device according to any one of Technical proposals 1-3, wherein an angle between the first slot direction and the second slot direction is not less than 80° and not more than 100°.

(Technical Proposal 5)

The antenna device according to any one of Technical proposals 1-4, wherein the first slot included in the first radiating portion has a first slot length along the first slot direction, the second slot included in the first radiating portion has a second slot length along the second slot direction, a ratio of an absolute value of a difference between the first slot length and the second slot length to the first slot length is 0.1 or less.

(Technical Proposal 6)

The antenna device according to any one of Technical proposals 1-5, wherein the first region includes a first partial region and a second partial region, the feed point is between the second partial region and the first partial region in a first crossing direction crossing the first axial direction, the waveguide includes a first member, the first member includes a first member region corresponding to the first partial region and a second member region corresponding to the second partial region, the first member region and the second member region satisfy at least one of a first condition, a second condition, a third condition, a fourth condition, or a fifth condition, in the first condition, a first relative dielectric constant of the first member region is different from a second relative dielectric constant of the second member region, in the second condition, a density of first holes included in the first member region is different from a density of second holes included in the second member region, in the third condition, a first average size of the plurality of first holes included in the first member region is different from a second average size of the plurality of second holes included in the second member region, in the fourth condition, a first configuration of a first structure provided in the first member region is different from a second configuration of a second structure provided in the second member region, and in the fifth condition, a thickness of the first member included in the first member region is different from a thickness of the first member included in the second member region.

(Technical Proposal 7)

The antenna device according to any one of Technical proposals 1-5, wherein the waveguide is configured to guide a radio-frequency signal supplied to the feed point, the first region includes a first partial region and a second partial region, the feed point is between the first partial region and the second partial region in a first crossing direction crossing the first axial direction, and a first guided wavelength in the waveguide in the first partial region is shorter than a second guided wavelength in the waveguide in the second partial region.

(Technical Proposal 8)

The antenna device according to Technical proposal 7, wherein in each of the plurality of radiating portions, a first position is a position of the first slot on the waveguide, in each of the plurality of radiating portions, a second position is a position of the second slot on the waveguide, in each of the plurality of radiating portions, a first angle is an angle between an equiphase surface of the radio-frequency signal propagating through the waveguide at the first position on the waveguide and the first slot direction, in each of the plurality of radiating portions, a second angle is an angle between an equiphase surface at the second position on the waveguide and the second slot direction, a first absolute angle value of the first angle at the first radiating portion is substantially same as a second absolute angle value of the second angle at the first radiating portion, and a third absolute angle value of the first angle at the second radiating portion is substantially same as a fourth absolute angle value of the second angle at the second radiating portion.

(Technical Proposal 9)

The antenna device according to Technical proposal 7 or 8, wherein the plurality of radiating portions are configured to radiate electromagnetic waves in response to the radio-frequency signal, and a projection direction of a main radiation direction of the electromagnetic wave onto the waveguide is along a direction from the second partial region to the first partial region.

(Technical Proposal 10)

The antenna device according to Technical proposal 9, wherein the waveguide includes a first member, a first slow wave factor in the first partial region of the first member is different from a second slow wave factor in the second partial region of the first member.

(Technical Proposal 11)

The antenna device according to Technical proposal 10, wherein the first member includes a dielectric material.

(Technical Proposal 12)

The antenna device according to Technical proposal 7 or 8, wherein the first guided wavelength is a wavelength of the radio-frequency signal propagating along a direction from the feed point to the first partial region, and the second guided wavelength is a wavelength of the radio-frequency signal propagating along a direction from the feed point to the second partial region.

(Technical Proposal 13)

The antenna device according to Technical proposal 7 or 8, wherein a radial interval between the plurality of radiating portions arranged along a cross direction crossing the first axis direction is smaller than $\lambda_0/\{1+\sin(\theta_0)\}$, the $\lambda_0$ is a wavelength of the radio-frequency signal in free space, and the $\theta_0$ is an angle between the first axis direction and a main radiation direction of an electromagnetic waves radiated from the plurality of radiating portions aligned along the crossing direction crossing the first axis direction.

(Technical Proposal 14)

The antenna device according to Technical proposal 7 or 8, wherein a circumferential interval between the plurality of radiating portions in a circumferential direction around the first axial direction is smaller than $\xi\lambda_0$, one of the plurality of radiating portion is next to another one of the plurality of radiating portions in the circumferential direction, a slow wave factor of the radio-frequency signal in the one of the plurality of radiating portions is equal to or greater than a slow wave factor of the radio-frequency signal in the other one of the plurality of radiating portions, the $\xi$ is the slow wave factor of the radio-frequency signal in one of the plurality of radiating portions, and the $\lambda_0$ is the wavelength in free space of the radio-frequency signal.

(Technical Proposal 15)

The antenna device according to any one of Technical proposals 7-14, wherein the first region includes a third partial region and a fourth partial region, the feed point is between the third partial region and the fourth partial region, a direction from the feed point to the third partial region crosses a direction from the feed point to the first partial region, a third guided wavelength in the waveguide in the third partial region is longer than the first guided wavelength and shorter than the second guided wavelength, and a fourth guided wavelength in the waveguide in the fourth partial region is longer than the first guided wavelength and shorter than the second guided wavelength.

(Technical Proposal 16)

The antenna device according to any one of Technical proposals 1-15, wherein

The plurality of radiating portions are configured to transmit and receive at least one of right-handed circularly polarized waves or left-handed circularly polarized waves.

(Technical Proposal 17)

The antenna device according to any one of Technical proposals 1-16, wherein the plurality of radiating portions are arranged substantially in a spiral or concentric shape around the feed point.

(Technical Proposal 18)

The antenna device according to any one of Technical proposals 1-17, further comprising:

a first driver, the first driver being configured to rotate the waveguide in the first plane, and a first electromagnetic wave radiated from the plurality of radiating portions is conically scanned by rotating the waveguide.

(Technical Proposal 19)

The antenna device according to any one of Technical proposals 1-17, further comprising:

a transmitting member, the transmitting member being configured to transmit first electromagnetic waves radiated from the plurality of radiating portions, the transmitting member being configured to change a transmission phase of the first electromagnetic wave, and a direction of a second electromagnetic wave radiated from the transmitting member changes in response to a change in the transmission phase.

(Technical Proposal 20)

The antenna device according to Technical proposal 19, further comprising:

a second driver, the second driver being configured to rotate the transmitting member, and a direction of the second electromagnetic wave changes in response to a rotation of the transmitting member.

(Technical Proposal 21)

A wireless device, comprising:

the antenna device according to any one of Technical proposals 1-20; and an electrical circuit configured to be coupled to the feed point.

According to the embodiment, it is possible to provide an antenna device and a wireless device that can improve the characteristics.

In the present specification, the term "electrically connected state" includes a state in which a plurality of conductors are physically in contact and a current flows between the plurality of conductors. The "state of being electrically connected" includes a state in which another conductor is inserted between the plurality of conductors and a current flows between the plurality of conductors.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in the antenna devices and the wireless devices such as waveguides, transmitting members, drivers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all antenna devices and all wireless devices practicable by an appropriate design modification by one skilled in the art based on the antenna devices and the wireless devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An antenna device, comprising:

a waveguide including a feed point and a first region, the first region being around the feed point on a first plane crossing a first axis direction passing through the feed point, the waveguide including a plurality of radiating portions provided in the first region, each of the plurality of radiating portions including a first slot extending along a first slot direction and a second slot extending along a second slot direction crossing the first slot direction, the plurality of radiating portions including a first radiating portion and a second radiating portion, a first radiating portion direction from the feed point to the first radiating portion crossing the first axis direction, a second radiating portion direction from the feed point to the second radiating portion crossing the first axis direction and crossing the first radiating portion direction, a first angle is formed between the first slot direction along which the first slot of the first radiating portion extends and the first radiating portion direction, a second angle is formed between the first slot direction along which the first slot of the second radiating portion extends and the second radiating portion direction, and a second absolute value of the second angle is smaller than a first absolute value of the first angle.

2. The antenna device according to claim 1, wherein:

the plurality of radiating portions further include a third radiating portion, a third radiating portion direction from the feed point to the third radiating portion crosses the first axis direction and the second radiating portion direction, the feed point is between the third radiating portion and the first radiating portion in a direction along the first radiating portion direction, a third angle difference is formed between the first slot direction along which the first slot of the third radiating portion extends and the third radiating portion direction, and a third absolute value of the third angle difference is larger than the second absolute value.

3. The antenna device according to claim 2, wherein:

the plurality of radiating portions further include a fourth radiating portion, a fourth radiating portion direction from the feed point to the fourth radiating portion crosses the first axis direction and the first radiating portion direction, the feed point is between the fourth radiating portion and the second radiating portion in a direction along the second radiating portion direction, a fourth angle difference is formed between the first slot direction along which the first slot of the fourth radiating portion extends and the fourth radiating portion direction, and a fourth absolute value of the fourth angle difference is larger than the first absolute value.

4. The antenna device according to claim 1, wherein an angle between the first slot direction and the second slot direction is not less than 80° and not more than 100°.

5. The antenna device according to claim 1, wherein:

the first slot included in the first radiating portion has a first slot length along the first slot direction thereof, the second slot included in the first radiating portion has a second slot length along the second slot direction thereof, and a ratio of an absolute value of a difference between the first slot length and the second slot length to the first slot length is 0.1 or less.

6. The antenna device according to claim 1, wherein;

the first region includes a first partial region and a second partial region, the feed point is between the second partial region and the first partial region in a first crossing direction crossing the first axial direction, the waveguide includes a first member, the first member includes a first member region corresponding to the first partial region and a second member region corresponding to the second partial region, the first member region and the second member region satisfy at least one of a first condition, a second condition, a third condition, a fourth condition, or a fifth condition, in the first condition, a first relative dielectric constant of the first member region is different from a second relative dielectric constant of the second member region, in the second condition, a density of first holes included in the first member region is different from a density of second holes included in the second member region, in the third condition, a first average size of the plurality of first holes included in the first member region is different from a second average size of the plurality of second holes included in the second member region, in the fourth condition, a first configuration of a first structure provided in the first member region is different from a second configuration of a second structure provided in the second member region, and in the fifth condition, a thickness of the first member included in the first member region is different from a thickness of the first member included in the second member region.

7. The antenna device according to claim 1, wherein:

the waveguide is configured to guide a radio-frequency signal supplied to the feed point, the first region includes a first partial region and a second partial region, the feed point is between the first partial region and the second partial region in a first crossing direction crossing the first axial direction, and a first guided wavelength in the waveguide in the first partial region is shorter than a second guided wavelength in the waveguide in the second partial region.

8. The antenna device according to claim 7, wherein;

in each of the plurality of radiating portions, a first position is a position of the first slot on the waveguide, in each of the plurality of radiating portions, a second position is a position of the second slot on the waveguide, in each of the plurality of radiating portions, a first angle is an angle between an equiphase surface of the radio-frequency signal propagating through the waveguide at the first position on the waveguide and the first slot direction, in each of the plurality of radiating portions, a second angle is an angle between an equiphase surface at the second position on the waveguide and the second slot direction, a first absolute angle value of the first angle at the first radiating portion is substantially the same as a second absolute angle value of the second angle at the first radiating portion, and a third absolute angle value of the first angle at the second radiating portion is substantially the same as a fourth absolute angle value of the second angle at the second radiating portion.

9. The antenna device according to claim 7, wherein:

the plurality of radiating portions are configured to radiate electromagnetic waves in response to the radio-frequency signal, and a projection direction of a main radiation direction of the electromagnetic wave onto the waveguide is along a direction from the second partial region to the first partial region.

10. The antenna device according to claim 9, wherein:

the waveguide includes a first member, and a first slow wave factor in the first partial region of the first member is different from a second slow wave factor in the second partial region of the first member.

11. The antenna device according to claim 10, wherein the first member includes a dielectric material.

12. The antenna device according to claim 7, wherein:

the first guided wavelength is a wavelength of the radio-frequency signal propagating along a direction from the feed point to the first partial region, and the second guided wavelength is a wavelength of the radio-frequency signal propagating along a direction from the feed point to the second partial region.

13. The antenna device according to claim 7, wherein:

a radial interval between the plurality of radiating portions arranged along a cross direction crossing the first axis direction is smaller than $\lambda_0/\{1+\sin(\theta_0)\}$, $\lambda_0$ is a wavelength of the radio-frequency signal in free space, and $\theta_0$ is an angle between the first axis direction and a main radiation direction of an electromagnetic waves radiated from the plurality of radiating portions aligned along the crossing direction crossing the first axis direction.

14. The antenna device according to claim 7, wherein:

a circumferential interval between the plurality of radiating portions in a circumferential direction around the first axial direction is smaller than $\xi\lambda_0$, one of the plurality of radiating portions is next to another one of the plurality of radiating portions in the circumferential direction, a slow wave factor of the radio-frequency signal in the one of the plurality of radiating portions is equal to or greater than a slow wave factor of the radio-frequency signal in the other one of the plurality of radiating portions, $\xi$ is the slow wave factor of the radio-frequency signal in one of the plurality of radiating portions, and $\lambda_0$ is the wavelength in free space of the radio-frequency signal.

15. The antenna device according to claim 7, wherein:

the first region includes a third partial region and a fourth partial region, the feed point is between the third partial region and the fourth partial region, a direction from the feed point to the third partial region crosses a direction from the feed point to the first partial region, a third guided wavelength in the waveguide in the third partial region is longer than the first guided wavelength and shorter than the second guided wavelength, and a fourth guided wavelength in the waveguide in the fourth partial region is longer than the first guided wavelength and shorter than the second guided wavelength.

16. The antenna device according to claim 1, wherein the plurality of radiating portions are arranged substantially in a spiral or concentric shape around the feed point.

17. The antenna device according to claim 1, further comprising:

a first driver, wherein:

the first driver is configured to rotate the waveguide in the first plane, and a first electromagnetic wave radiated from the plurality of radiating portions is conically scanned by rotating the waveguide.

18. The antenna device according to claim 1, further comprising:

a transmitting member, wherein:

the transmitting member is configured to transmit first electromagnetic waves radiated from the plurality of radiating portions, the transmitting member is configured to change a transmission phase of the first electromagnetic wave, and a direction of a second electromagnetic wave radiated from the transmitting member changes in response to a change in the transmission phase.

19. The antenna device according to claim 18, further comprising:

a second driver, wherein:

the second driver is configured to rotate the transmitting member, and a direction of the second electromagnetic wave changes in response to a rotation of the transmitting member.

20. A wireless device, comprising:

the antenna device according to claim 1; and an electrical circuit configured to be coupled to the feed point.

* * * * *